United States Patent
Earley et al.

(10) Patent No.: US 9,635,426 B2
(45) Date of Patent: Apr. 25, 2017

(54) METHOD AND APPARATUS FOR BATCH VOTING ON LIVE BROADCASTS

(71) Applicant: Fox Broadcasting Company, Los Angeles, CA (US)

(72) Inventors: Joseph B. Earley, Los Angeles, CA (US); David B. Wertheimer, Los Angeles, CA (US); Edward A. Skolarus, Manhattan Beach, CA (US); William Bradford, Westlake Village, CA (US); Matthew Moroz, Venice, CA (US); Nicole H. Ruby, Los Angeles, CA (US); Ori Nakar, Culver City, CA (US); Bryan J. Gonzalez, Culver City, CA (US)

(73) Assignee: Fox Broadcasting Company, Los Angeles, CA (US)

( * ) Notice: Subject to any disclaimer, the term of this patent is extended or adjusted under 35 U.S.C. 154(b) by 0 days.

(21) Appl. No.: 14/771,186

(22) PCT Filed: Feb. 28, 2014

(86) PCT No.: PCT/US2014/019679
§ 371 (c)(1),
(2) Date: Aug. 27, 2015

(87) PCT Pub. No.: WO2014/134575
PCT Pub. Date: Sep. 4, 2014

(65) Prior Publication Data
US 2016/0007089 A1    Jan. 7, 2016

Related U.S. Application Data

(60) Provisional application No. 61/771,046, filed on Feb. 28, 2013.

(51) Int. Cl.
*H04H 60/33*     (2008.01)
*H04N 21/475*    (2011.01)
(Continued)

(52) U.S. Cl.
CPC ......... *H04N 21/4758* (2013.01); *G07C 13/00* (2013.01); *H04H 60/33* (2013.01); *H04N 21/4126* (2013.01); *H04W 4/06* (2013.01)

(58) Field of Classification Search
CPC ................. H04N 21/258; H04N 21/27; H04N 21/44213; H04N 21/4758
See application file for complete search history.

(56) References Cited

U.S. PATENT DOCUMENTS 6,439,997 B1    8/2002    Brasseur et al.
6,968,243 B1 *  11/2005   Oh ...................... G10H 1/0008
                                                            463/40

(Continued)

FOREIGN PATENT DOCUMENTS

WO    02084986        10/2002
WO    2008150258      12/2008
WO    2012/135048     10/2012

OTHER PUBLICATIONS

Basso, A., et al., "Avoiding Massive Automated Voting in Internet Polls", Electronic Notes in Theoretical Computer Science 197.2, 2008, pp. 149-157. http://www.sciencedirect.com/science/article/pii/S1571066108000637.

(Continued)

*Primary Examiner* — Pankaj Kumar
*Assistant Examiner* — Timothy Newlin
(74) *Attorney, Agent, or Firm* — Gates & Cooper LLP

(57) ABSTRACT

A method, apparatus, article of manufacture, and a memory structure for allocating and committing votes in a variety of voting paradigms is described. In one embodiment, the (Continued)

method describes a system applicable in a plurality of time zones and comprises determining if an allocation of at least a portion of N1 votes among one or more candidates is received from a first user via a first device during a first period, accepting and storing the allocation of votes, only if the allocation is received during the first period, receiving a user command committing the stored allocation of the N1 votes among the plurality of candidates, determining if the command is received during a second period, and committing the stored first user allocation of N1 votes among the one or more candidates only if the command is received during the second period.

41 Claims, 51 Drawing Sheets

(51) Int. Cl.
G07C 13/00 (2006.01)
H04N 21/41 (2011.01)
H04W 4/06 (2009.01)

(56) References Cited

U.S. PATENT DOCUMENTS

| | | | |
|---|---|---|---|
| 7,258,275 B1 | 8/2007 | Reddy | |
| 8,167,725 B1* | 5/2012 | Patnaik | H04N 21/4758 463/40 |
| 8,382,592 B1 | 2/2013 | Patnaik et al. | |
| 8,510,385 B1* | 8/2013 | Najm | H04N 21/4788 379/92.02 |
| 2003/0094489 A1* | 5/2003 | Wald | G07C 13/00 235/386 |
| 2003/0121036 A1* | 6/2003 | Lock | G08B 27/008 725/33 |
| 2003/0171982 A1 | 9/2003 | Paul | |
| 2003/0196198 A1* | 10/2003 | Broussard | H04N 7/173 725/24 |
| 2004/0005900 A1* | 1/2004 | Zilliacus | H04N 7/17318 455/466 |
| 2006/0068818 A1 | 3/2006 | Leitersdorf et al. | |
| 2007/0028272 A1* | 2/2007 | Lockton | H04H 20/38 725/62 |
| 2007/0136776 A1 | 6/2007 | Findlay et al. | |
| 2007/0169143 A1* | 7/2007 | Li | G06Q 30/02 725/23 |
| 2007/0244585 A1* | 10/2007 | Speiser | A63F 13/12 700/91 |
| 2008/0061142 A1* | 3/2008 | Howcroft | H04N 5/44591 235/386 |
| 2008/0098417 A1* | 4/2008 | Hatamian | H04H 60/33 725/24 |
| 2008/0212934 A1 | 9/2008 | Ehmann | |
| 2008/0313026 A1 | 12/2008 | Rose et al. | |
| 2010/0064306 A1* | 3/2010 | Tiongson | H04N 21/25891 725/24 |
| 2011/0053559 A1 | 3/2011 | Klein | |
| 2011/0058101 A1* | 3/2011 | Earley | H04L 12/1822 348/461 |
| 2011/0225024 A1 | 9/2011 | Seyer et al. | |
| 2012/0028232 A1 | 2/2012 | Findlay | |
| 2012/0143914 A1* | 6/2012 | Lang | G06F 17/30696 707/779 |
| 2012/0144412 A1* | 6/2012 | Sharma | H04N 21/4126 725/13 |
| 2012/0151516 A1 | 6/2012 | Yanko | |
| 2012/0196268 A1 | 8/2012 | Cacciolo, Jr. | |
| 2012/0253871 A1 | 10/2012 | Tracey et al. | |
| 2012/0302156 A1 | 11/2012 | Anstandig et al. | |
| 2013/0191857 A1* | 7/2013 | Guinn | H04H 20/38 725/24 |
| 2014/0229245 A1* | 8/2014 | Strauss | G07C 13/00 705/12 |

OTHER PUBLICATIONS

Popoveniuc, Stefan, "SpeakUp: Remote Unsupervised Voting", Industrial Track ACNS, 2010. http://popoveniuc.com/papers/SpeakUp.pdf.

Volkamer, M., et al., "Multiple Casts in Online voting: Analyzing Chances", 2nd International Workshop on Electronic Voting, Aug. 2-4, 2006, Castle Hofen, Bregenz, Austria, pp. 97-106. ISBN 978-3-88579-180-3 http://static.twoday.net/evoting/files/krimmer_electronic_voting_2006/pdf#page=98.

International Search Report and Written Opinion dated Jun. 26, 2014 for PCT App. No. PCT/US2014/19679.

* cited by examiner

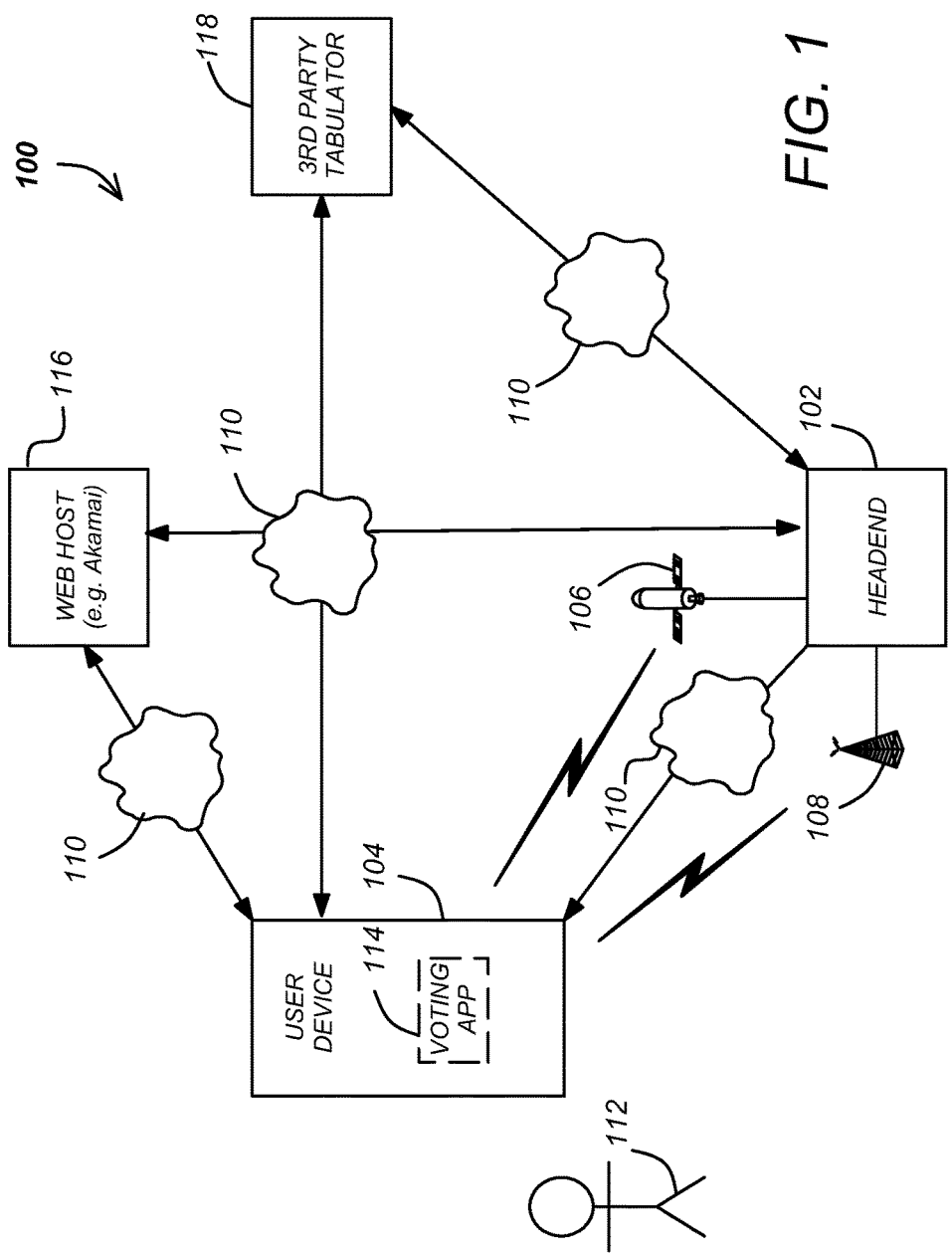

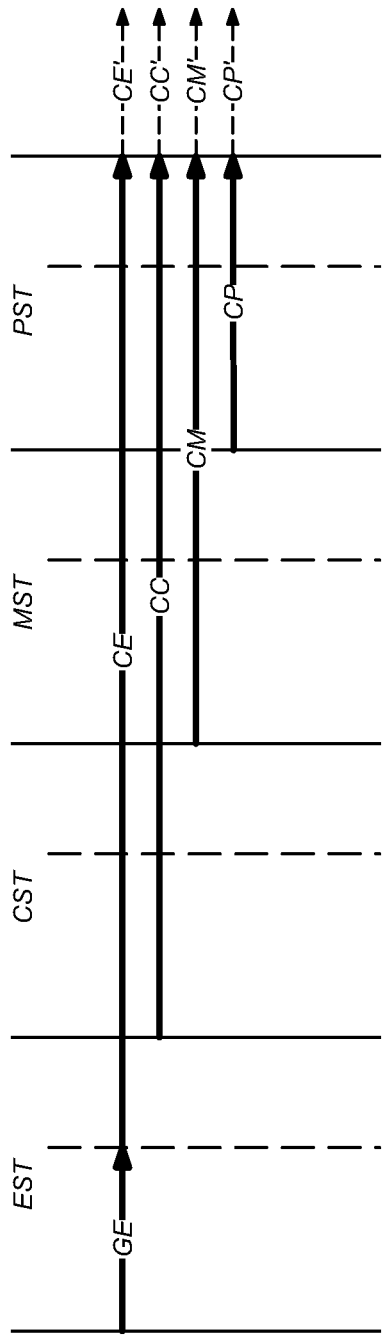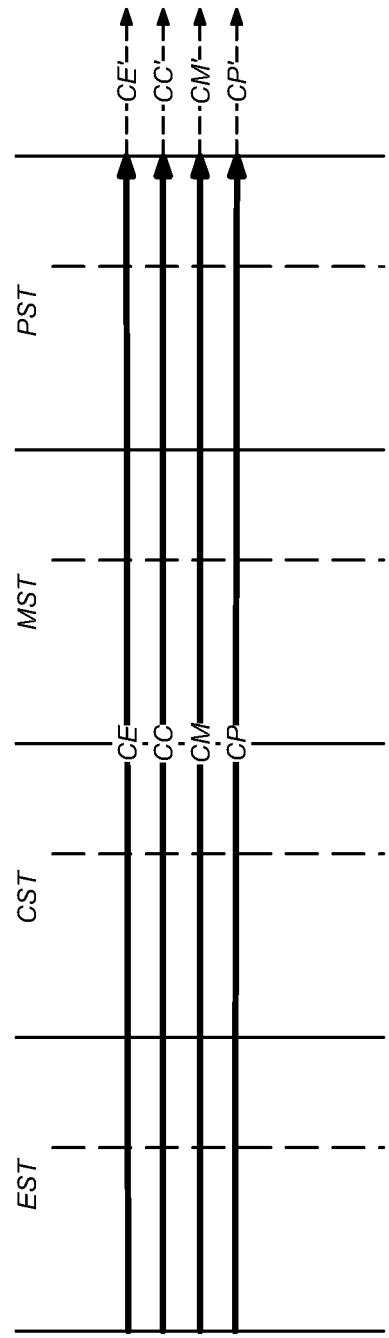

☒ WELCOME USER NAME | LOGOUT ADD TO TIMELINE | ON OFF

AMERICAN IDOL

🌐 AT&T

AT&T AMERICAN IDOL VOTE

READY TO CAST YOUR VOTES? FOLLOW THE INSTRUCTIONS BELOW AND CONFIRM YOUR VOTES, OR CONTINUE VOTING AND CLICK THE BACK BUTTON.

PZNPYOO

PLEASE PROVE YOU ARE A REAL PERSON BY ENTERING THE CODE YOU SEE ABOVE ↻

BACK

CONFIRM VOTES

CLICK HERE FOR MORE INFORMATION ON HOW TO VOTE AND VOTING FAQs.

MANDATORY VOTING COPY

CALL TO ACTION LINKS

OPTIONAL REVIEW, CAPTCHA, AND SUBMIT

```
AT&T    4G        8:15 PM         🔒  100%  🔋

AMERICANIDOL.VOTE.COM

VOTING    AMERICAN IDOL        🌐  AT&T

👤 WELCOME USER NAME | LOGOUT ADD TO TIMELINE | ON OFF

SUBMIT YOUR VOTES!

CLICK THE BACK BUTTON TO CHANGE YOUR VOTE ASSIGNMENT.
  OR, ENTER THE CAPTCHA INFORMATION AND SELECT THE SUBMIT
          VOTES BUTTON TO CAST YOUR VOTE(S)

┌─────────────────────┐
              │       PZNPYO        │
              └─────────────────────┘

PLEASE PROVE YOU ARE A REAL PERSON BY
            ENTERING THE CODE YOU SEE ABOVE

┌─────────────────────┐  ┌───┐
        │                     │  │ ⟳ │
        └─────────────────────┘  └───┘

CLICK HERE FOR MORE INFORMATION ON HOW TO VOTE ONLINE AND
                       VOTING FAQs

┌──────────────┐         ┌──────────────┐
       │    BACK      │         │ SUBMIT VOTES!│
       └──────────────┘         └──────────────┘
```

*FIG. 32E*

METHOD AND APPARATUS FOR BATCH VOTING ON LIVE BROADCASTS

CROSS REFERENCE TO RELATED APPLICATIONS

This application is a National Stage Application of and claims benefit under 35 U.S.C. §365 to PCT Patent Application No. PCT/US2014/19679, entitled "METHOD AND APPARATUS FOR BATCH VOTING ON LIVE BROADCASTS," by Joseph B. Earley, et al., filed Feb. 28, 2014, which claims benefit of U.S. Provisional Patent Application Ser. No. 61/771,046, entitled "METHOD AND APPARATUS FOR BATCH VOTING ON LIVE BROADCASTS," by Joseph B. Earley et al., filed Feb. 28, 2013, both of which applications are hereby incorporated by reference herein.

BACKGROUND OF THE INVENTION

1. Field of the Invention

The present invention relates to systems and methods for providing entertainment services, and in particular to a system and method for allowing viewers to vote on elements of a television program.

2. Description of the Related Art

CAPTCHA (Completely Automated Public Turing test to tell Computers and Humans Apart) is a challenge response test used in computing that attempts to thwart automatic machine-generated responses and assure that responses are instead provided by a human being. Generally CAPTCHA provides a series of distorted characters that cannot be easily determined via optical character recognition (OCR), requiring a human being to perceive the characters and enter them.

Online voting for reality competition shows such as AMERICAN IDOL are known in the art. Some online voting systems do not allow more than one vote per online user, and voting systems that do permit more than one vote per online user may require the user to submit each vote separately. It is undesirable to limit each online user to a single vote, because this does not account for a wide variety of user expression regarding their opinions of the contest. For example, a user may believe that one contestant is only slightly preferable to another, and a single vote applied across several contestants cannot reflect this.

Furthermore, when voting for such competitions, it is important that the voting process be fair or all candidates. For example, consider a reality competition that is broadcast live in the Eastern Time Zone. If voting were opened at the beginning of the broadcast in the Eastern Time Zone, and viewers were able to vote and commit votes before all of the candidates have performed, candidates who perform later in the broadcast will have a disadvantage in the voting, as they may have given a spectacular performance, but many viewers would have already committed all of their votes and be unable to vote for them.

Other voting scheme difficulties are a product of the fact that the competition is broadcast in the Eastern Time Zone (and typically live) and later broadcast in other time zones (e.g. the Central Time Zone, Mountain Time Zone, and Pacific Time Zone), and no longer live.

What is needed is a system and method for allowing different voting schemes that does not run afoul of CAPTCHA requirements, are fair to all candidates, and are workable with both live broadcasts and rebroadcasts in subsequent time zones. The present invention satisfies that need.

SUMMARY OF THE INVENTION

To address the requirements described above, the present invention discloses a method and apparatus for accepting voting for one or more of a plurality of choices depicted in a broadcast of a program in a plurality of time zones comprising a first time zone and a last time zone. In one embodiment, the method comprises determining if an allocation of at least a portion of N1 votes among one or more candidates is received from a first user via a first device during a first period; accepting and storing the allocation of votes, only if the allocation is received during the first period; receiving a user command committing the stored allocation of the N1 votes among the plurality of candidates; determining if the command is received during a second period; and committing the stored first user allocation of N1 votes among the one or more candidates only if the command is received during the second period. In another embodiment, the apparatus comprises a processor having access to a memory storing instructions for performing the above operations.

The features described further below allow voters to allocate and commit a set amount of votes determined by broadcasters/producers at the start of the season (e.g. 50) among as many or as few contestants as desired and then submit all the votes at the same time with only one CAPTCHA entry. The voter can assign and adjust the available number of votes before and during the broadcast of the performance show for which they are voting and play along by changing votes during that performance show. However, votes will not be permitted to be submitted and will not count until the voting window is open (e.g., after the first airing of the applicable performance episode).

This engaging voting feature offers fans the opportunity to "SuperVote" online for their favorite contestant(s) using a voting experience within an online voting window in which fans could cast their votes for that evening's performances. Now with the SuperVote feature, fans can cast multiple votes all at once. Voting may be accomplished online, by mobile and tablet application, using toll-free phone lines, or text messaging.

Viewers are be able to SuperVote—cast multiple votes at one time—via websites sponsored by the contest. For example, if the contest may be the AMERICAN IDOL contest broadcast by FOX (hereinafter used for exemplary purposes), any of the AMERICAN IDOL VOTE destinations, including www.americanidol.com, the AMERICAN IDOL mobile app (data and message rates may apply) and social media such as FACEBOOK. To SuperVote, fans can allocate any number of votes for one contestant or multiple contestants, for a fixed total (for example, 50) of votes (across all online voting destinations), and in a unique interactive experience, they can adjust their vote selections as performances happen during the show. When the voting window officially opens, fans can submit their final votes—all at once. Online voting may begin immediately after the first performance show airing.

In addition to online voting, fans will continue to be able to vote during the voting window via toll-free phone lines, as well as text-messaging for wireless customers (standard text-messaging rates may apply). At the end of each performance show, the phone lines will open for at least two hours and AMERICAN IDOL viewers will be able to vote for their favorite contestant(s) via the toll-free telephone numbers (1-866-IDOLS-01, -02, etc.). Wireless customers can use their cell phones to vote by texting the word "VOTE" to the four-digit short code (5701, 5702, etc.) that corresponds with the contestant of their choice. AMERICAN IDOL voting. Voting may be managed by a third party.

The foregoing can be practiced in one of several voting paradigms, one or more of which provide several advantages over related on-line voting schemes:

1. The user is permitted to enter votes for particular candidates, while changing those votes as the competition is on-going, to reflect exceptional performances by each candidate. These vote entries may be received and tallied by the third party tabulator, but may not be entered as the final vote until the performance has been completed. Voting cutoffs may be determined by time zone or geographical region and can be determined using on-line geolocating schemes such as by use of IP addresses, GPS chips and the like.
2. The user is permitted to apportion votes that have not been cast.
3. Each candidate in the group of candidates can receive more than one vote. This permits the user to more finely express their assessment of each candidate. For example, if there are only two candidates and the user has a strong preference for candidate A over candidate B, the user can cast all votes in favor of candidate A and no votes in favor or candidate B. For example if the user is provided with 100 votes, a user casting 100 votes for candidate A and zero votes candidate B is expressing a much stronger preference for candidate A than would a voter that casts 51 votes for candidate A and 49 votes for candidate B. Also, the user is given a predetermined number of votes to "spend" on each different candidate in the group of candidates. This allows the entity sponsoring the vote to determine which level of granularity the users will be permitted to vote for their perceived candidates. For example, the sponsor may want the user to make a difficult choice between candidates, and only permit five votes allocated between three contestants. In other paradigms, the user is also limited in providing no more than M votes for any one candidate.

BRIEF DESCRIPTION OF THE DRAWINGS

FIG. 1 is a diagram illustrating one embodiment of an event voting system;

FIGS. 2A-2E are diagram illustrating candidate voting paradigms;

FIGS. 26-28 are diagrams illustrating one embodiment of an analogous user interface for presentation on a tablet or computer via an exemplary social networking system page;

FIGS. 29-31 are diagrams illustrating one embodiment of the user interface for presentation on a tablet or computer via a webpage illustrated on a browser;

DETAILED DESCRIPTION OF PREFERRED EMBODIMENTS

Figure 2A:
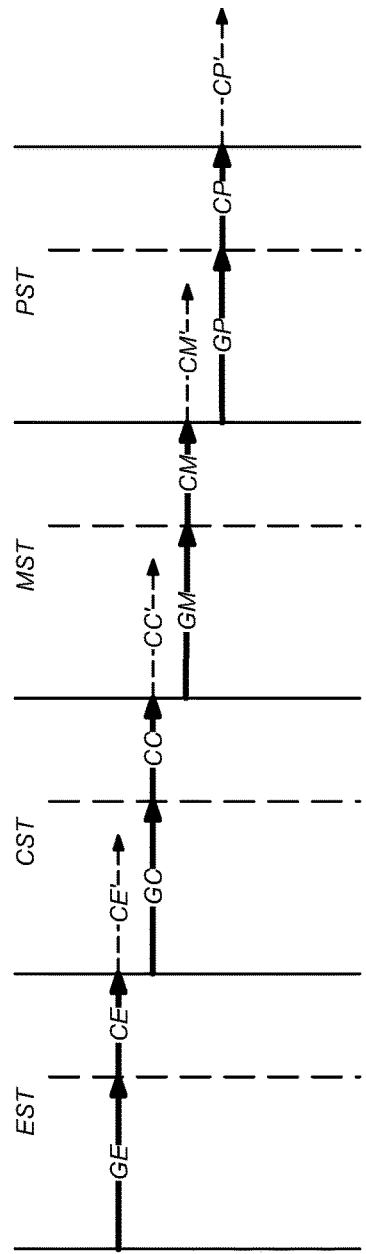

In the following description, reference is made to the accompanying drawings which form a part hereof, and which is shown, by way of illustration, several embodiments of the present invention. It is understood that other embodiments may be utilized and structural changes may be made without departing from the scope of the present invention.

FIG. 1 is a diagram illustrating one embodiment of an event voting system (EVS) 100. The EVS 100 includes a headend 102 that transmits media programs to viewers such as one or more users 112. Such transmission can be a broadcast transmission such as implemented by a terrestrial broadcast network 118, a satellite broadcast network 106, cable transmission, or transmission via the Internet 110. Users 112 have one or more user devices 104 available to them, and such user devices 104 can be used to receive the transmitted media programs and/or to communicate with other EVS 100 entities, as described herein. The user device 104 may comprise a television, a cellphone, tablet computer, desktop computer, laptop, or other computing device. The design of such user devices 104 is discussed further below.

In one embodiment, the user devices 104 implement a web browser or other artifice that permits the user device to receive and transmit data via the World Wide Web or Internet 110. Such received data may be webpages available from a web host 116 such as AKAMAI. Typically, such web pages are expressed in HTML (hypertext markup language) and are available at an address known as a uniform resource locator (URL). Such addresses may be provided as a reference from another webpage at another URL, or may be provided to the user device 104 by the headend 102 as a part of an application that is downloaded and stored in the user device 104 and executed by the user device.

In the illustrated embodiment, the user devices 104 also communicate with a third party tabulator 118 that receives votes cast by the user 112, entered into the user device 104, and transmitted therefrom to the third party tabulator 118.

Votes are tabulated by the third party tabulator 118 instead of the headend 102 to ensure the sanctity of the voting process (e.g. to assure that the headend has no hand in tabulating the voting results). To further ensure the efficacy of the votes received from user devices 112, the votes transmitted from the user devices 104 may be encrypted or signed by the user device. This can be accomplished via secret, public/private or asymmetrical key techniques.

Tabulated voting results are provided from the third party tabulator 118 to the headend. As further described below, the results may be overlaid or otherwise integrated with the media program broadcast by the headend 102 in real time, thus giving users 104 voting results in real time.

FIGS. 2A-2E are diagram illustrating candidate voting paradigms. In all of the illustrated paradigms, the media program is first broadcast in a first time zone (e.g. Eastern Standard Time or EST), and rebroadcast in subsequent time zones, including Central Standard Time (CST), Mountain Standard Time (MST), and Pacific Standard Time (PST). These time zones are used solely for illustration, as the first time zone of the broadcast could be earlier than the EST and the last time zone for the broadcast could be subsequent to the PST. Typically, the first broadcast of the media program is a live broadcast, that is, transmitted concurrently with the contest itself or nearly so (accounting for a small delay for processing or censorship purposes). FIGS. 2A-2D illustrate two periods. The first period (alternatively referred to hereinafter as the "gamification period" is a period in which the users 112 in the time zone in which the user device 104 is disposed are permitted to allocate votes among candidates, but are not permitted to commit those votes. The second period (alternatively referred to hereinafter as the "commit period" is a period in which users 112 in the time zone in which the user device is disposed are permitted to commit votes that have been allocated. Once committed, votes cannot be changed or withdrawn. In one embodiment, users 112 may also allocate votes in the commit period, but once such votes are committed, they cannot be changed or withdrawn.

In FIGS. 2A-2E, the gamification period each time zone is indicated by "GX" where "X" represents the time zone, and the commit period in each time zone is indicated by "CX." For example, GE, GC, GM, and GP indicate the gamification periods for the EST, CST, MST, and PST time zones respectively, CE, CC, CM, and CP indicate the commit periods for the EST, CST, MST, and PST time zones respectively.

FIG. 2A is a diagram of a first voting paradigm. In this paradigm, the gamification period for user devices 104 each time zone begins when the broadcast in that particular time zone begins, and extends through a time period before the end of the broadcast in the particular time zone. In one embodiment, that time period is queued to an event in the media program contest (e.g. the time at which the last contestant has performed). In another embodiment, the time period is queued to an event related to the broadcast times (e.g. 5 minutes before the end of the broadcast).

Also in this paradigm, the commit period for the user devices extends from the end of the gamification period until the end of the broadcast within the time zone. In a variant of this embodiment, the commit period extends a period of time following the end of the broadcast within the time zone, for example, one hour after completion of the broadcast. This is indicated in FIG. 2A with the dashed lines. In this paradigm, a first period may be defined to be the gamification period plus the commit period of each time zone, while a second period may be defined to be the commit period in the time zone. Hence, a first period (allocation permitted) may be defined for user devices 104 in time zone X is indicated as GX+CX, which is during or after the broadcast of the program in the determined time zone until at least the completion of the broadcast in the determined time zone) and the second period (commitment permitted) CX may be defined, which extends from a time interval before the end of the broadcast in the determined time zone and until at least the completion of the broadcast of the program in the determined time zone, X.

Figure 2B:
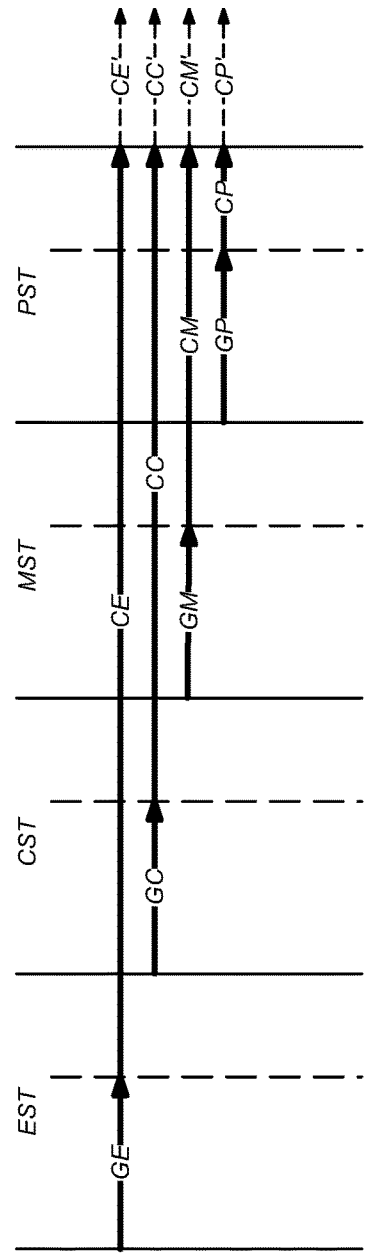

FIG. 2B is a diagram of a second voting paradigm. In this paradigm, the gamification period GX for user devices in each time zone begins when the broadcast in that particular time zone begins, and extends until a time period before the end of the broadcast in the particular time zone. However, in this paradigm, the commit period CX extends until the end of the temporally latest broadcast of the media program in the relevant time zones (e.g. time zones for which voting is offered). Therefore, in this paradigm, a first period may be defined to be the gamificaiton period in the determined time zone X plus the commit period of each time zone (e.g. GX+CX), while a second period may be defined to be the commit period CX in the time zone. The first period may also be expressed as during or after the broadcast of the program in the determined time zone until at least the completion of the broadcast in the determined time zone) and the second period is indicated as CE, which extends from a time interval before the end of the broadcast in the determined time zone and until at least the completion of the broadcast of the program in the temporally last time zone. In a variant of this embodiment, the commit period can be extended even longer after the end of the latest broadcast of the media program. Further, with respect to this variant, the commit period can end for all users in all time zones at the same time (e.g. at 10 AM in the EST zone the morning after the broadcast) or can end for users in each time period a time period after the broadcast in that time period. For example, the commit period in each time zone may be extended for 10 hours after the end of the broadcast in that respective time zone. This permits users 112 to "sleep on" how they would like to allocate and/or commit their votes.

FIG. 2C is a diagram of a third voting paradigm. In this paradigm, the gamification period for user devices in the EST time zone (GE) begins when the broadcast in that particular time zone begins, and extends until the time period before the end of the broadcast in the EST time zone. Further, in this paradigm the commit period for the EST time zone (CE) begins at the end of the gamification time period and extends either to the end of the rebroadcast of the media program in the last time zone, or in the variant case, a period of time following the end of that rebroadcast. In all of the other time zones, the gamification period and the commit period are coincident, that is, they occur at the same time. Thus, in the CST time zone, users 112 can allocate votes to candidates and commit those votes immediately following that allocation (or, equivalently, allocate and commit the votes at the same time).

In this paradigm, a first period may be defined as during or after the television broadcast of the media program in the determined time zone in any of the plurality of time zones until at least the completion of the television program in the last of the plurality of time zones. Also in this paradigm, the second period may be defined in the first time zone as from a time interval before the end of the television broadcast in the first of the plurality of time zones until at least the completion of the broadcast of the television program in the last of the plurality of time zones, while the second period is defined in other time zones as extending from the beginning of the broadcast in that time zone and extending until the end of the rebroadcast of the media program in the last of the time zones.

FIG. 2D is a diagram of a fourth voting paradigm. In this paradigm, the gamification and commit periods both begin at the beginning of the broadcast in the temporally first (e.g. EST) time zone, and extend to the end of the last broadcast in the temporally last time zone. In a variant, the commit periods extend a period of time after the end of the last rebroadcast, as described above in FIG. 2C. In this paradigm, users 112 in time zones following the temporally first time zone can allocate and commit votes for candidates even before the rebroadcast of the media program in their time zone begins. In such time zones, users may be issued spoiler alerts to let them know that by voting on the event, they may be obtaining information that will prematurely indicate the outcome of the contest. For example, if a candidate has been eliminated by voting in previous time zones, that candidate may be removed from the possible candidates the user has to choose from, prematurely indicating the outcome of the contest. Spoiler alerts may also be utilized in any paradigm in which the voting process may prematurely indicate the outcome of the contest. In this embodiment, both the first and second time periods can be defined as beginning from the broadcast of the media program in the temporally first time zone and extending through to at least the end of the rebroadcast of the media program in the temporally last time zone.

Figure 2E:
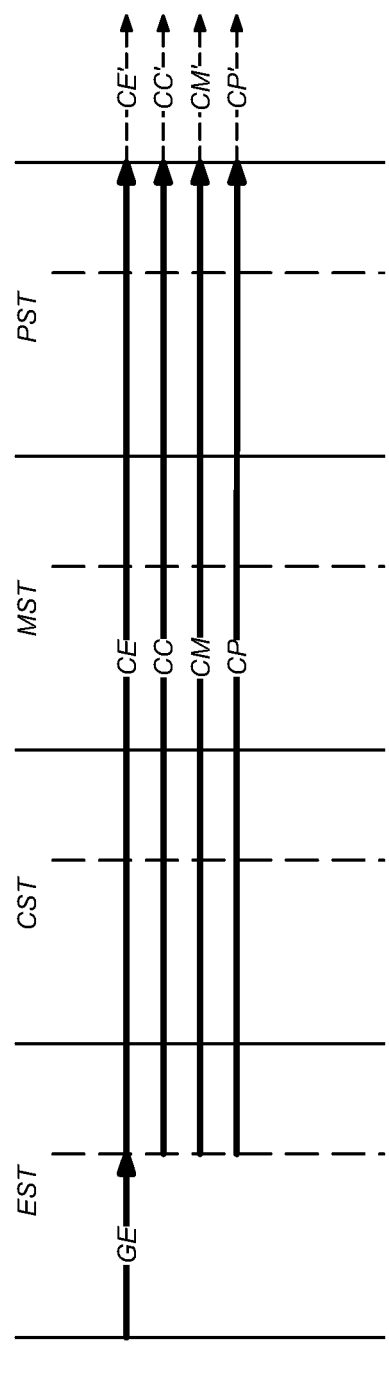

FIG. 2E is a diagram of fifth voting paradigm. In this paradigm, the gamification period begins at the beginning of the broadcast in the temporally first (e.g. EST) time zone, and ends a period of time before completion of the broadcast in the temporally first time zone. The commit period for all subsequent time zones begins at the end of the gamification period and extends until the completion of the last rebroadcast of the program in the temporally last time zone. Hence, in the first time zone, the first period can be defined to extend from the beginning of the broadcast of the media program in the temporally first time zone, and extending to at least the end of the rebroadcast of the media program in the temporally last time zone, while for all other time zones, the first period and second period both extend from a period of time before completion of the broadcast in the temporally first time zone, and extends until the end of the rebroadcast of the media program in the temporally last time zone.

Figure 3A:
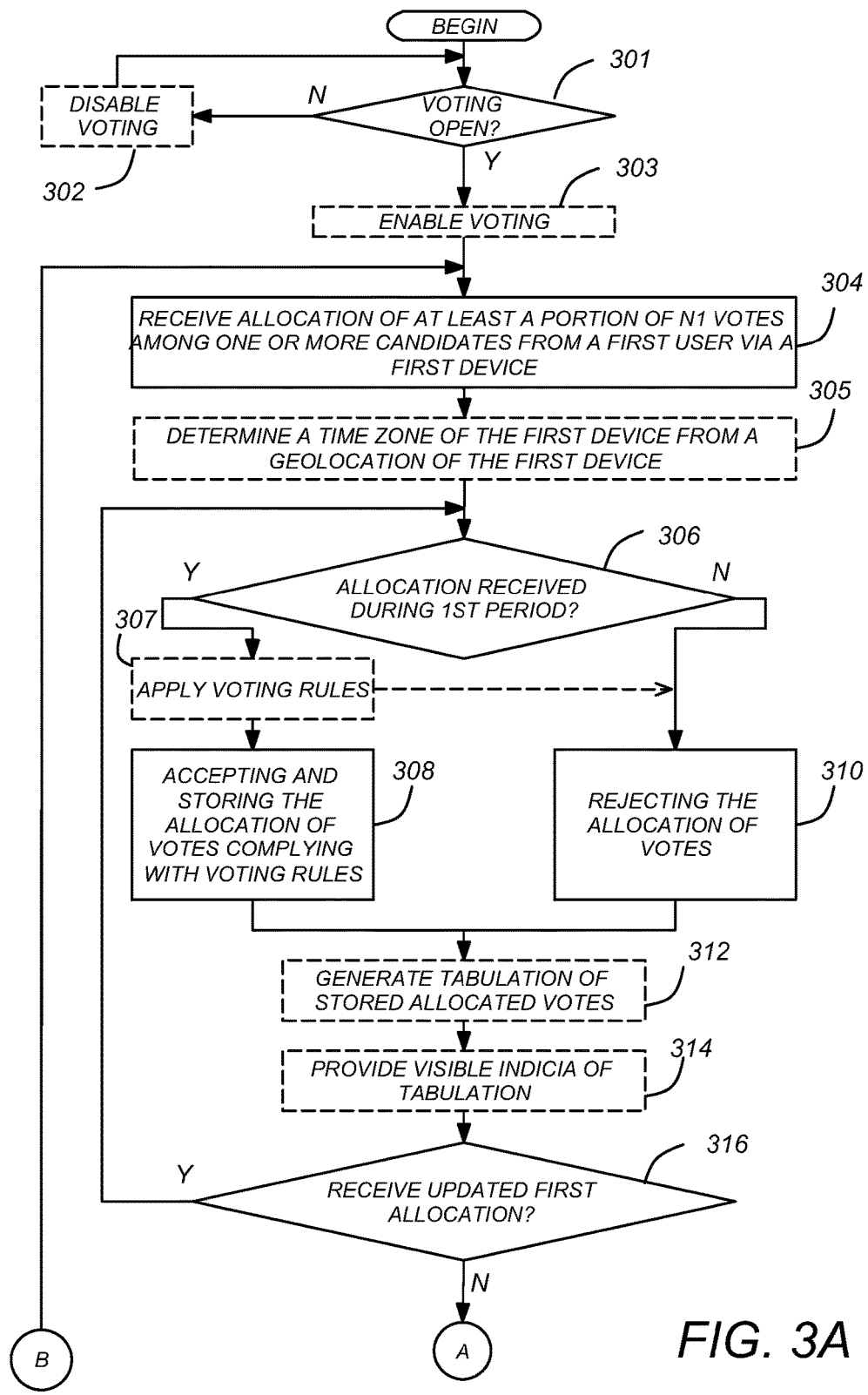
FIGS. 3A and 3B are diagrams illustrating one embodiment of a voting process.
Figure 3B:
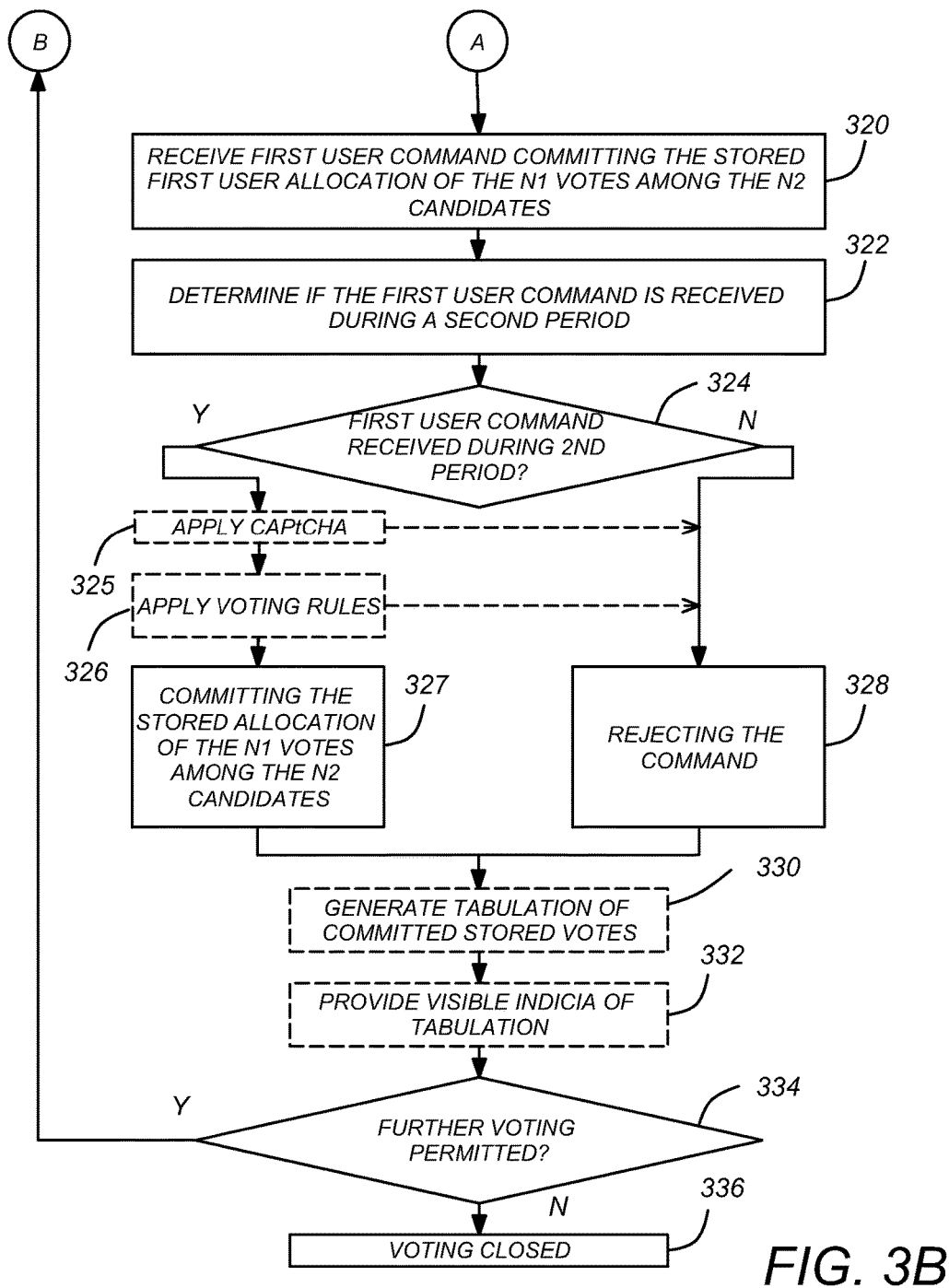

FIGS. 3A and 3B are diagrams illustrating one embodiment of a voting process. Turning first to FIG. 3A, a determination is made (e.g. by the headend, 102 or other entity in the EVS 100) whether the voting process is open, as shown in block 301. In one embodiment, the voting process is not opened until the beginning of the broadcast in the temporally first time zone, however other embodiments are possible wherein the voting process can be opened before such broadcast begins. For example, data describing the candidates for an upcoming broadcast may be transmitted to the user devices 104 before such broadcast so that users 112 can view the candidates and prepare to allocate or commit votes. If the voting process is not open, block 302 disables voting. In one embodiment, this is accomplished by simply refraining from transmitting data that the user devices 104 need to begin the voting process. Absent such data, voting will be disabled for all users. This can be accomplished, for example, by transmitting a webpage or similar interface to the user devices only after the beginning of the transmission of the media program in the earliest time zone or the time zone in which the user device is located. If the voting process is open, block 303 enables voting. Enabling voting may comprise, for example, transmitting data implementing the voting interface to user devices 104.

Voting enablement may also be based on geolocation (further described below) of the user device 104, for example, voting may be limited only to certain countries, states or other regions, and voting enablement may be performed by time zone if desired.

After voting has been enabled, an allocation of votes may be received, as shown in block 304. The allocation of votes is transmitted by the user device 102, and in one embodiment, received by the third party tabulator 118.

In some of the voting paradigms illustrated in FIGS. 2A-2E, it is required to determine the time zone in which the user device 104 is located. In such paradigms as required, block 305 (dashed to indicate its optional nature) determines the time zone in which the user device 104 that transmitted the allocation of votes. In one embodiment, this is accomplished via a geolocation process. Geolocation may be accomplished using different techniques, depending on the user device 104. For example, tablets, desktop computers and laptop computers can be geolocated to sufficient accuracy using the IP address of the user device. Cellphones can be geolocated by the cellphone tower they communicate with, or via data obtained from a global positioning system (GPS). Geolocation can also be performed by programming the user device application 114 to query the user to enter their zip code or other geolocation information.

In block 306, an assessment may be made regarding whether the vote allocation was received during a first time period (for example, the gamification and commit (GX+CX) periods described above). If the allocation of votes was received during the first period, the allocated votes are accepted and stored, as shown in block 308. If the allocation of votes was not received during the first period, the allocation of votes is rejected, as shown in block 310. Rejection may be accomplished by the user device 104, third party tabulator 118, or other entity. For example, if the user attempts to enter more votes than the maximum allowed, the user device 104 may prevent the user 112 from doing so, or the user device 104 may transmit such allocation, and the third party tabulator 118 may reject the votes and transmit a message indicating as such to the user device 104 for display to the user 112.

Other voting rules may be imposed at this point in the voting process, before the allocation of votes is accepted and stored, as shown in dashed block 307. For example, one possible voting rule is that the number of votes allocated does not exceed a maximum number N1 of votes allocated to the user to distribute among N2 candidates. Another possible voting rule is that the total number of votes does not exceed the maximum number (N1 to distribute among the N2 candidates, and that no candidate can receive more than M votes). If the received vote allocation or violates other voting rules, that may also result in the rejection described in block 310, as shown by the dashed line from block 307 to block 310. In other embodiments, such voting rules are applied when the votes are committed, not when they are allocated. Further, different voting rules may be imposed for committal than for allocation, if desired.

Blocks 312 and 314 optionally generate a tabulation of the stored allocated votes of the voting user and with other users, and provides a visible indicia of that generated tabulation. The tabulation and indicia are further described below.

In one embodiment, the user 112 can reallocate votes that have been already allocated. For example, the user may have allocated 15 votes to candidate A and 5 votes to candidate B, have changed their minds, and reallocate 10 votes to candidate A and 10 votes to candidate B. In block 316, it is determined whether a message was received to reallocate the already allocated votes. If such a message was received, processing is routed to block 306.

The illustrated process allows the user 112 to use more than one user device 104 to participate in the voting process. Hence, a user may perform the initial allocation of votes using a computer at home, reallocate those votes using a different computer at work, or using a cellphone. Likewise, the process of committing allocated votes may be performed on different devices as well. Accordingly, block 306 rechecks to determine the time zone of the user device 104 from which the reallocation was received, and processing is performed as previously described. The first allocation of votes from the user 112 can also be a subset of the available votes, with the remaining votes allocated in subsequent messages from the user device 104.

Turning again to the generation and tabulation illustrated in blocks 312 and 314, a tabulation of the stored allocated votes for all users 112 can be optionally generated (e.g. by the third party tabulator 118), even before those votes are committed to any candidate. The generated tabulation can also be provided in the form of a visible indicia on the user device 104 or whatever device is displaying the media program (which may be a different user device 104).

For example, if the user 112 is using a cellphone to enter votes while viewing the media program, a tabulation of the user's stored allocation of votes (along with a tabulation of other user votes) can be generated and transmitted, optionally in real time (as received and processed) for inclusion within the broadcast of the media program itself. Hence, while watching the media program, the user 112 can see the total number of votes being allocated to each candidate by the plurality of voters or the fraction or percentage of votes being allocated to each candidate. Also, it is possible for the voting application 114 itself to provide the allocated vote tabulation aggregated across all users (e.g. anonymized votes or percentage of votes received by each candidate from all users), so that while the user 112 is allocating votes for their favorites, they can see how other users have allocated their votes.

One difficulty encountered in the display of tabulated committed stored votes arises because the media program can be broadcast in different time zones, with different users viewing the media program in the time zones. For example, in the first time zone (e.g. EST), a tabulation of stored allocated votes may be generated and included as a small bug or icon overlaid upon the live broadcast media program indicating the allocated vote count or percentage, so that the user 112 can see the application of their allocated votes and see how others have applied them. However, in later time zones, the broadcast is no longer live (although it appears live to the viewer in that time zone), and any tabulation that is similarly integrated into earlier broadcast will not generally reflect the tabulation of votes within the later time zone (since the rebroadcast is typically identical in content to the initial broadcast, including added indicia that indicates the tabulation).

For example, thirty minutes into the broadcast in the EST time zone, the media program may be augmented with a bug or other visual indicia showing the votes allocated to each candidate by all of the users. If that same media program is rebroadcast with the same bug, a viewer in the CST time zone will be provided with an incorrect voting tabulation (as they will be viewing the votes tabulated in the EST time zone 30 minutes into the live broadcast). This problem can be ameliorated by an embodiment in which a supplementary or substitute indicia is provided to reflect the allocated votes made by users in the second (CST) time zone. That supplementary or substitute indicia may show voting of earlier time zones, by time zone (e.g. show the votes allocated at the 30 minute point of the broadcast of the live media program by users in the EST time zone, and in another indicia, showing the votes allocated at the 30 minute point of the rebroadcast of the media program by voters in the CST time zone). Or, a single indicia may present the sum of the allocated votes in both the EST and CST time zone at the particular point of the media program, or just the votes allocated by users in the CST time zone.

Such indicia may be added by the headend 102 to the broadcast or rebroadcast signal, or may be added by the user device 104, either to the voting interface or to the interface for viewing the media program.

If the supplementary or substitute indicia is added by the headend 102, the votes from users in the second (CST) time zone are tabulated and those votes may be added as an additional indicia presented concurrently with (and optionally, overlaid upon) the media program presentation. Or, the vote tabulation for the second time zone may be overlaid over the indicia that was overlaid over the media program in the first (EST) time zone.

For example, the data for the indicia (the tabulation) can be transmitted from the headend 102 or third party tabulator 118 as data, and processed for display as an bug or other indicia on a screen of the user device for concurrent display with broadcast/rebroadcast of the media program. If the user device also used to view the media program as well as view it, the indicia may be overlaid on media program itself. In subsequent time zones, user vote allocations for that time zone (or alternatively, that time zone and all time zones in which the media program has already been transmitted) can be illustrated with indicia which overlays or replaces the indicia that was inserted into the first broadcast in the first time zone.

Tabulation indicia added by the user device 104 may be added to the interface used to display the broadcast/rebroadcast of the media program (e.g. inserting or overlaying a bug on frames of the media program), or may be added or integrated with the displays provided by the voting application 114. For example, referring to FIG. 9, the vote allocation tally or percentages give to teach candidate may be presented on the display. Since this information is sent to particular users known to be in certain time zones rather than as part of the broadcast signal, this ameliorates the need to update the visual indicia overlaying the media program in the broadcast signal. Such information may also be provided in a similar way for the tabulated committed votes further described below.

Tuning to FIG. 3B, a user command committing the stored allocation of votes is received block 320. In block 322, an assessment is made to determine if the user command committing the stored allocation of votes is received during the second period (e.g. the commit period). Although not illustrated, an assessment can also be made to again confirm the time zone in which the user device 104 from which the command is received. If the command is received during the second period, block 324 routes processing to block 325 where CAPTCHA processing (further described below) is executed to assure that the data was entered by a human being. Processing is then routed to block 327, which, after applying other voting rules as shown in block 326 commits the stored allocation of votes among the N2 candidates. If the command is not received during the second period, block 324 routes processing to block 328, which rejects the command. In one embodiment, the CAPTCHA processing shown in block 325 is only performed once for each contest for which voting is offered. Future passes through this processing path (e.g. when the user allocates and commits only a subset of available votes can optionally skip the CAPTCHA processing. The decision to skip CAPTCHA processing may be based, for example on how much time has elapsed since the last CAPTCHA processing was successfully performed or based on when voting for the program closes. In one embodiment, a message is transmitted to the user device 104 indicating that the command was rejected because the commit period has not begun or has expired.

Block 330 illustrates the generation of a tabulation of stored votes which have been committed. The tabulation includes the committed votes for the user 112 and other users participating in the voting process. Block 332 illustrates providing a visible indicia of the generated tabulation. As described with respect to FIG. 3A, the visible indicia may be provided on the user device(s) 104 used to allocate and/or commit votes or on another device such as the user device 104 used to view the media program. Tabulations of committed votes may be displayed using the techniques described above with respect to allocated votes.

Block 330 determines whether additional voting (allocation and/or committal) is permitted (for example, whether the time is beyond any of the embodiments of the commit periods of the paradigms illustrated in FIGS. 2A-2D. Additional voting may be permitted, for example, in embodiments wherein the user 112 has allocated a subset of votes for a candidate, committed the votes, and then wishes to return to allocate some of the remaining votes for another candidate. If additional voting is permitted, processing is routed back to block 302, where the additional allocation/committal can proceed.

The operations shown in FIGS. 3A and 3B and discussed above may be performed by any combination of the user device 104 via a browser, by the user device 104 executing the voting application 114, by the headend 102, the third party tabulator 118, and the web host 116. For example, accepting allocation of votes, determining time zones, determining when allocation is received, applying voting rules, and other operations may be performed by user device 104, third party tabulator 118, headend 102, or any combination thereof.

Figure 4:
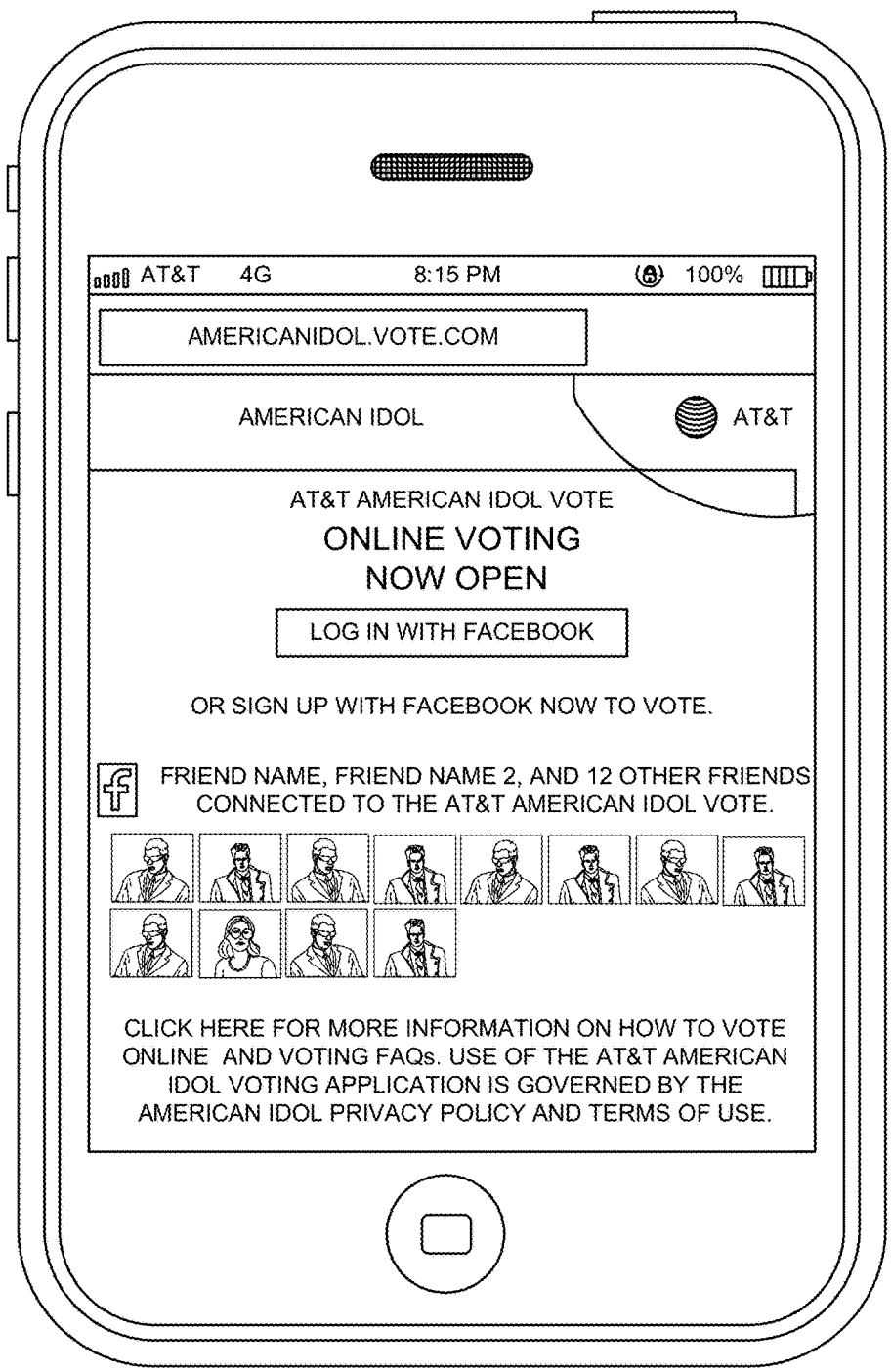
FIG. 4 is a diagram presenting an initial interface for voting operations.

FIGS. 4-38 are diagrams illustrating embodiments of the voting process via an executing application 114. In the illustrated embodiment, the user 112 is given the option of logging in using a social networking application such as FACEBOOK. As shown in FIG. 4, the user 112 may be provided with information regarding which other of their friends or contacts are connected to the voting application.

Figure 5:
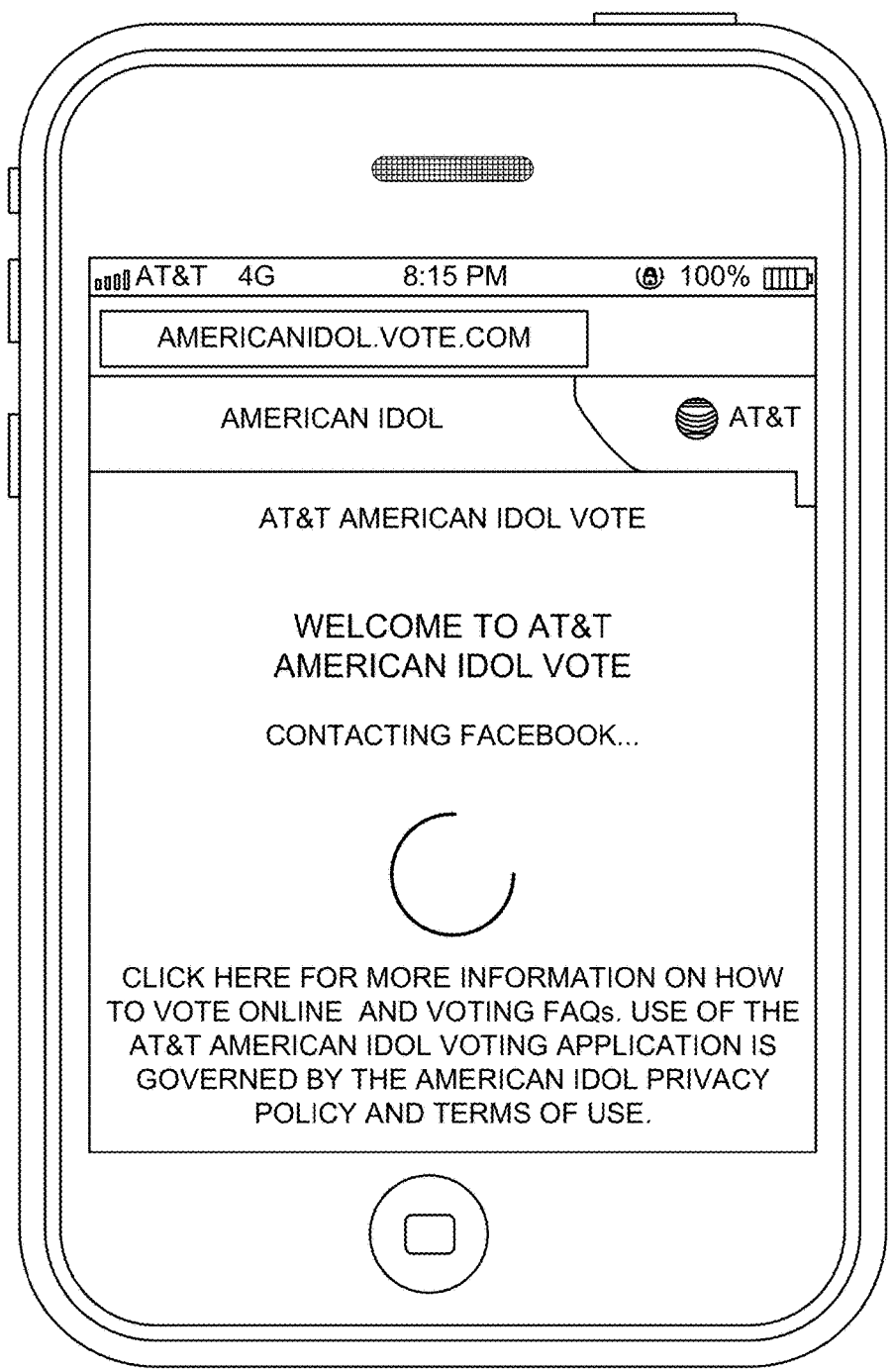
FIG. 5 is a diagram illustrating the appearance of the user interface after the user has attempted to log in via the social networking application executed by the mobile phone.

FIG. 5 is a diagram illustrating the appearance of the user interface after the user has attempted to log in via the social networking application executed by the mobile phone.

Figure 6:
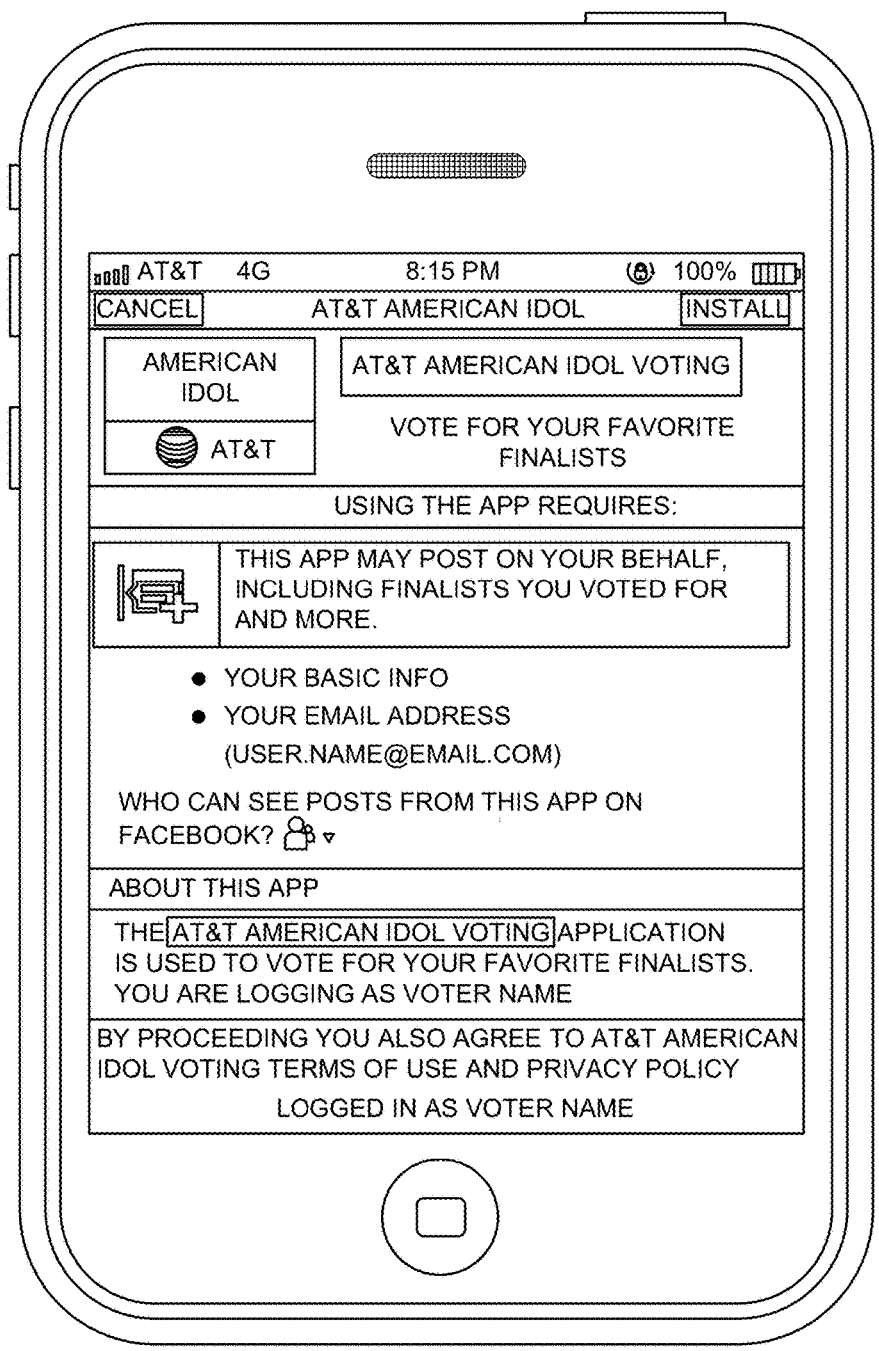
FIG. 6 is a diagram illustrating an interface presented to query the user regarding whether they authorize the application to be installed and used within the social networking application.

FIG. 6 is a diagram illustrating an interface presented to query the user regarding whether they authorize the application 114 to be installed and used within the social networking application. The interface indicates what the application 114 requires, who can see posts from the application 114, and other information. If the user wishes to install the application 114 to permit voting, they select "install," otherwise, they select "cancel." If they select install, the application 114 is downloaded from the headend 102, webhost 110, or the third party tabulator 118. Once downloaded and installed, the application 114 is executed.

Figure 7:
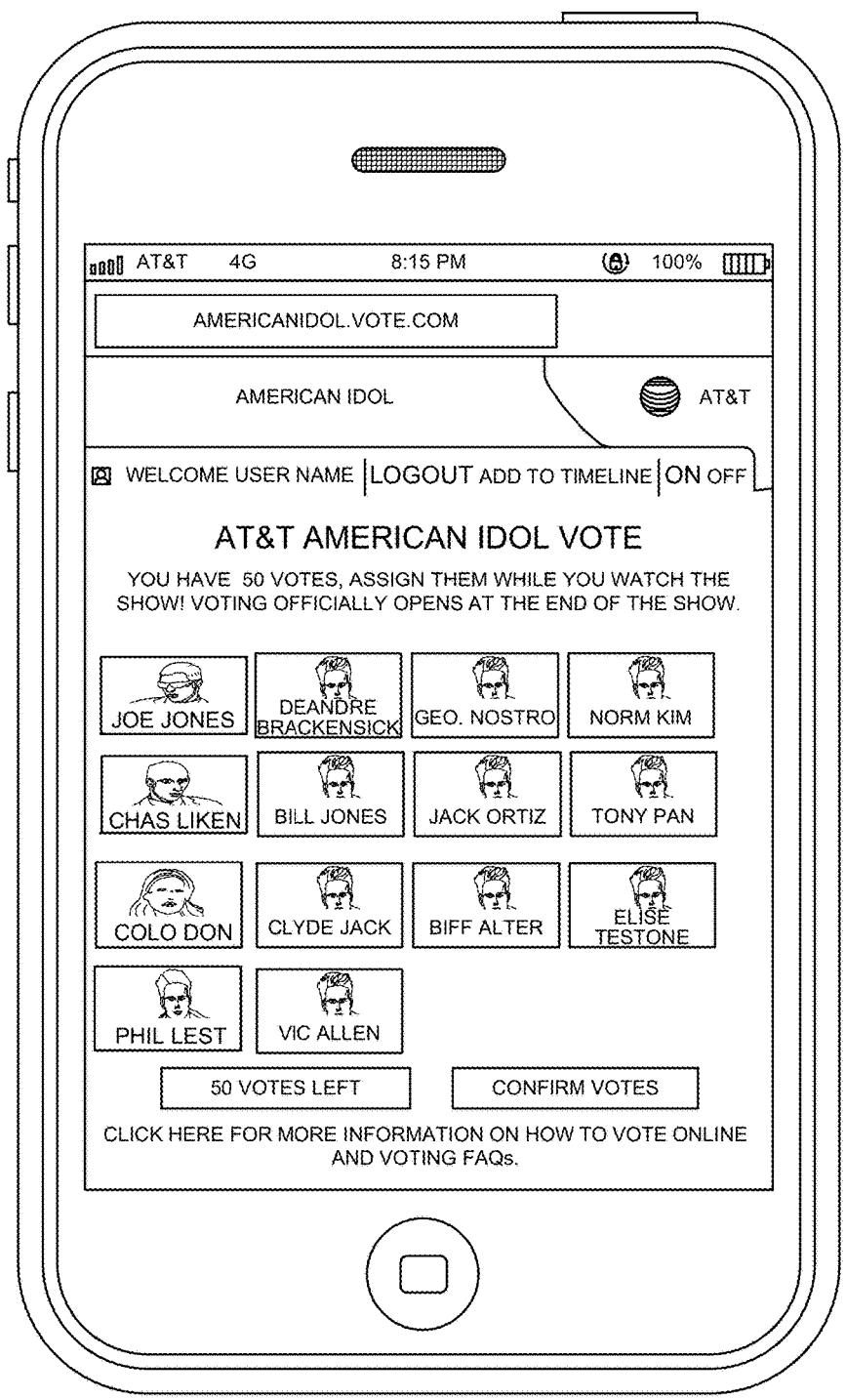
FIG. 7 is a diagram illustrating and interface presented by the application when the user 112 has entered the pre-commitment phase with no votes allocated.

FIG. 7 is a diagram illustrating and interface presented by the application 114 when the user 112 has entered the pre-commitment phase with no votes allocated. In the illustrated embodiment, a plurality of contestants are presented (the illustrated embodiment shows only one name and photo, but each placeholder will have a different contestant's name and/or photo). The user 112 can use the user device 104 to select one of the contestants to allocate votes for by touching the image, which will present the user interface shown in FIG. 8. The number of votes available to be cast may also be indicated.

Figure 8:
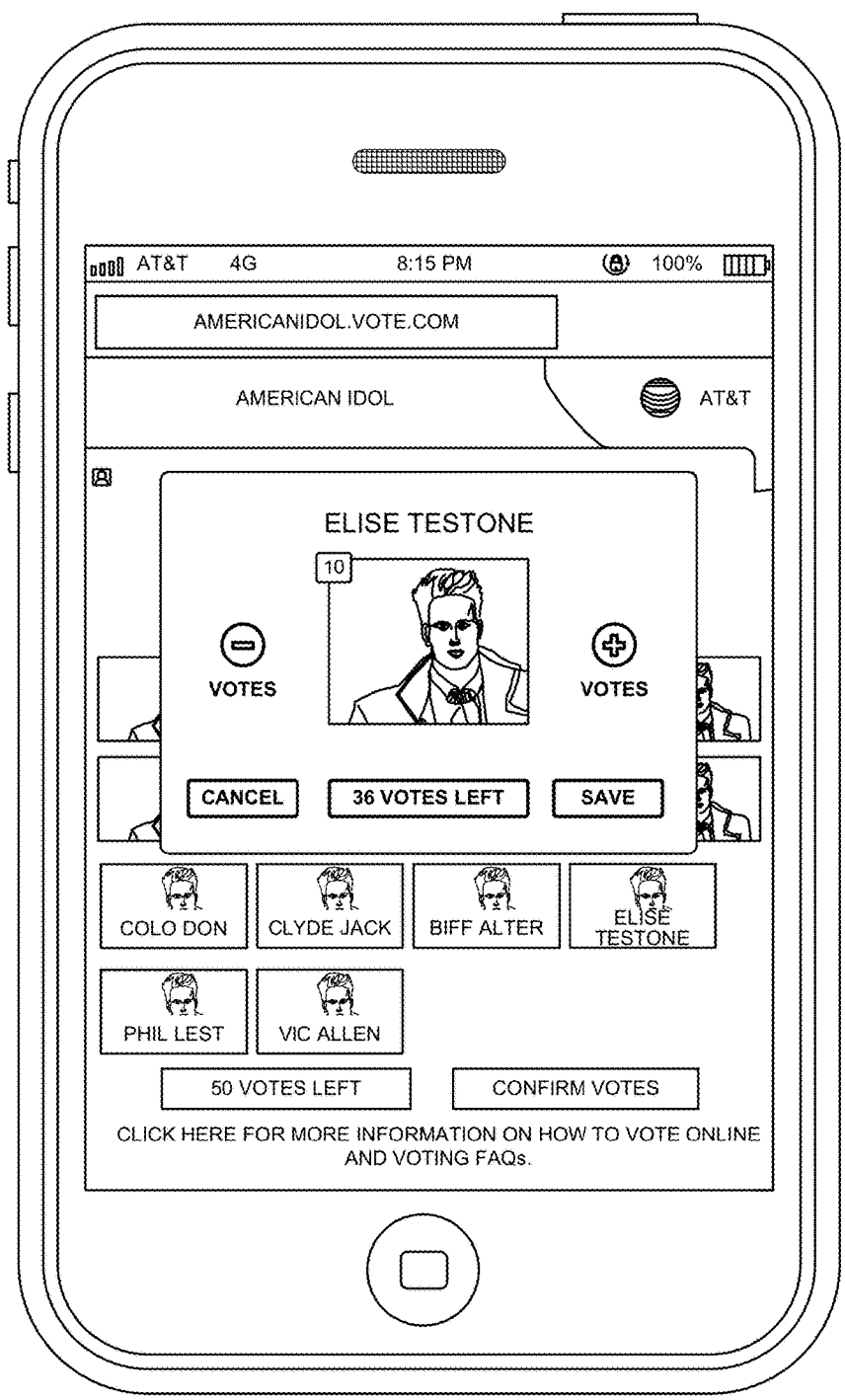
FIG. 8 is a diagram illustrating the user interface after the user has selected a candidate and has entered the vote allocation sub-phase of the pre-commitment phase.

FIG. 8 is a diagram illustrating the user interface after the user has selected a candidate and has entered the vote allocation sub-phase of the pre-commitment phase. A photo of the candidate is shown, and the user can add votes to the illustrated candidate by selecting the "+" control. Each selection of the "+" control adds a vote. The user may remove votes by selecting the "−" control. The number of votes allocated for the candidate is shown, as well as how many votes the user has left to allocate among all candidates. The user can select "cancel" to return to the interface shown in FIG. 7 without saving entered input, or can select "save" to save the allocated votes for the illustrated candidate. For exemplary purposes, we assume the user has allocated four votes for the illustrated candidate, selected "save", thus returning to the user interface shown in FIG. 7, whereupon a second candidate was selected, and ten votes allocated to the second candidate was entered and saved.

In one embodiment, the votes are accepted and stored in the user device 104, and the operations of blocks 302-312 are performed by the user device 104. This embodiment minimizes communication with other elements of the EVS 100. However, if the user 112 is to use more than one device to vote (for example, allocate votes with a user device 104 convenient to them during the broadcast (e.g. a cellphone or tablet computer) and commit the votes with a user device 104 convenient to them the next morning (e.g. a work computer), those locally stored allocations and commitments must be transmitted to the second user device 104 for local storage. Hence, in another embodiment, the vote are accepted and temporarily stored in the user device 104, then transmitted to the third party tabulator 118 which receives and stores the votes. In this embodiment, the operations of blocks 302-312 are performed by the third party tabulator 118.

Figure 9:
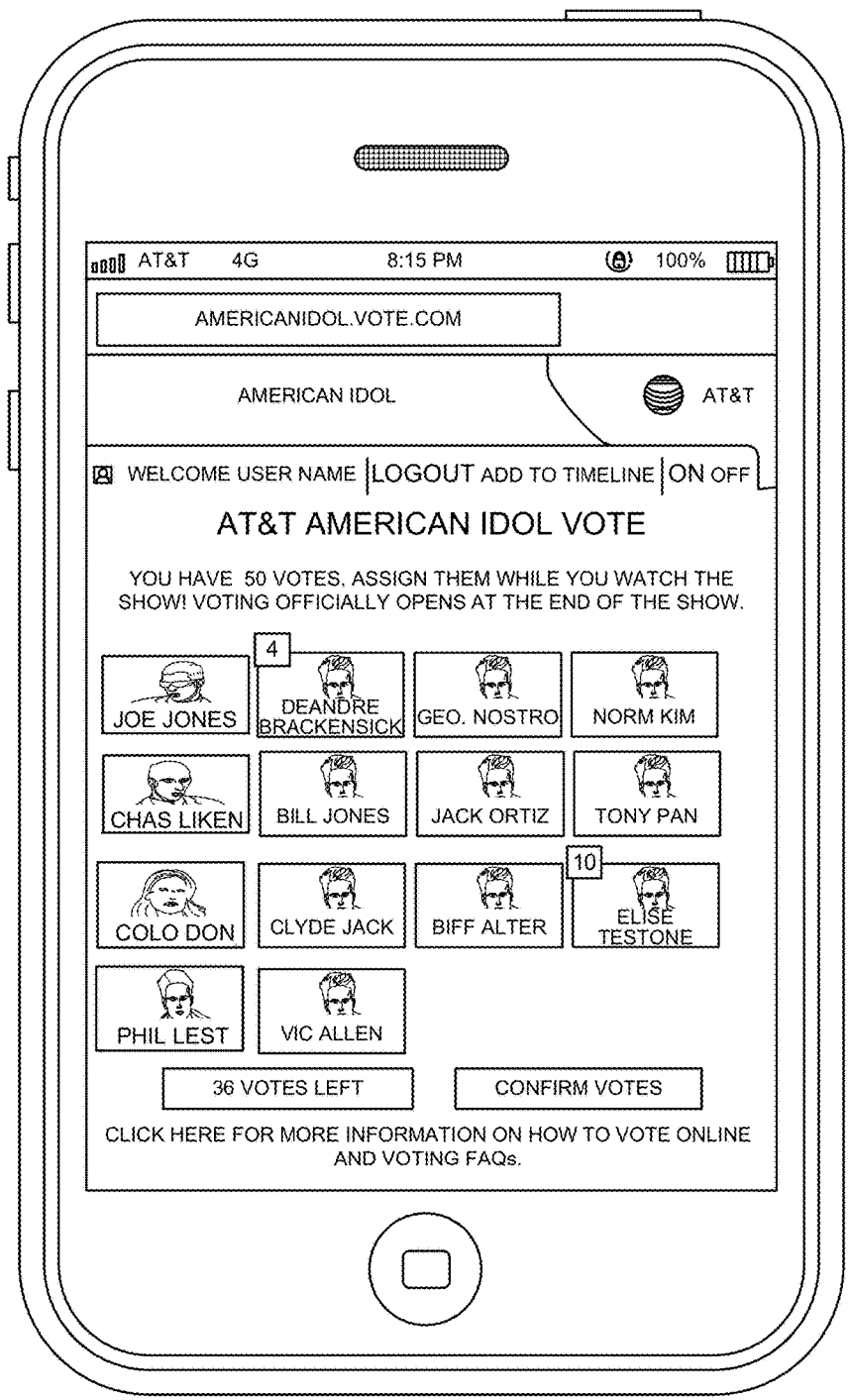
FIG. 9 is a diagram illustrating the user interface after the user has entered votes for two candidates and has left the allocation sub-phase of the pre-voting phase.

FIG. 9 is a diagram illustrating the user interface after the user has entered votes for two candidates and has left the allocation sub-phase of the pre-voting phase. In this case, four votes have been assigned to one candidate and ten votes have been assigned to another candidate. Note that since fourteen votes have been cast out of the fifty available votes, the pre-voting phase interface indicates that there are 36 votes left. Also note that since votes have been allocated, they may be committed by selecting the "confirm" control.

In embodiments wherein a tabulation of the users' allocated votes is generated, the embodiment of FIG. 9 could be modified to indicate not only the vote allocation of the particular user, but the current vote allocation of other users as well. For example, the numerals "four" and "ten" shown in FIG. 9 (indicating the user's vote allocation) could be augmented with the number of votes (or percentage of the total votes) currently allocated by other users. This allows the user to alter their allocation of votes in response to other user's votes in real time.

At this point, the votes have not been committed. In one embodiment, the votes cannot be committed unless the user device is disposed in the appropriate time zone and the vote allocation is submitted during the appropriate time period. Although the votes are allocated, they may be reallocated. The votes may be committed by selecting the "confirm votes" control. This implicates the operations illustrated in FIG. 3B.

Figure 10:
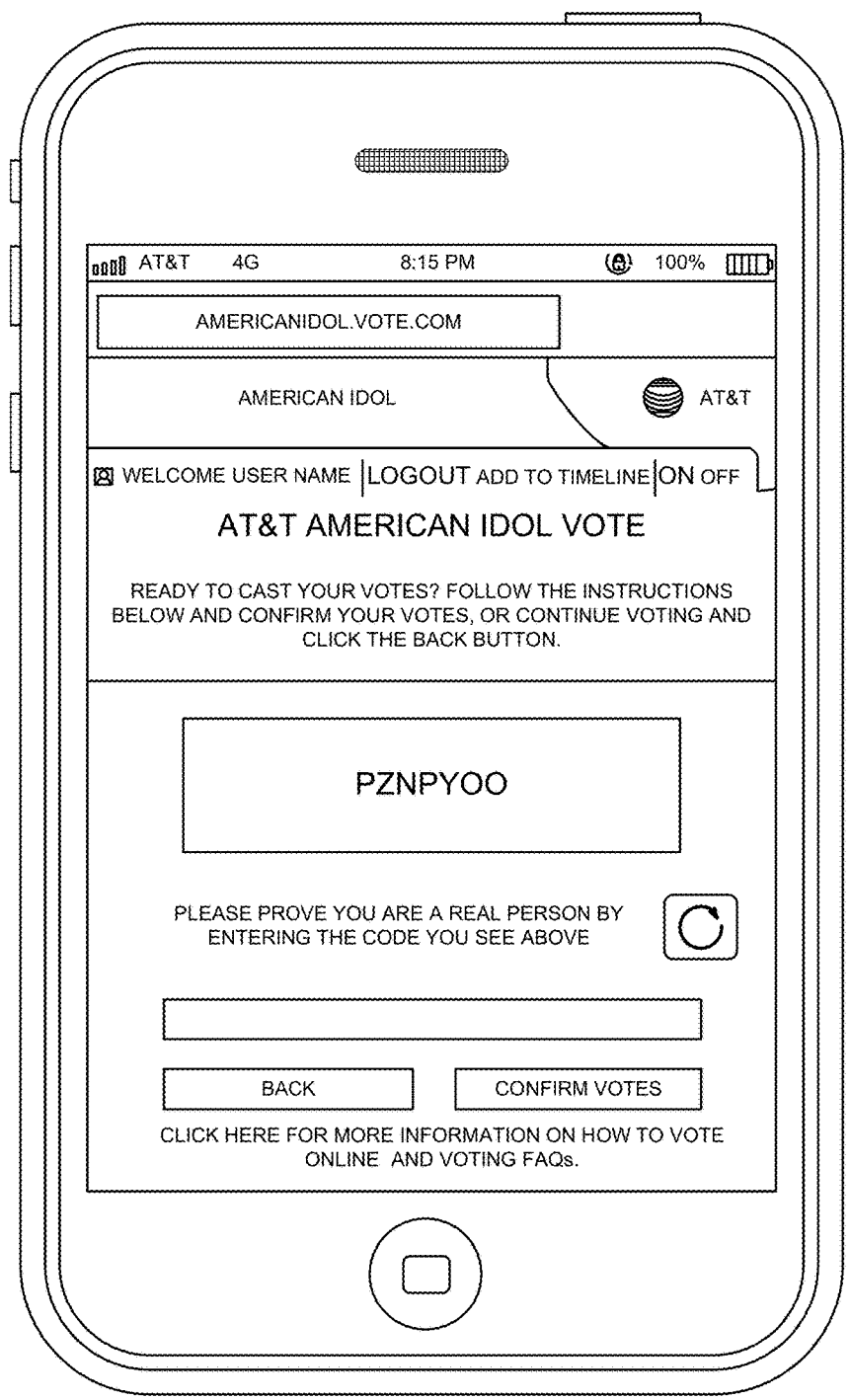
FIG. 10 is a diagram illustrating a user interface after the user has begun the process to commit the stored allocation of votes by selection of the "confirm votes" control.

FIG. 10 is a diagram illustrating a user interface after the user has begun the process to commit the stored allocation of votes by selection of the "confirm votes" control. To assure that a human being is actually confirming the votes, a CAPTCHA interface is provided (as described in block 325 of FIG. 3B), which includes test characters and an interface for the user to enter the test characters. However, once this interface is provide and the correct information produced, the CAPTCHA information need not be re-entered to commit votes for the contest depicted in the media program.

Figure 11:
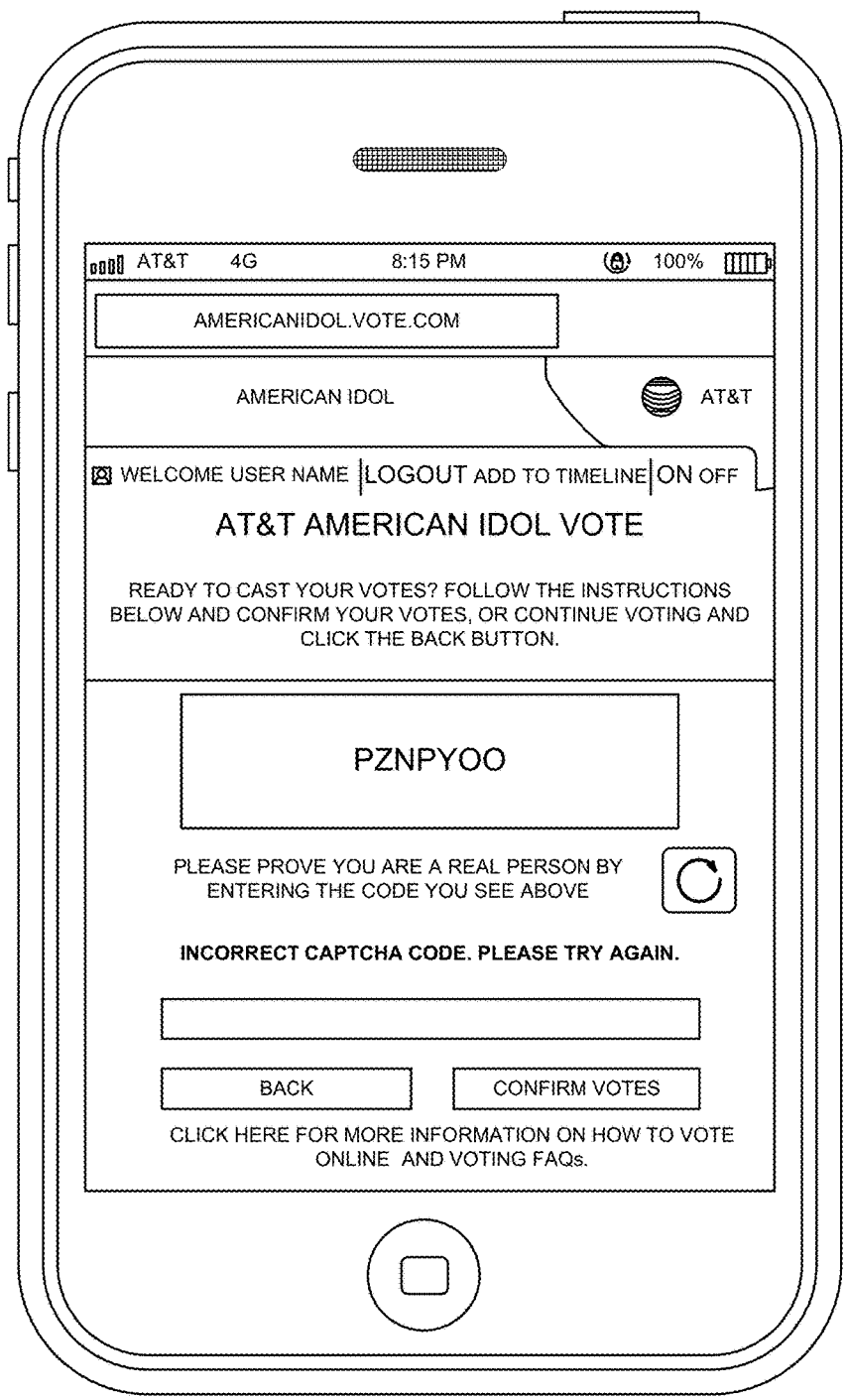
FIG. 11 is a diagram illustrating a user interface that appears if the user enters the incorrect CAPTCHA characters.

FIG. 11 is a diagram illustrating a user interface that appears if the user enters the incorrect CAPTCHA characters.

Figure 12:
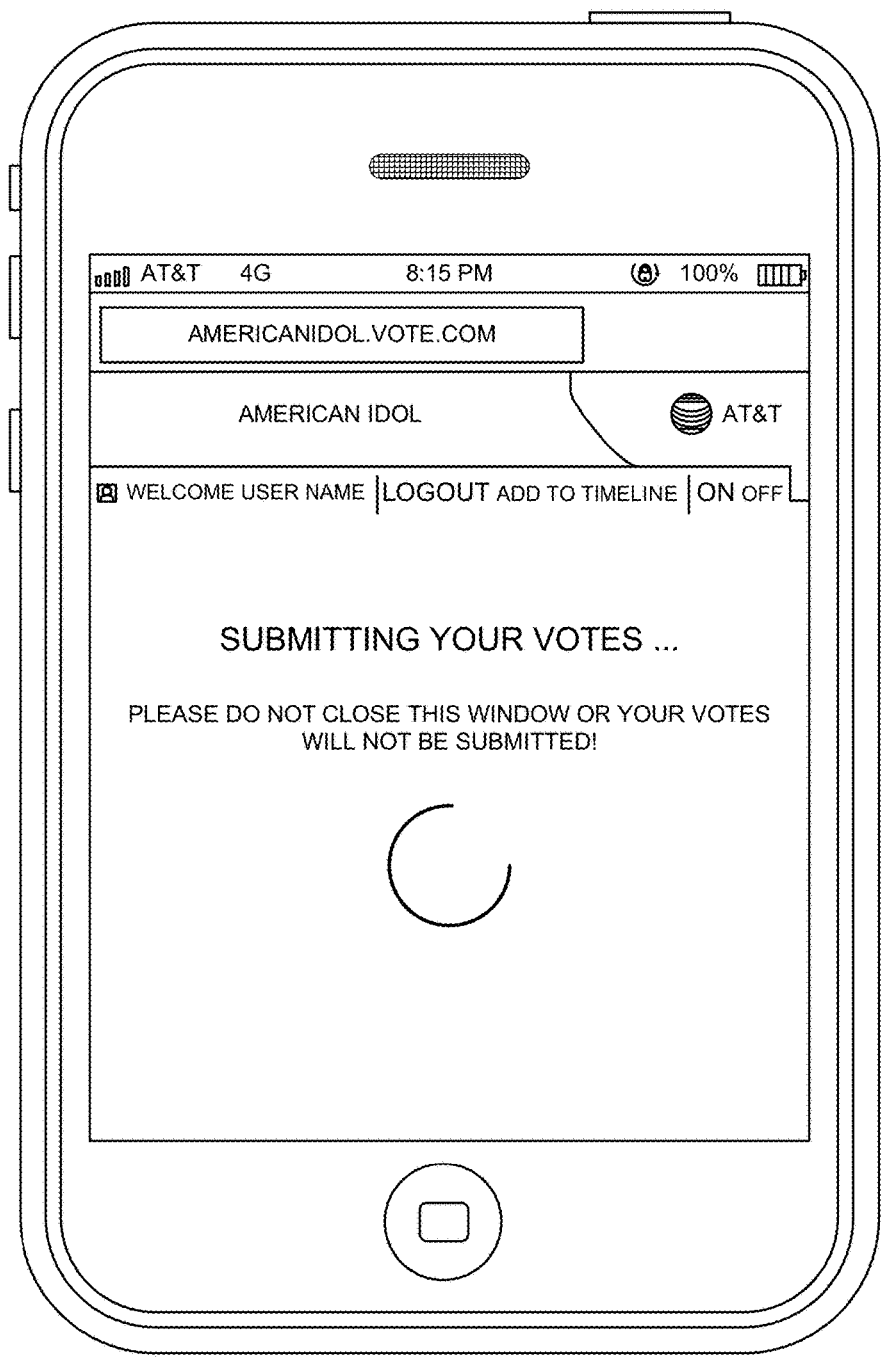
FIG. 12 is a diagram illustrating a user interface that appears in the "submitting votes" state that is entered if the user enters the correct CAPTCHA characters.

FIG. 12 is a diagram illustrating a user interface that appears in the "submitting votes" state that is entered if the user enters the correct CAPTCHA characters. The interface indicates that the person's votes are being committed.

Figure 13:
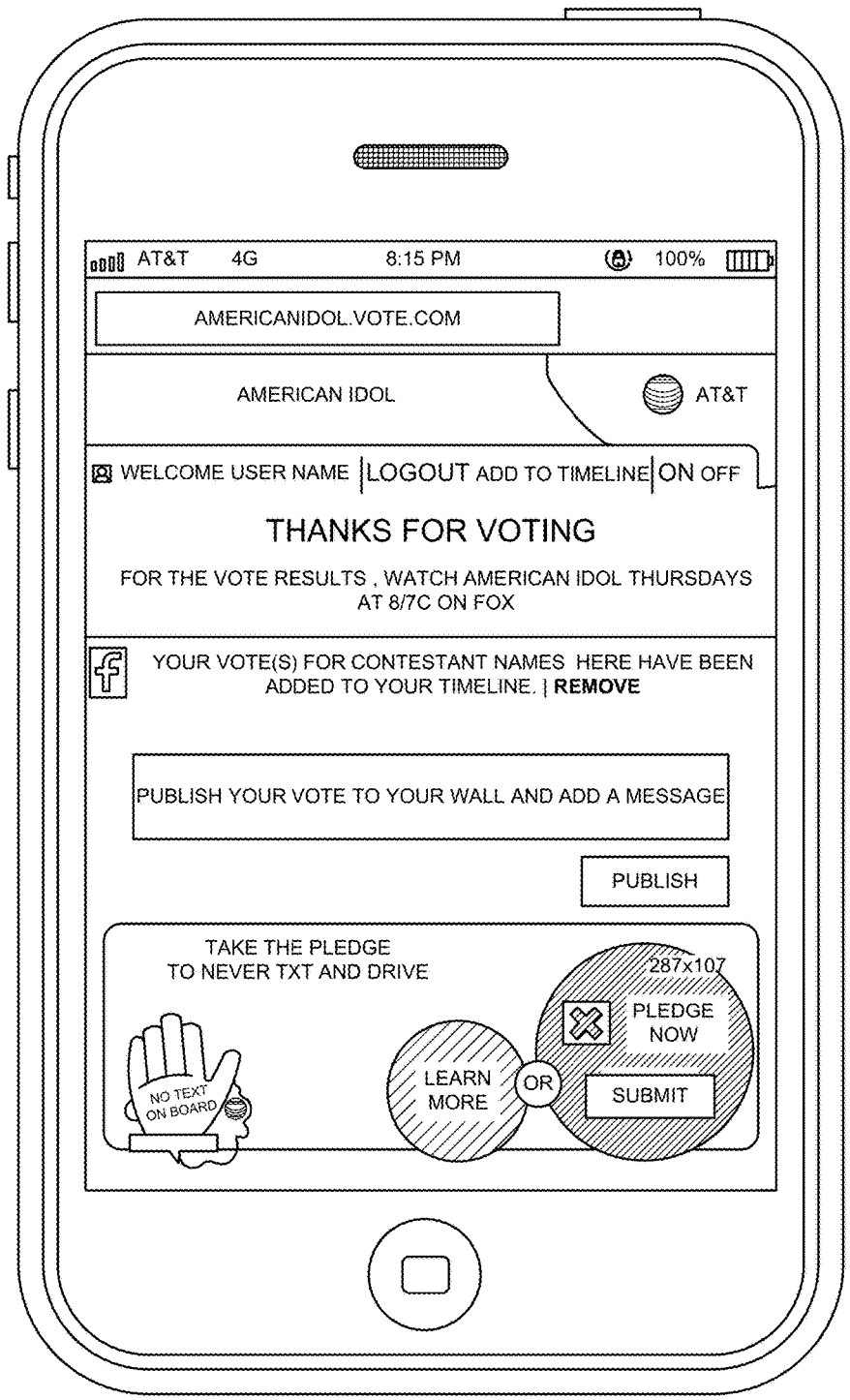
FIG. 13 is a diagram illustrating a user interface for a state in which vote activity is automatically added to the user's social network timeline.

FIG. 13 is a diagram illustrating a user interface for a state in which vote activity is automatically added to the user's social network timeline. In this case, the votes were successfully committed. This interface also includes provision to allow the user to add a personal message to be published on their social networking "wall," and includes provision to allow the user to remove the votes from the user's social networking timeline or to forego entering them into the user's social networking timeline.

Figure 14:
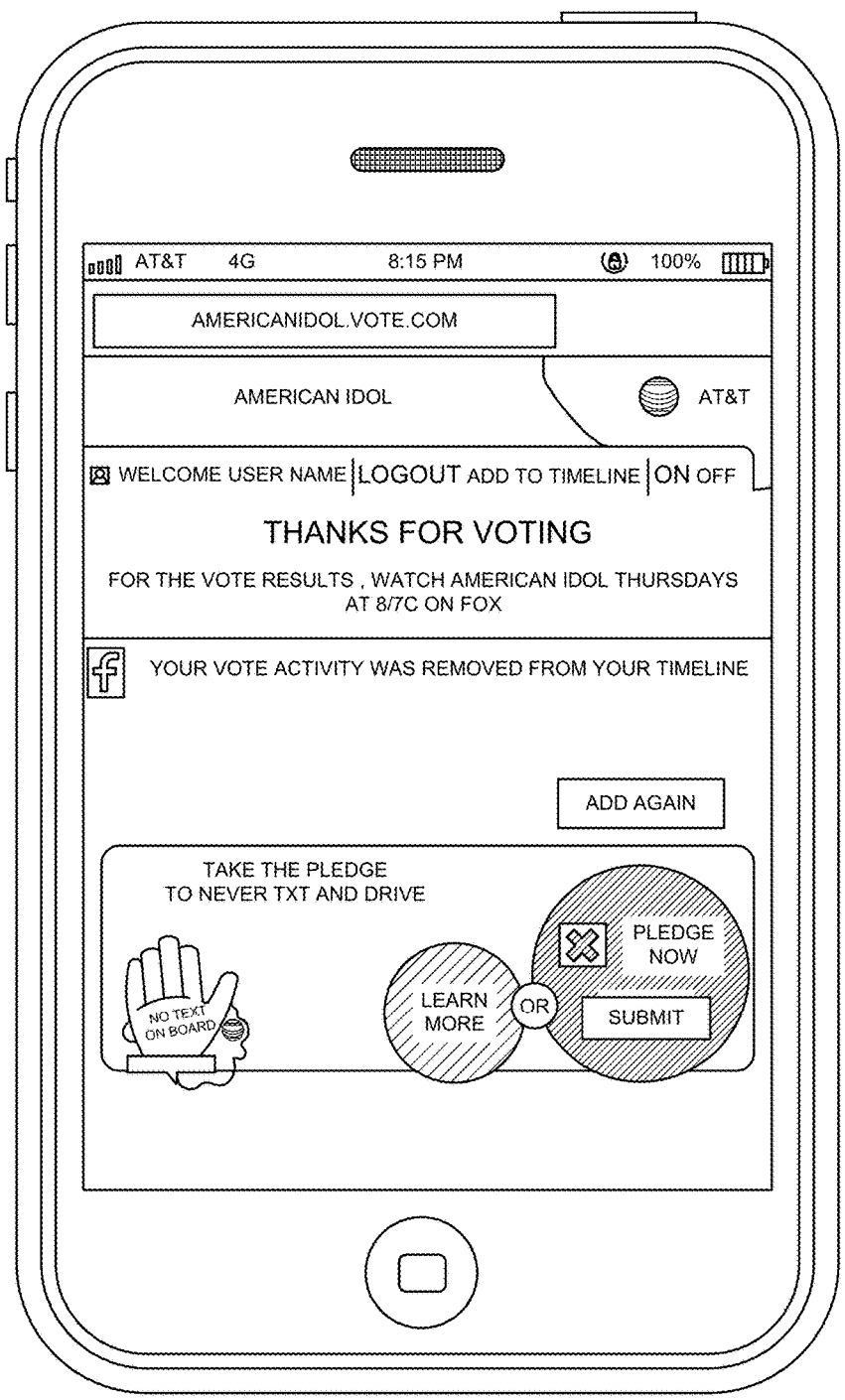
FIG. 14 is a diagram illustrating a user interface when the user has removed the voting data from their social networking timeline.

FIG. 14 is a diagram illustrating a user interface when the user has removed the voting data from their social networking timeline.

Figure 15:
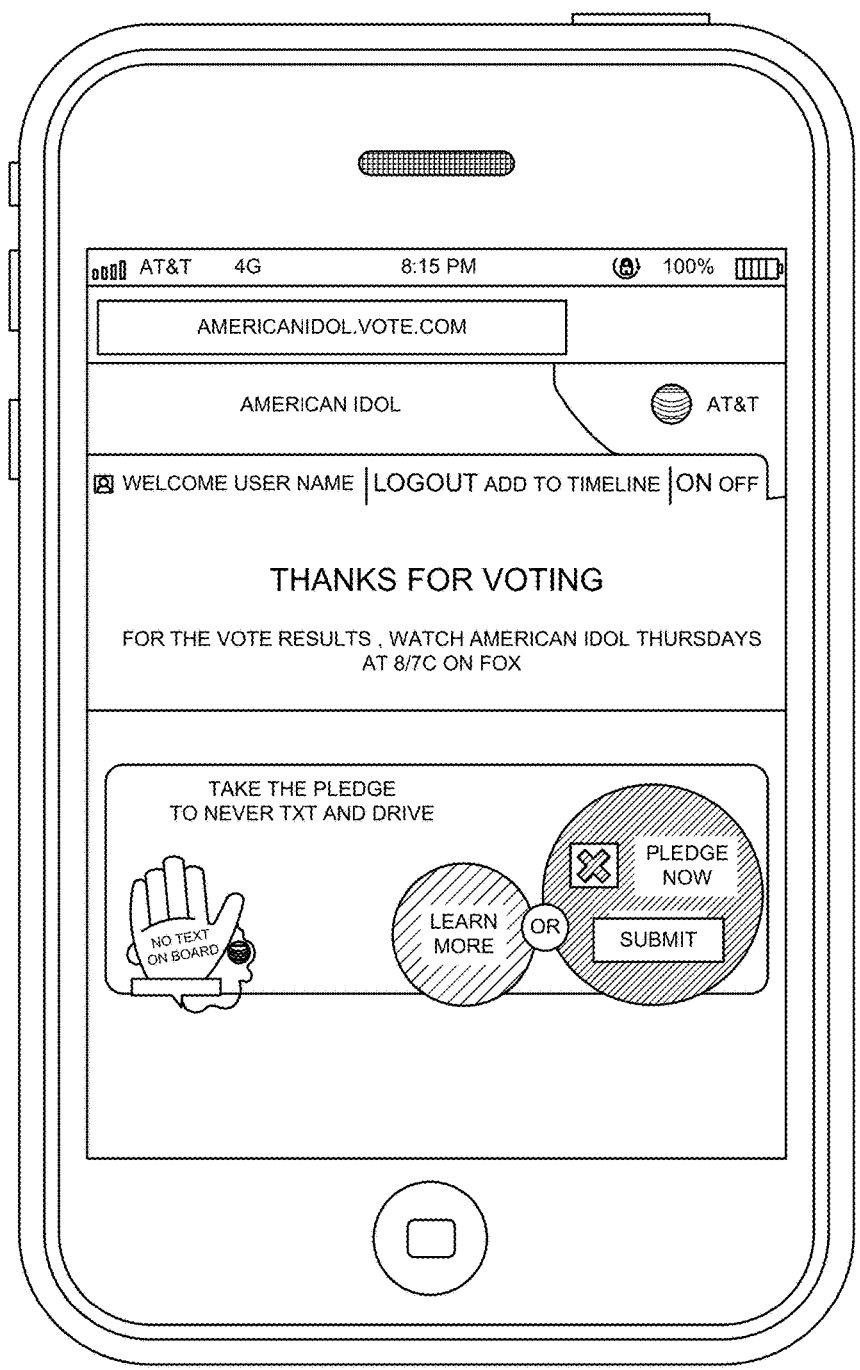
FIG. 15 is a diagram illustrating a user interface for a state in which the stored votes have been committed, and the user has already selected that they be shared on the social network.

FIG. 15 is a diagram illustrating a user interface for a state in which the stored votes have been committed, and the user has already selected that they be shared on the social network.

Figure 16:
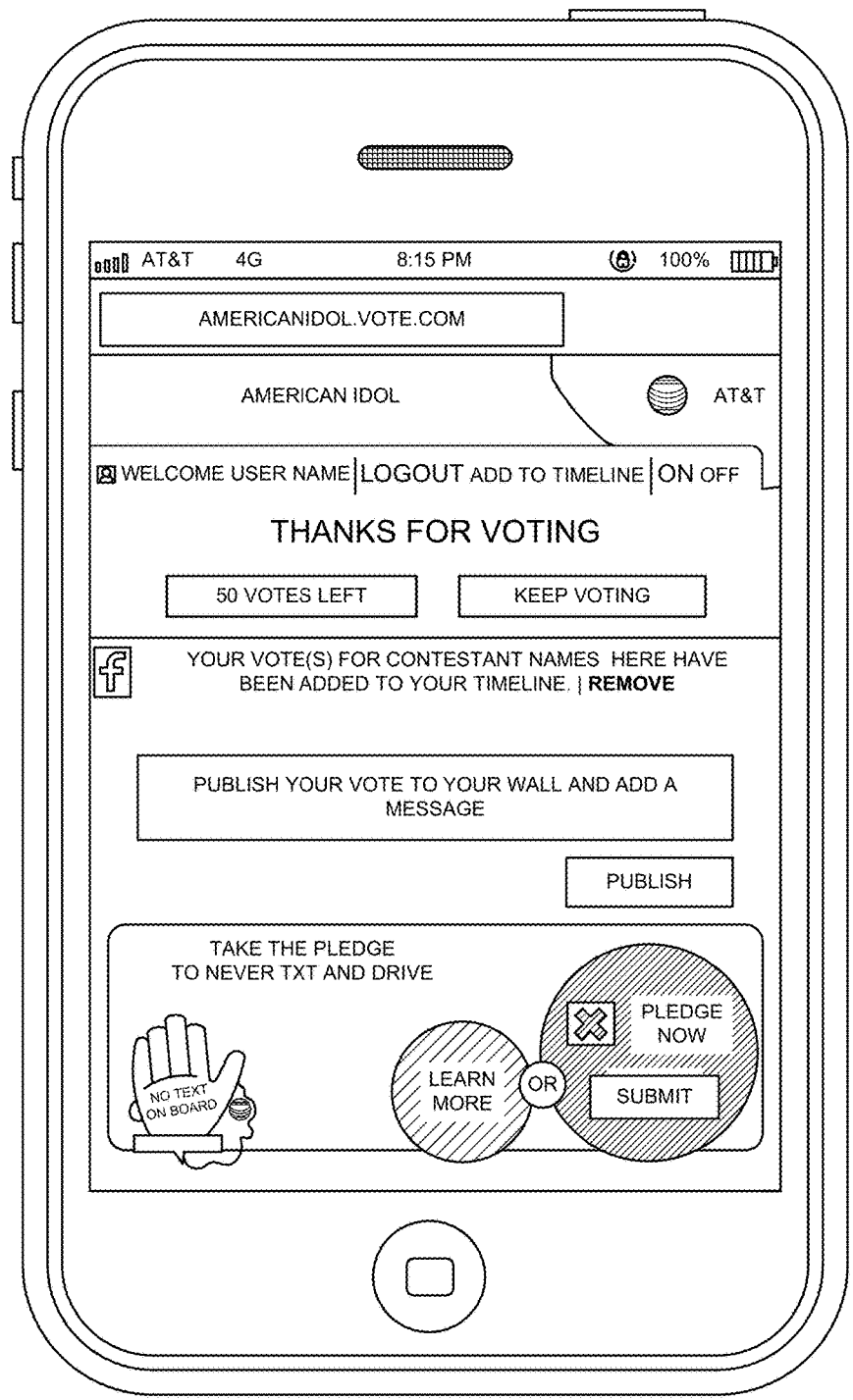
FIG. 16 is a diagram illustrating a user interface for a state in which votes for contestant A have been committed, but the user 112 has retained votes that are not committed.

FIG. 16 is a diagram illustrating a user interface for a state in which votes for contestant A have been committed, but the user 112 has retained votes that are not committed. The interface indicates how many votes are left to cast, and provides a "keep voting" control to return to the interface of FIG. 9 (e.g. block 302 of FIG. 3A) to enter more votes for allocation and committal. The interface defaults to sharing the votes on the user's social networking timeline, but that can be removed by selecting "remove." Also, a message may be added by typing the message into the text box and selecting "publish."

Figure 17:
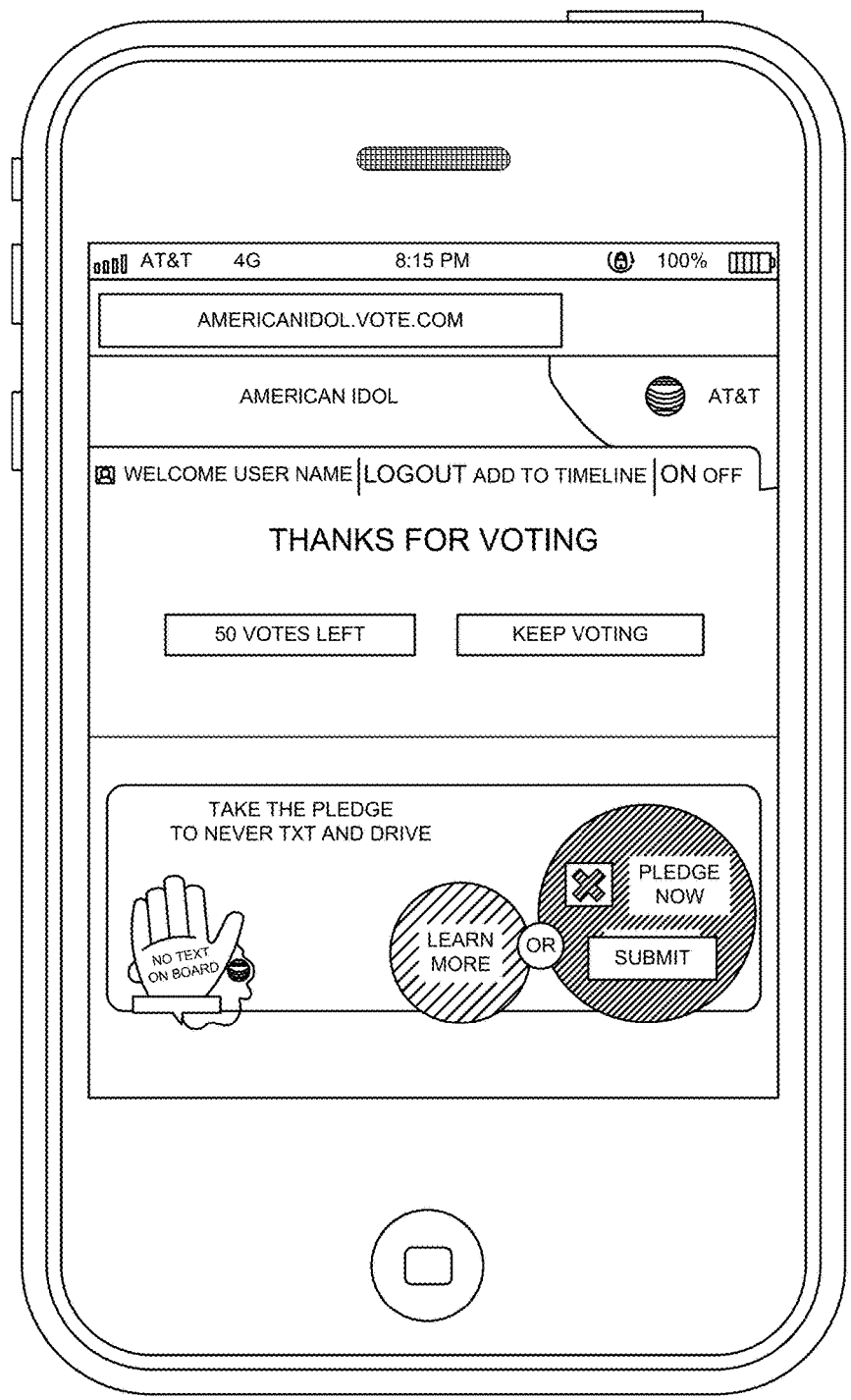
FIG. 17 is a diagram illustrating a user interface for a state in which a subset of the available votes have been committed, but sharing was not selected.

FIG. 17 is a diagram illustrating a user interface for a state in which a subset of the available votes have been committed, but sharing was not selected.

Figure 18:
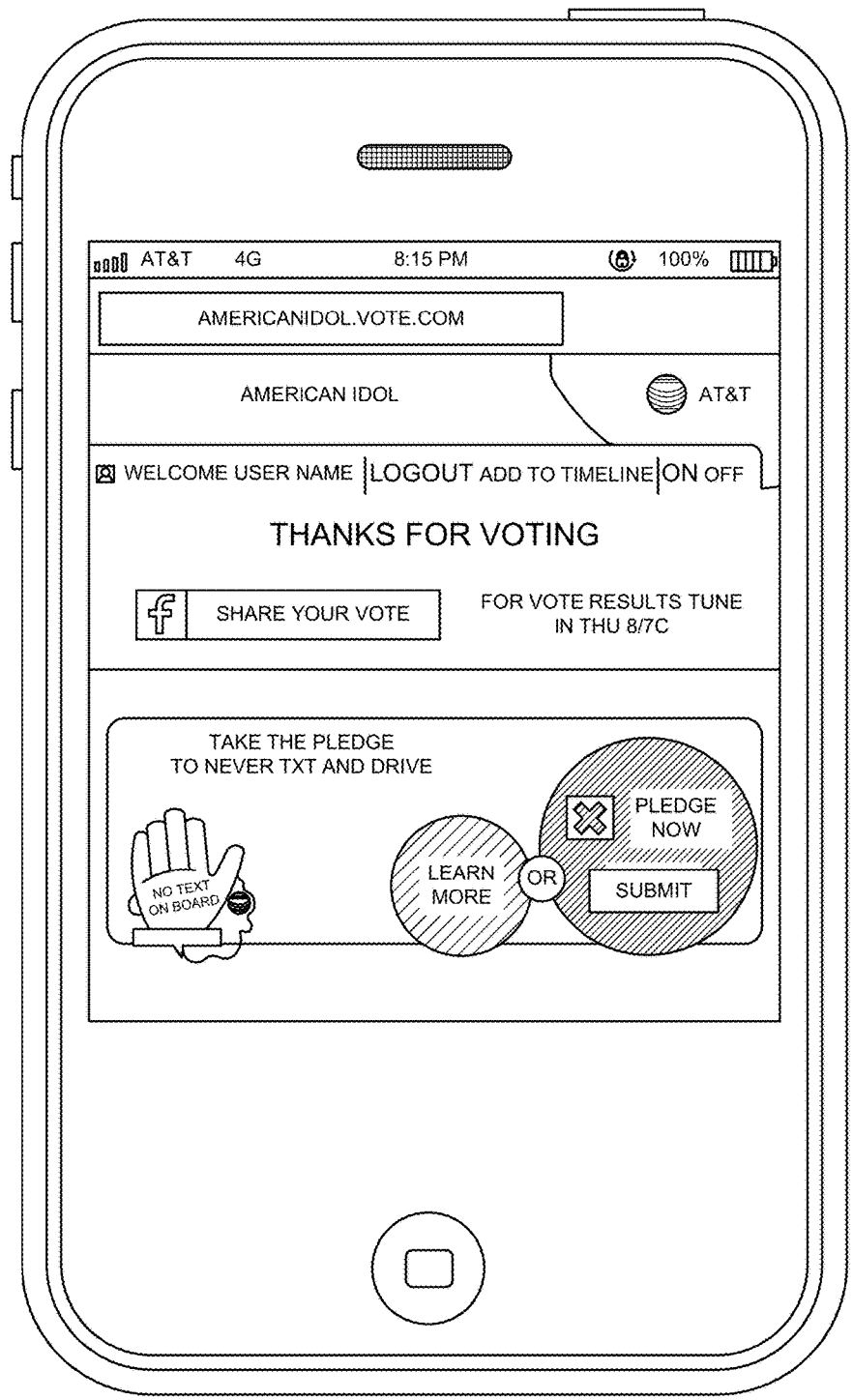
FIG. 18 is a diagram illustrating a user interface for a state in which all of the available votes have been committed, but sharing on the social network was not selected.

FIG. 18 is a diagram illustrating a user interface for a state in which all of the available votes have been committed, but sharing on the social network was not selected. The user may then share their votes by selecting the share control.

Figure 19:
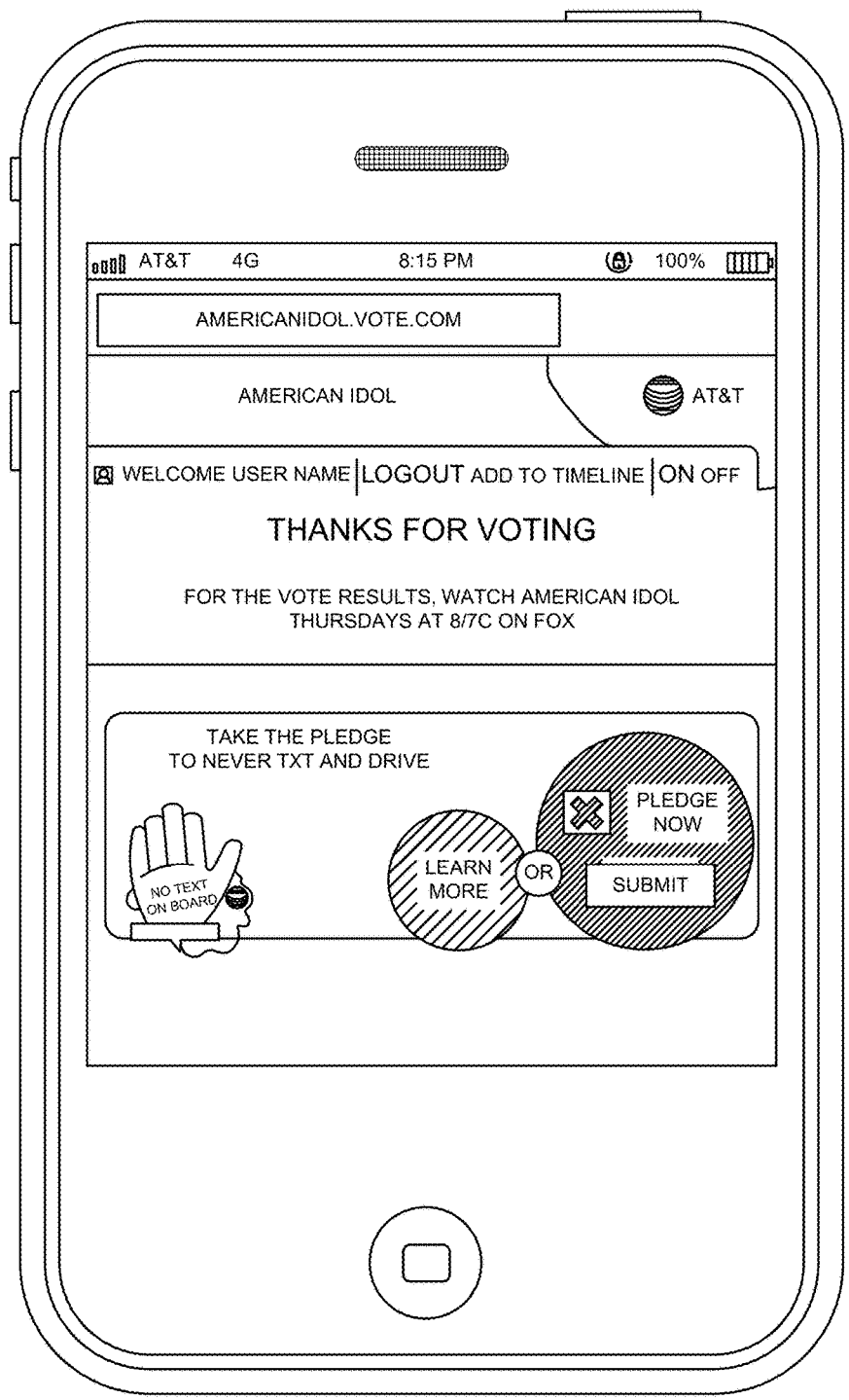
FIG. 19 is a diagram illustrating a user interface for a state in which all of the user's available votes have been committed, but sharing was not selected. In this embodiment, the user has indicated they do not want to share results on their social networking timeline.

FIG. 19 is a diagram illustrating a user interface for a state in which all of the users' available votes have been committed, but sharing was not selected. In this embodiment, the user has indicated they do not want to share results on their social networking timeline.

Figure 20:
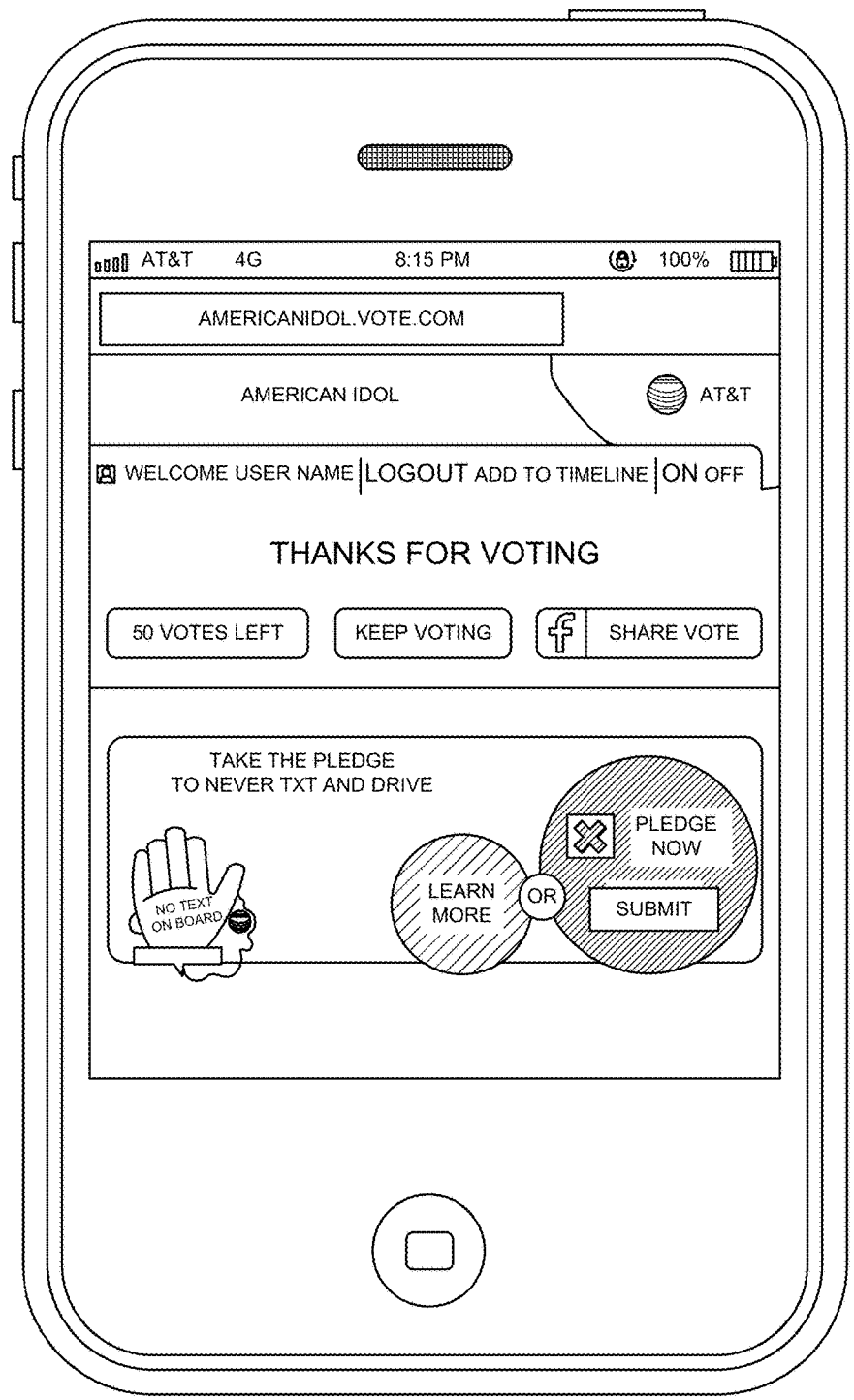
FIGS. 20 and 21 illustrate a user interface for a state wherein the user has committed a subset of the user's available votes.
Figure 21:
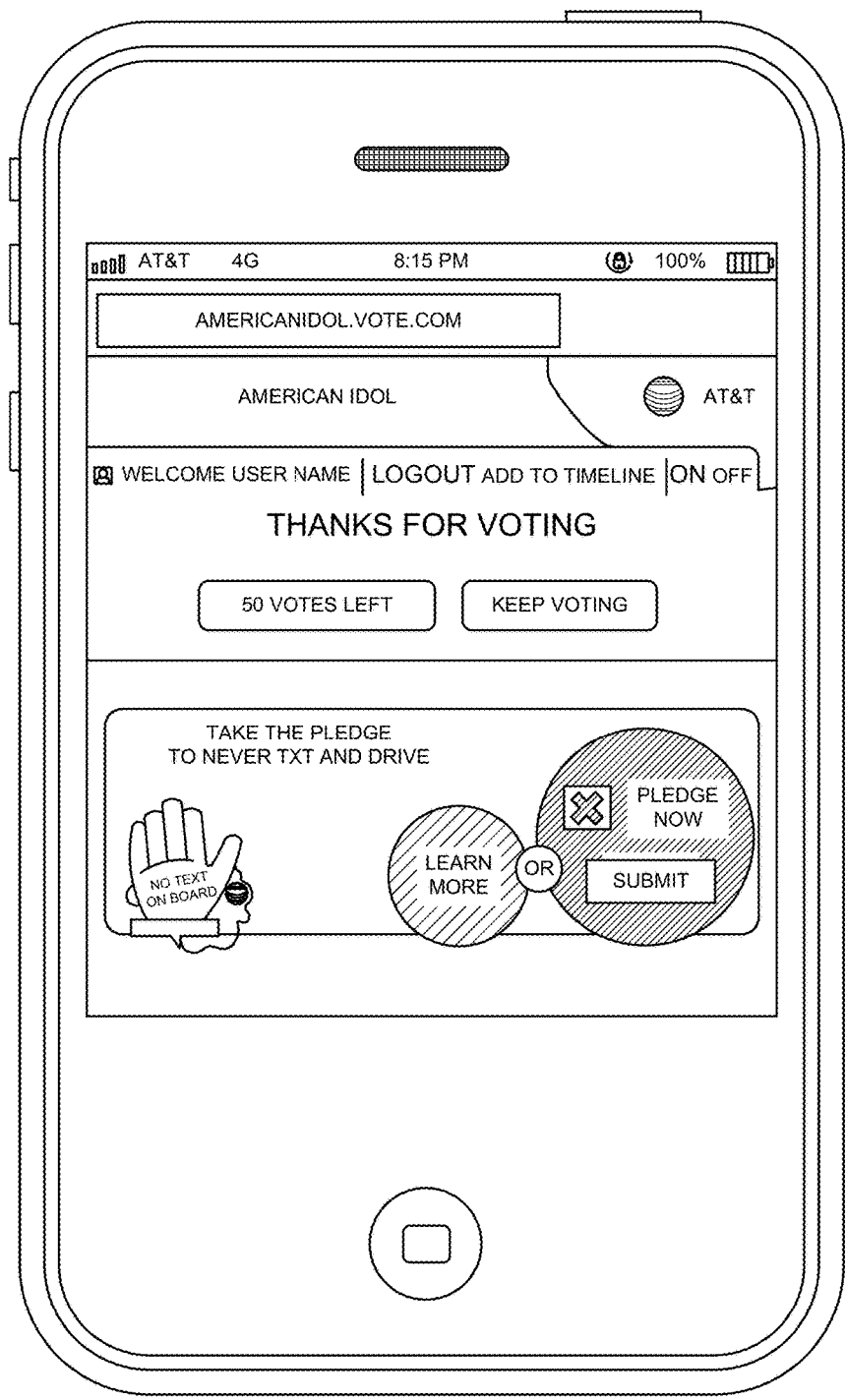

FIGS. 20 and 21 illustrate a user interface for a state wherein the user has committed a subset of the user's available votes. FIG. 20 presumes the user has not indicated whether they wish to share their votes on the social network and post a message on the social network, while FIG. 21 presumes they have indicated that they do not wish to share their votes on the social network.

Figure 22:
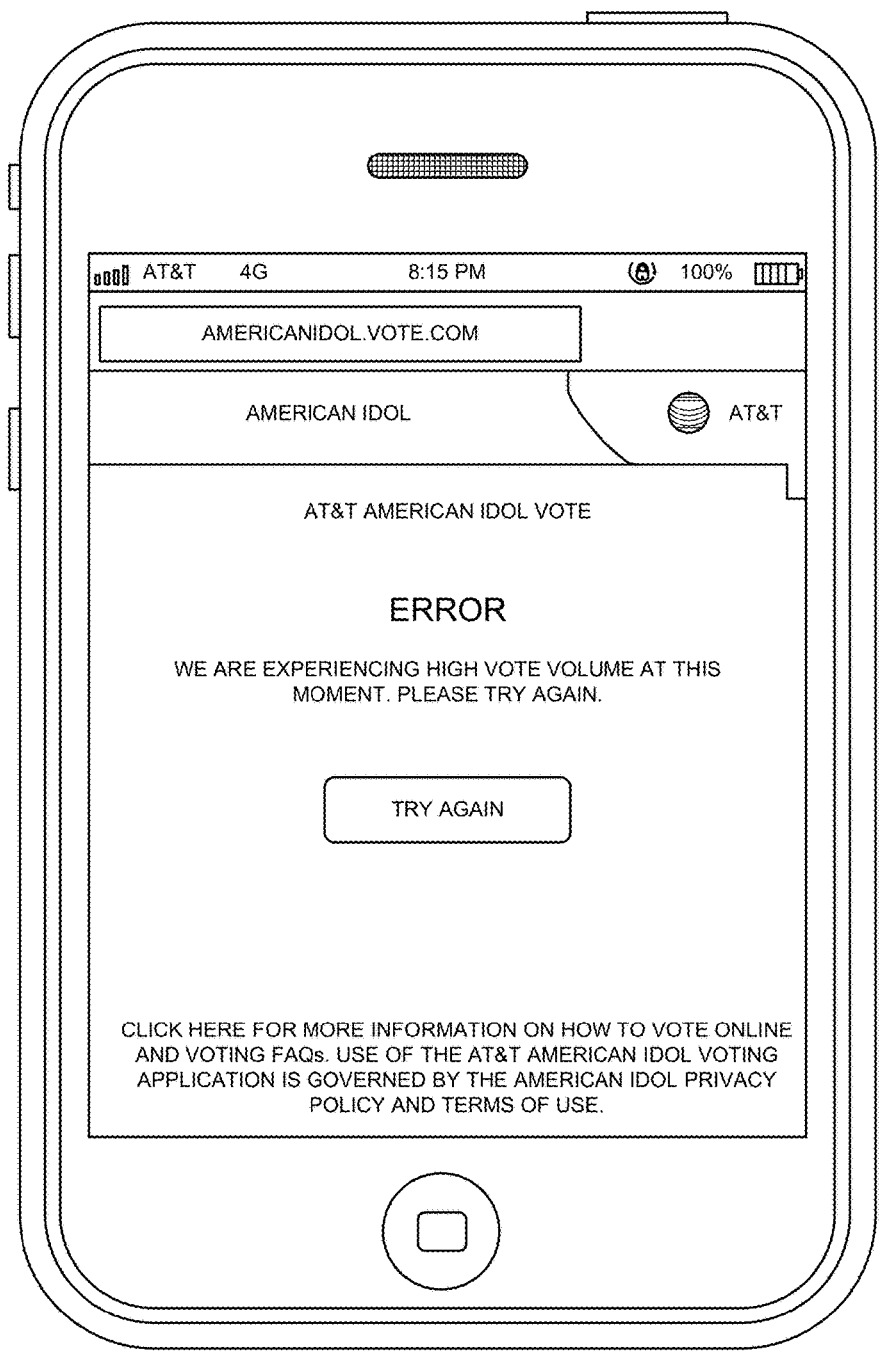
FIG. 22 is a diagram illustrating a user interface that may be presented in the voting traffic exceeds capacity.

FIG. 22 is a diagram illustrating a user interface that may be presented in the voting traffic exceeds capacity.

Figure 23:
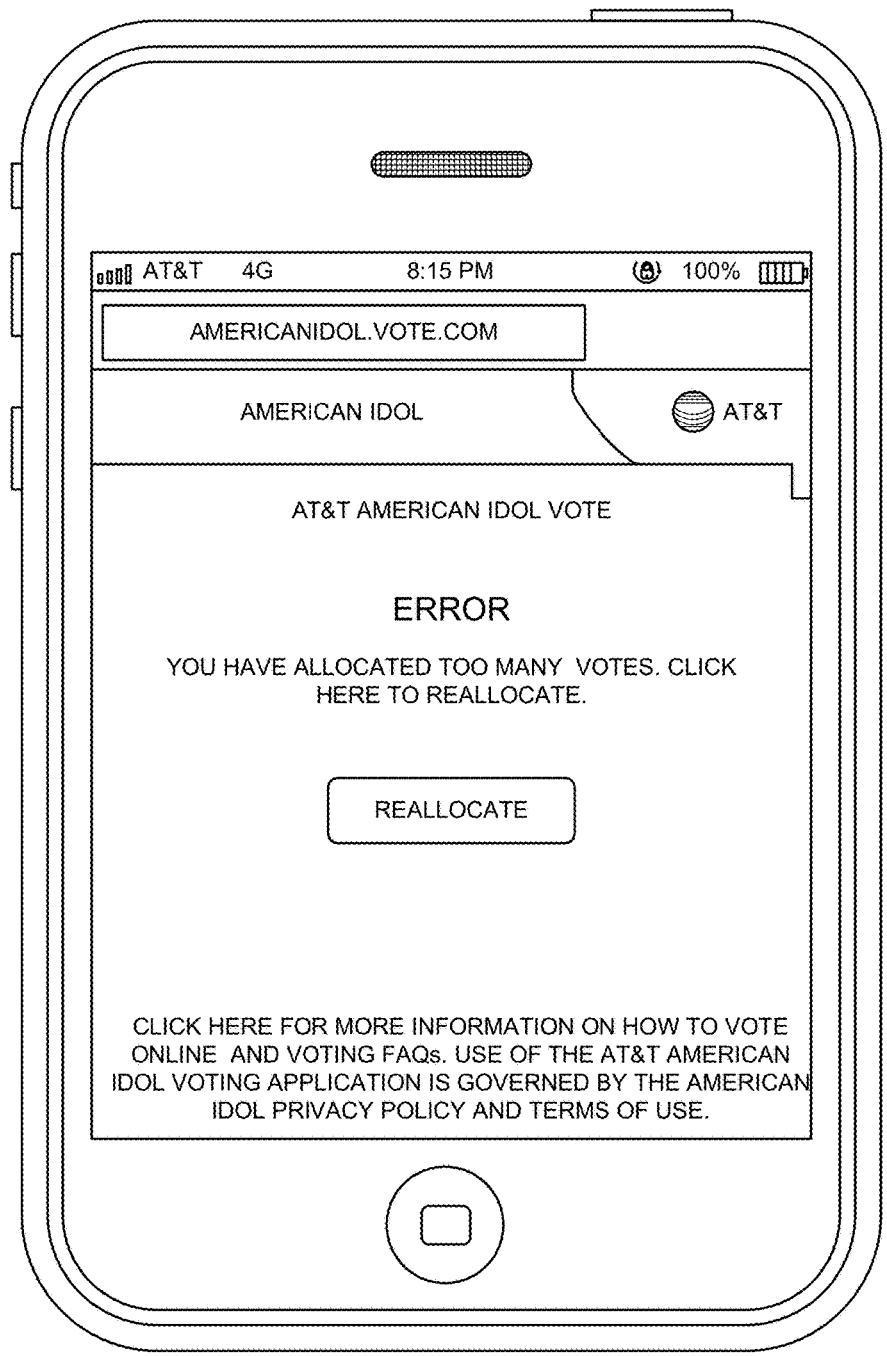
FIG. 23 is a diagram illustrating a user interface that may be presented if the user previously committed less than the N1 votes and attempted to submit additional votes exceeding the allocated number of N1 votes.

FIG. 23 is a diagram illustrating a user interface that may be presented if the user previously committed less than the N1 votes and attempted to submit additional votes exceeding the allocated number of N1 votes. This condition would not be permitted if the user were to use the same device for all submitted votes, and this interface may be shown if the user attempts to enter too many votes using different devices.

Figure 24:
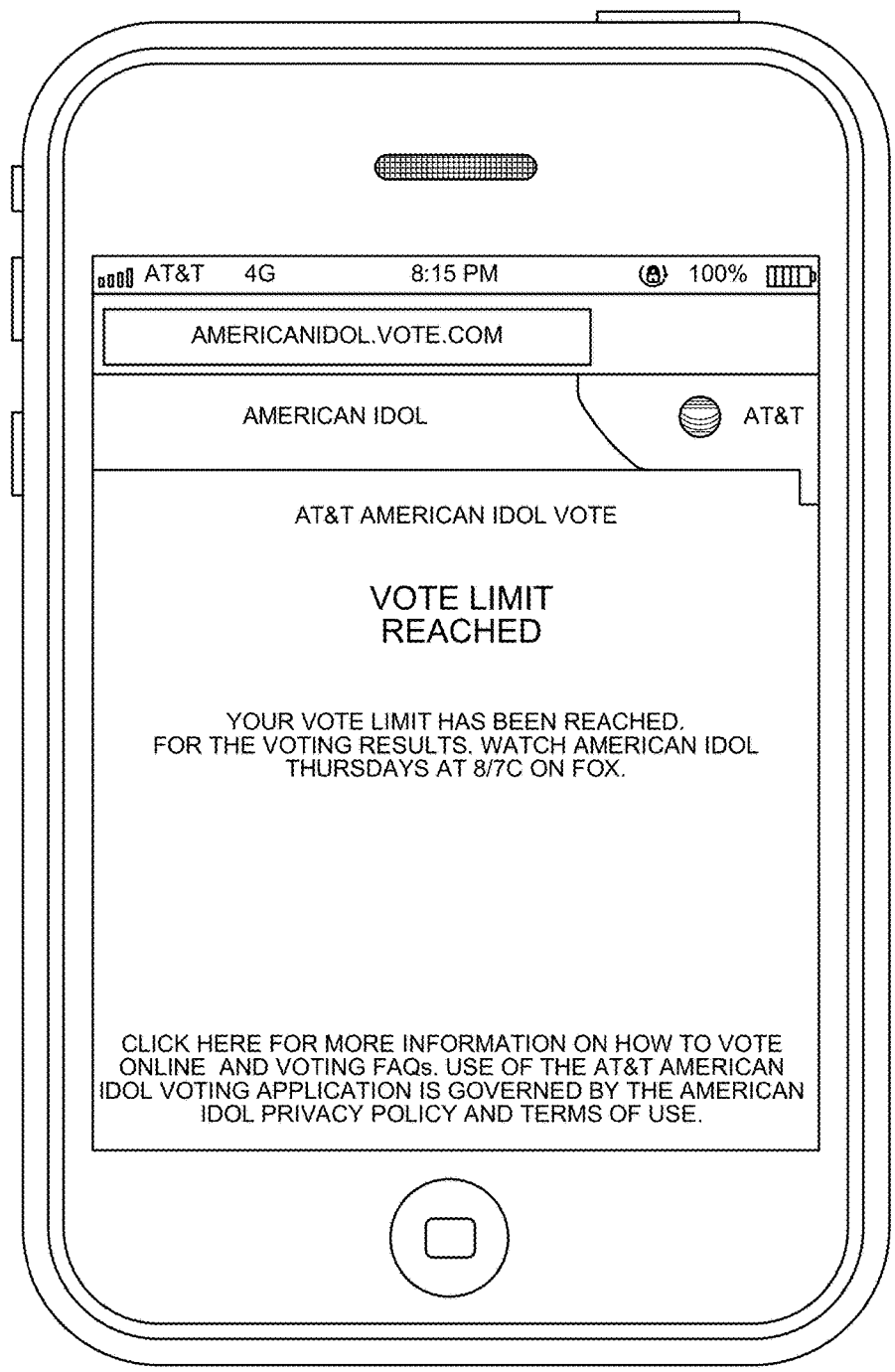
FIG. 24 is a diagram illustrating additional error page logic.

FIG. 24 is a diagram illustrating additional error page logic.

Figure 25:
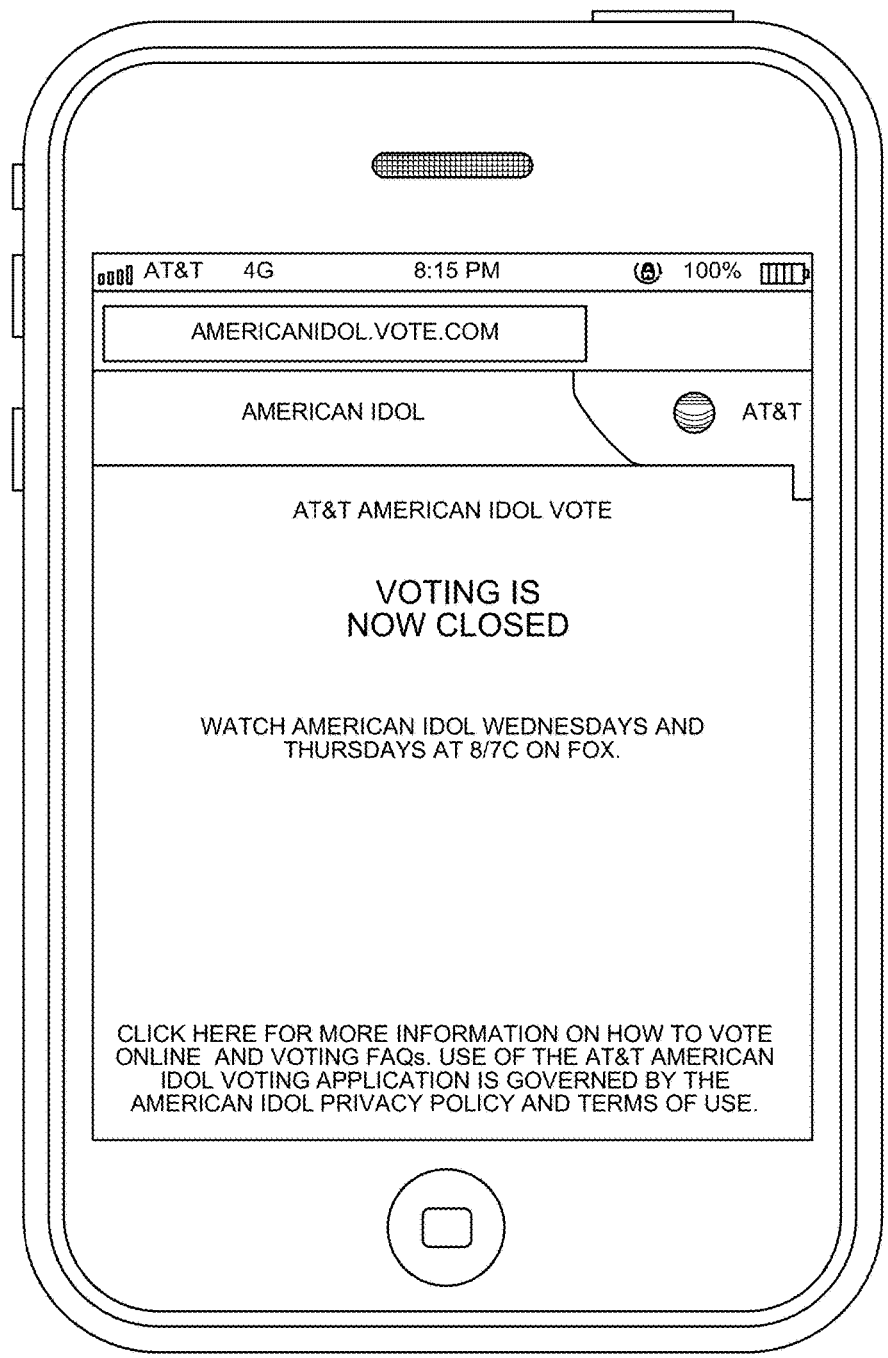
FIG. 25 is a diagram illustrating an interface that may be presented when the voting on the contest has closed, as shown in block.

FIG. 25 is a diagram illustrating an interface that may be presented when the voting on the contest has closed, as shown in block 332. This occurs at the endpoints shown in the arrows depicted in FIGS. 2A-2C.

Figure 26:
Figure 27:
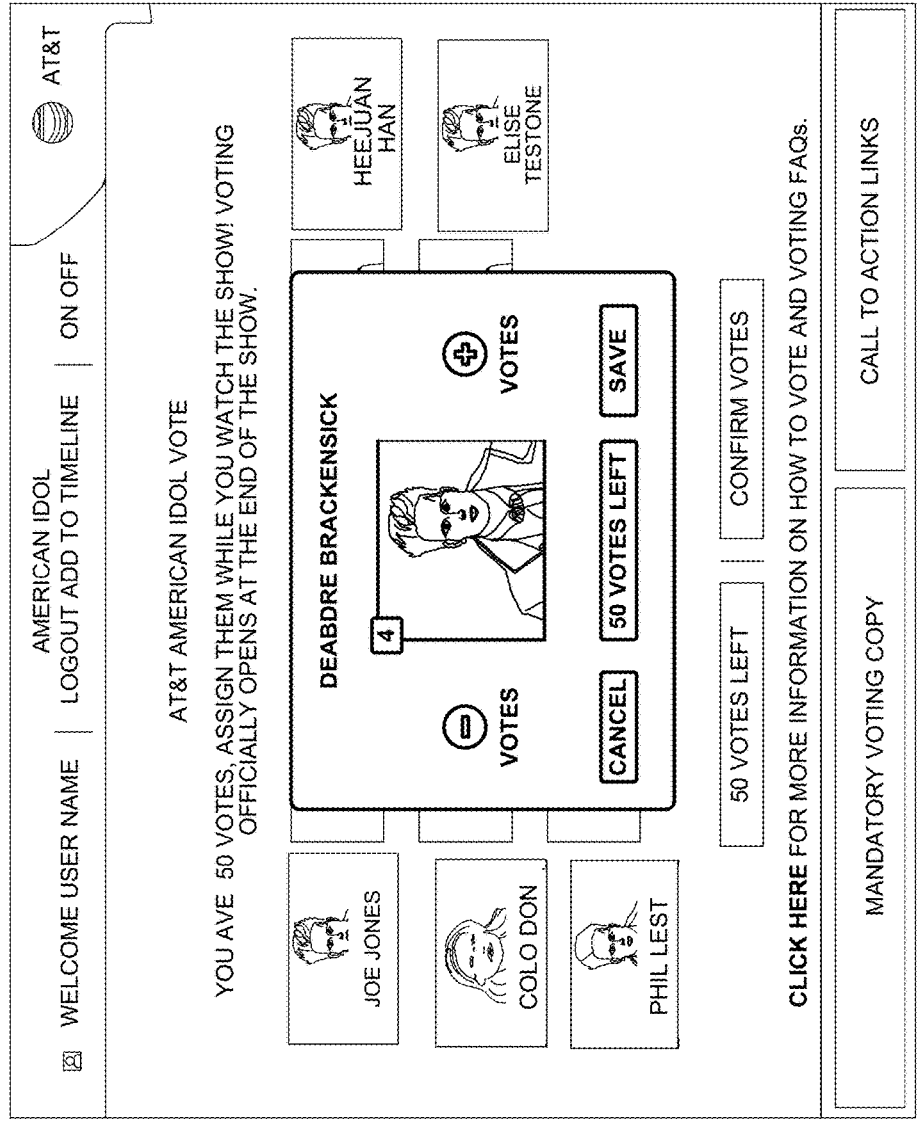

FIGS. 26-28 are diagrams illustrating one embodiment of an analogous user interface for presentation on a tablet or computer via an exemplary social networking system page.

Figure 29:
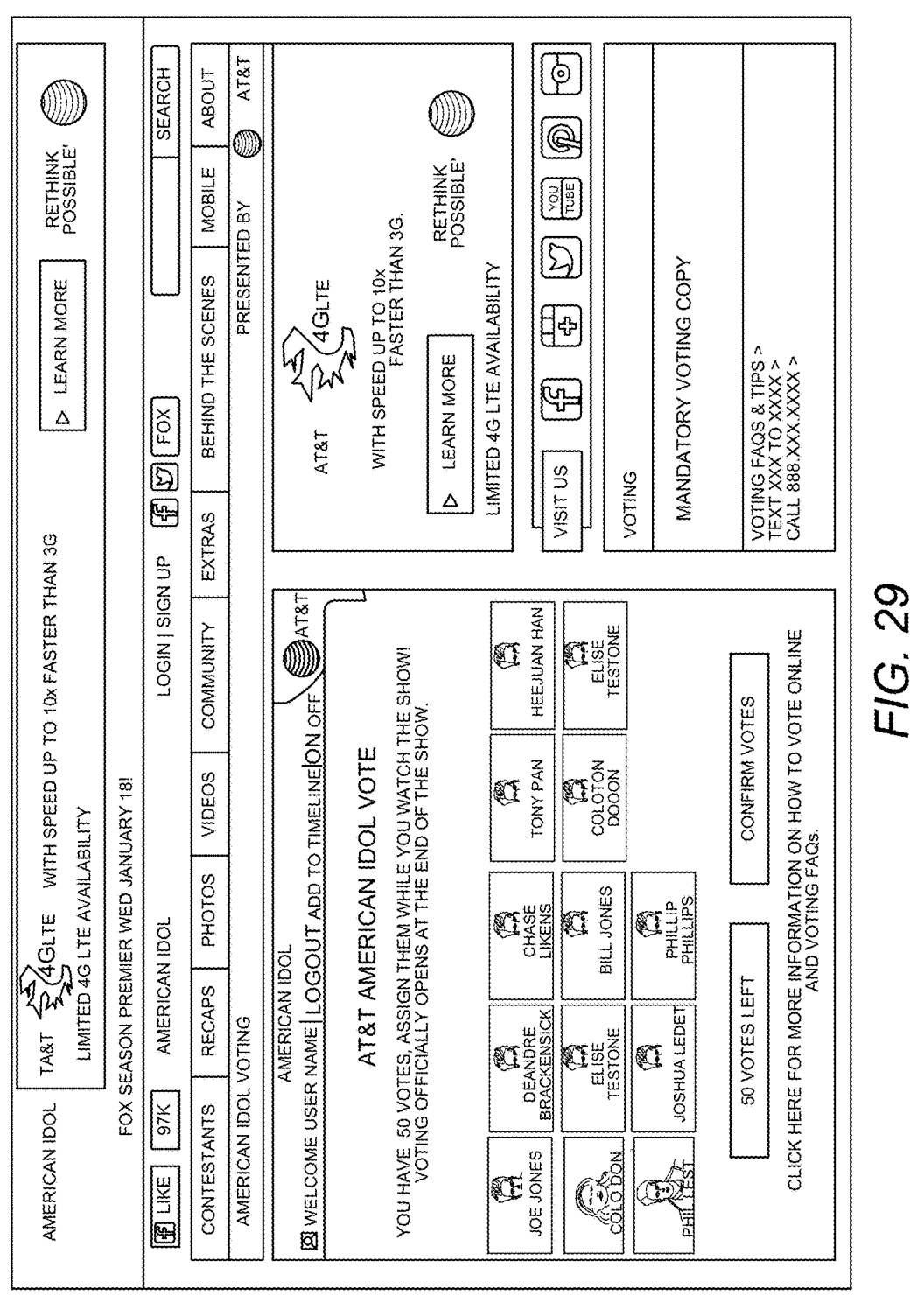
Figure 30:
Figure 31:
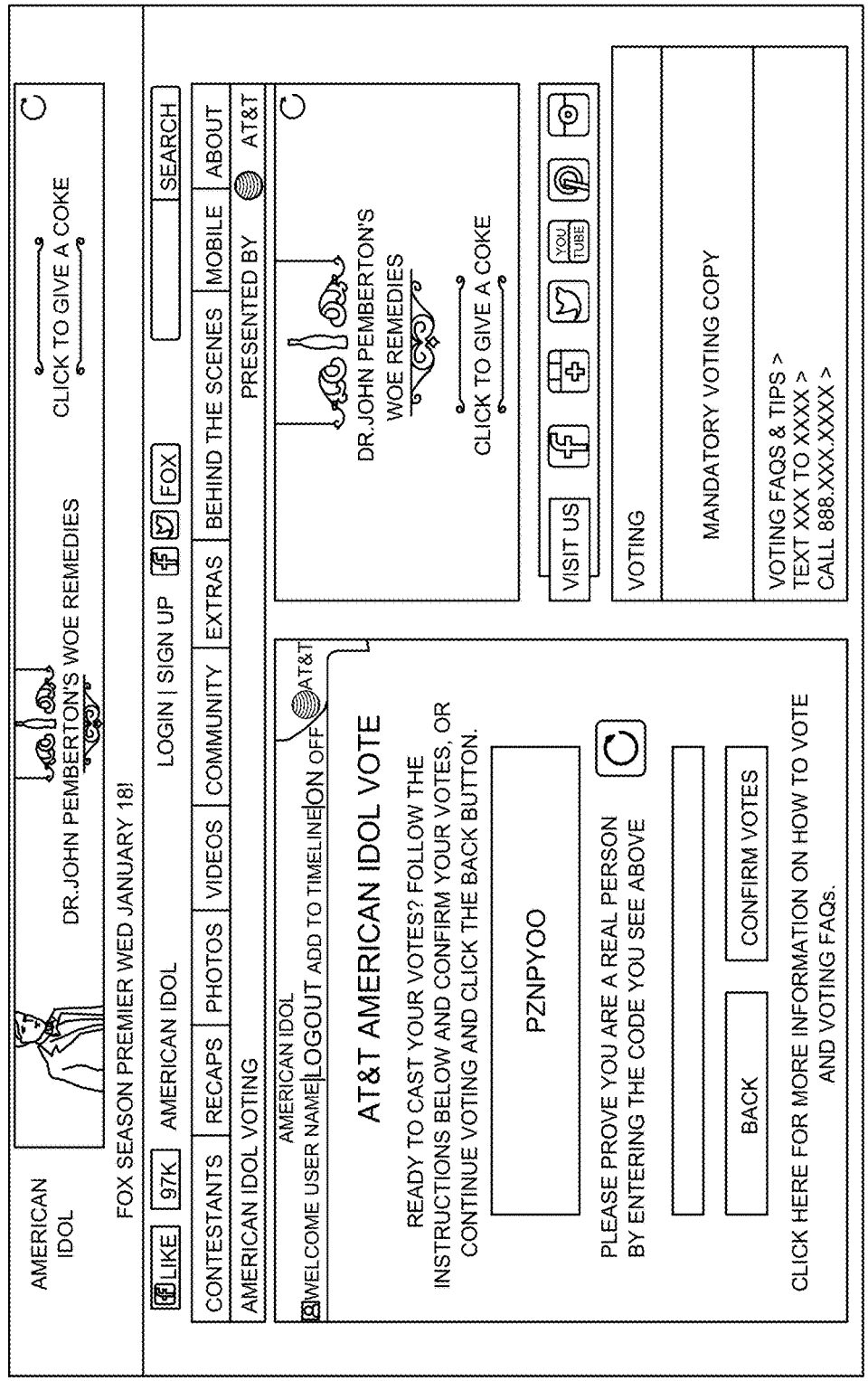

FIGS. 29-31 are diagrams illustrating one embodiment of the user interface for presentation on a tablet or computer via a webpage illustrated on a browser.

Figure 32A:
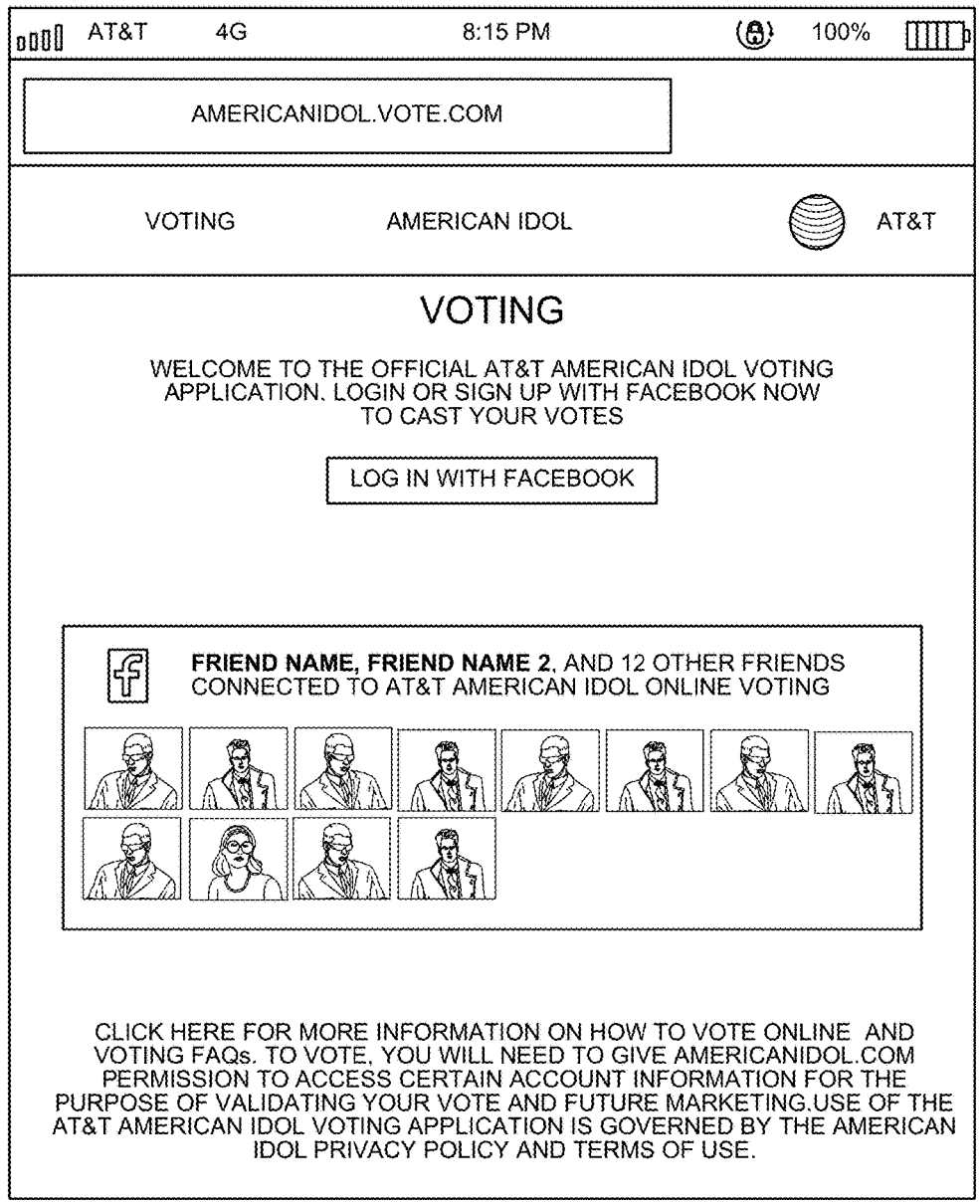
FIGS. 32A-32P are diagrams illustrating exemplary user states for the voting paradigms illustrated in FIGS. 2B and 2C.
Figure 32B:
Figure 32C:
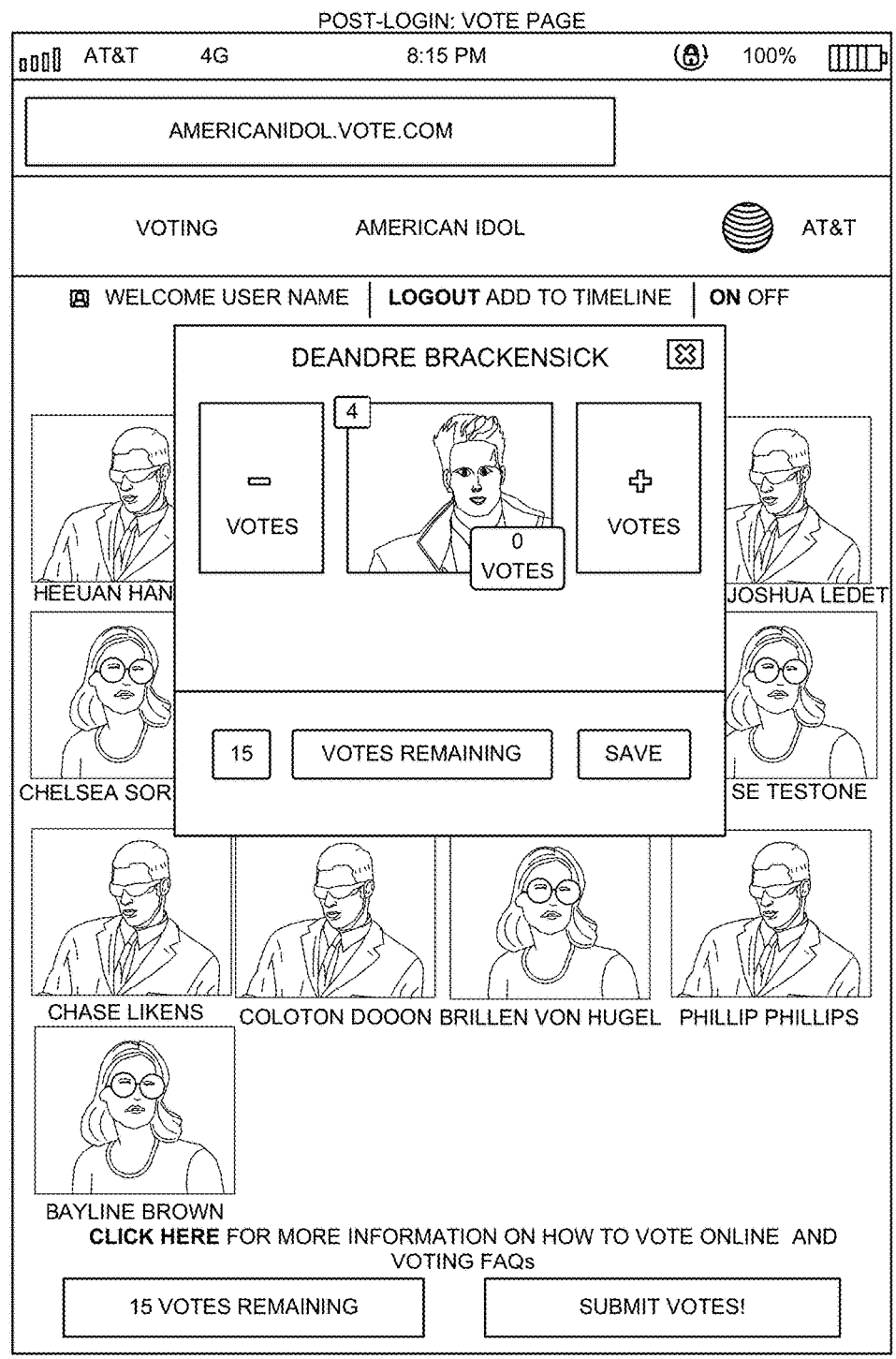
Figure 32D:
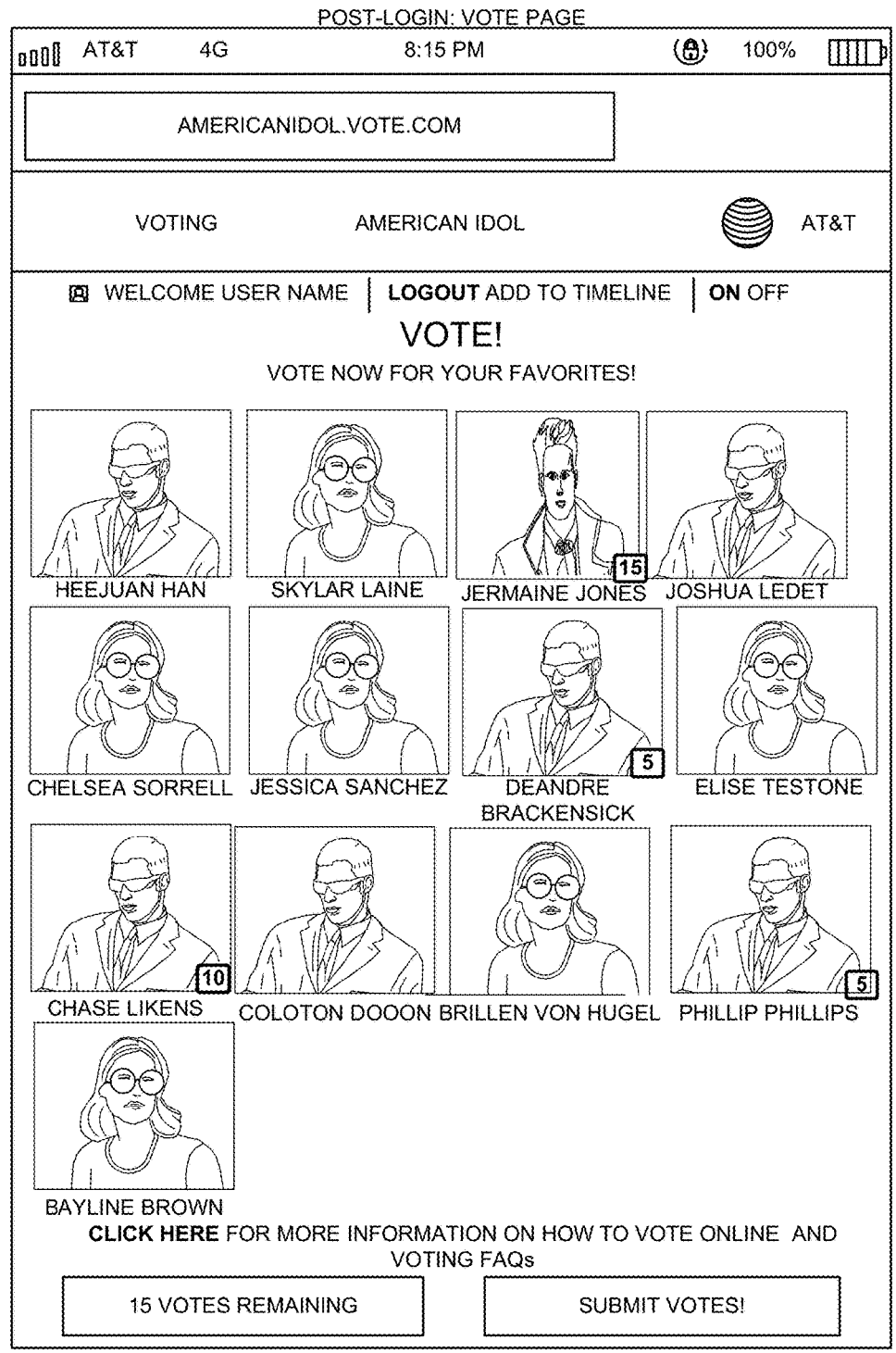
Figure 32F:
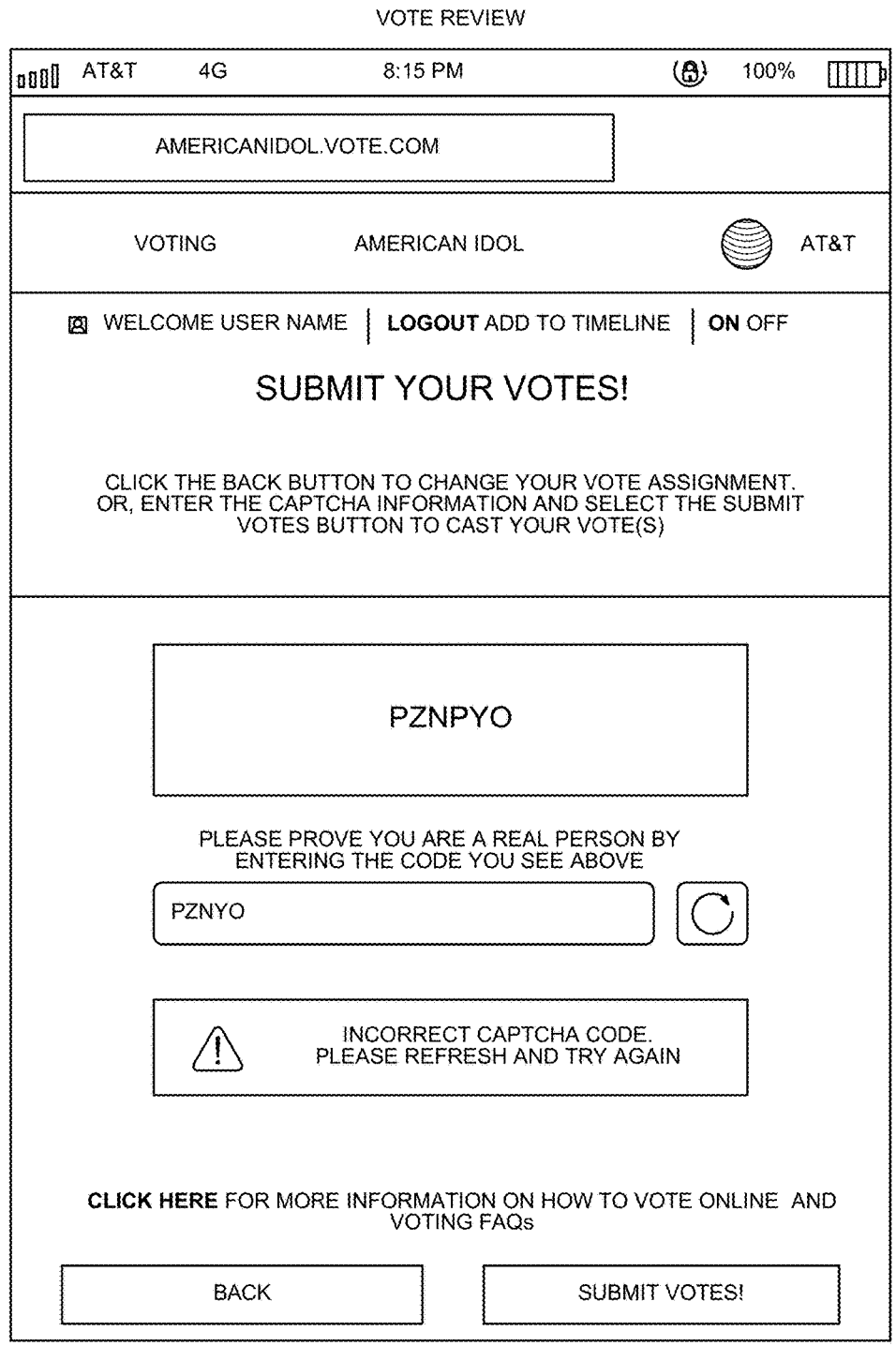
Figure 32G:
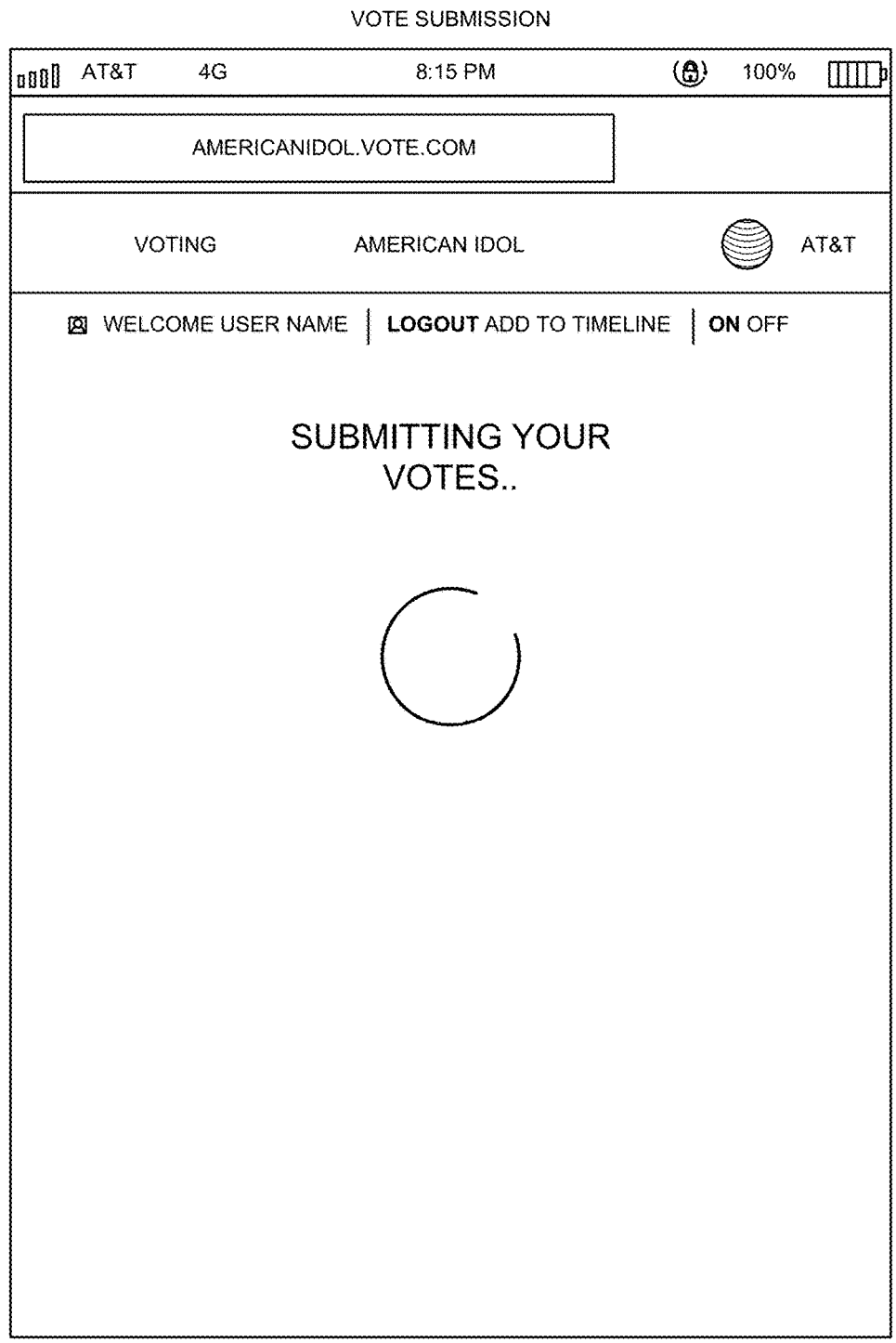
Figure 32H:
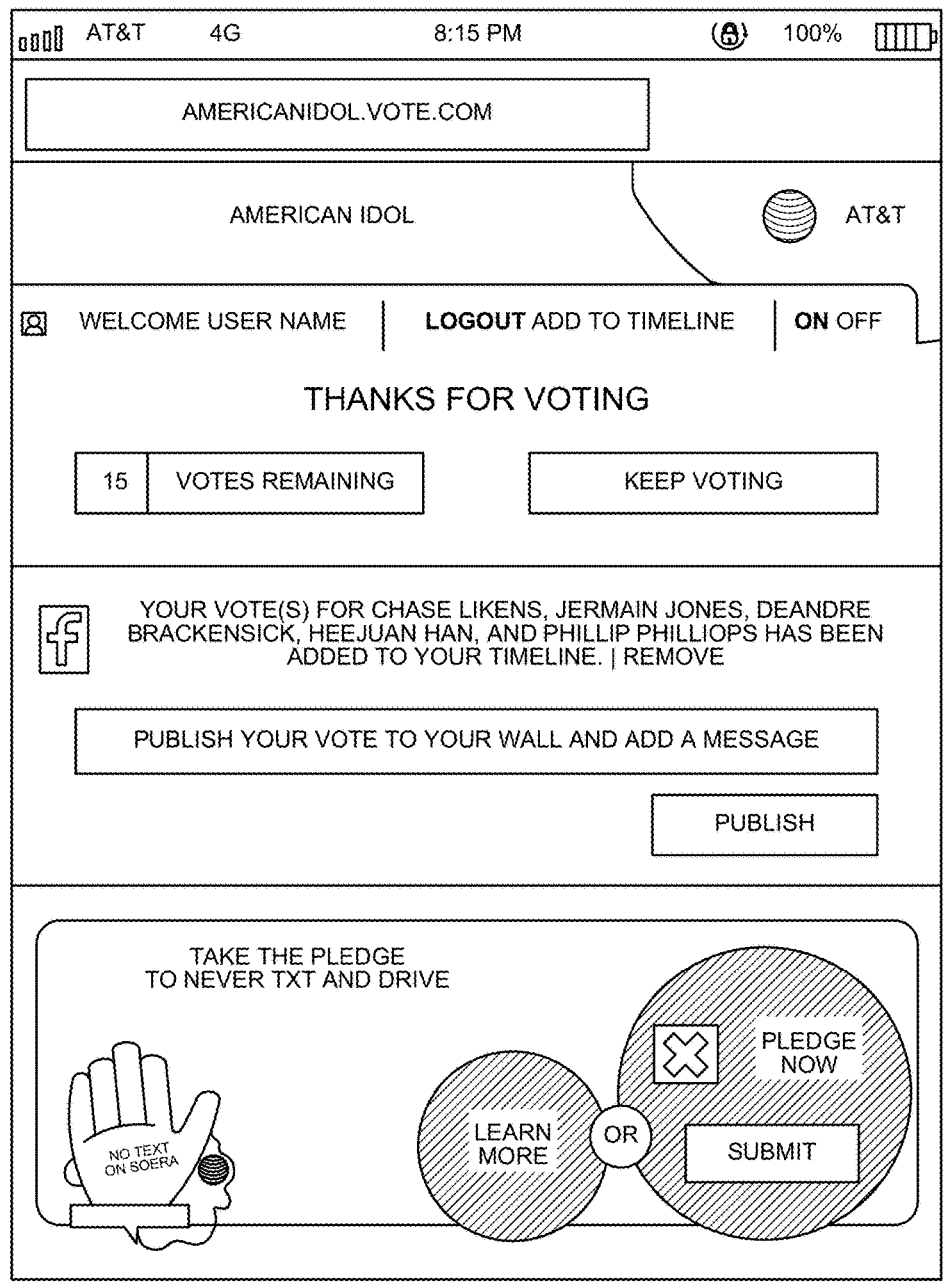
Figure 32I:
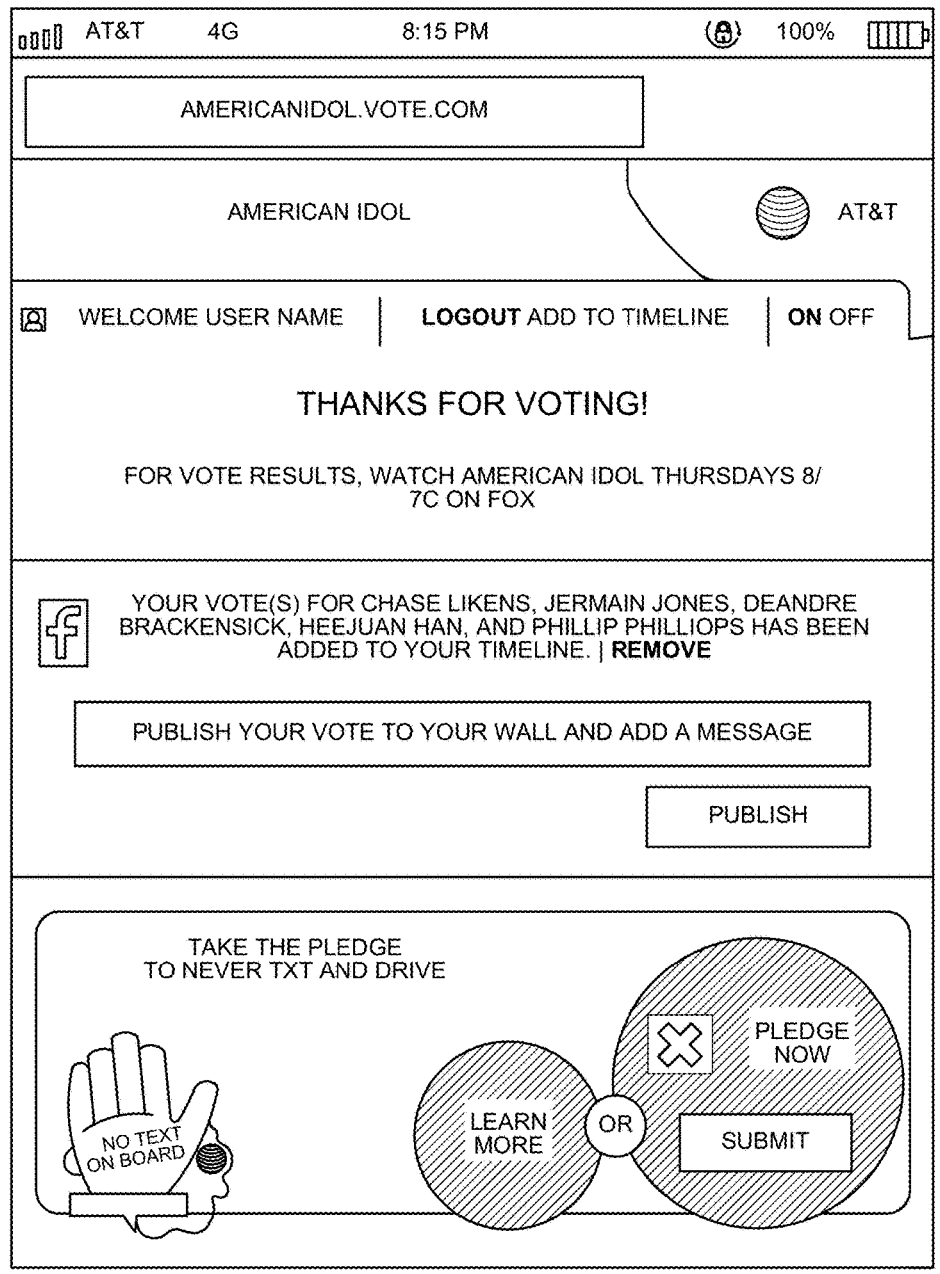
Figure 32J:
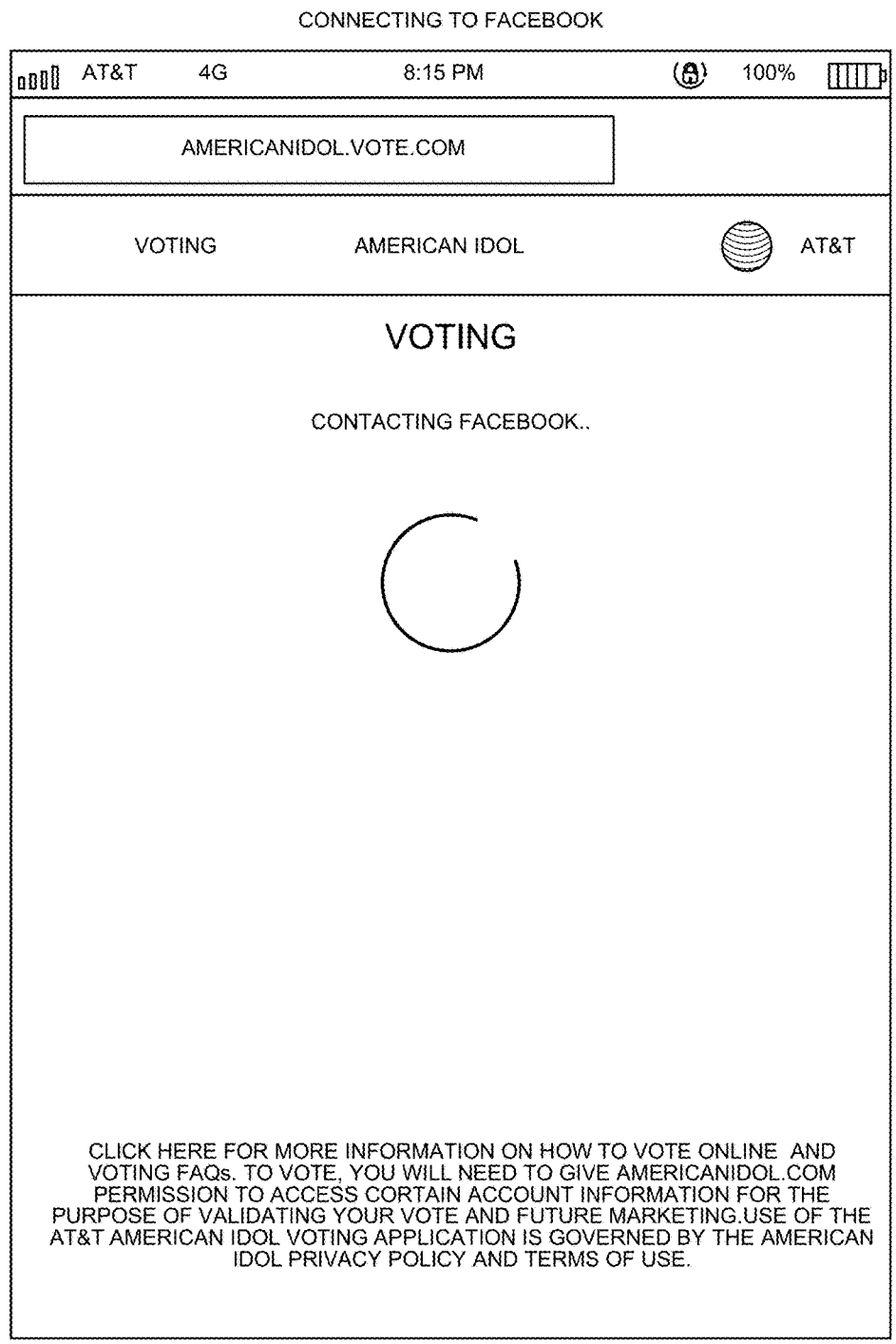
Figure 32K:
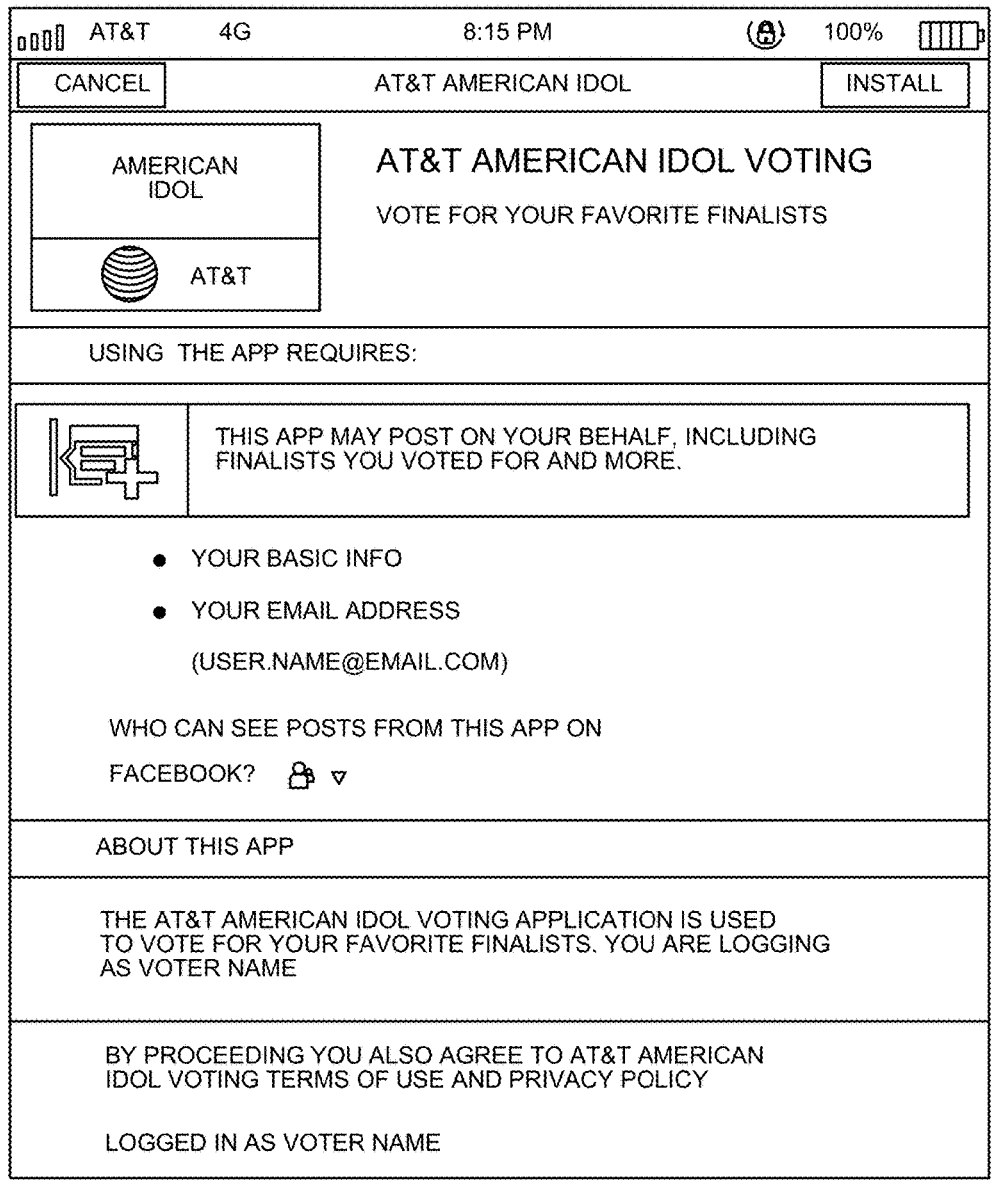
Figure 32L:
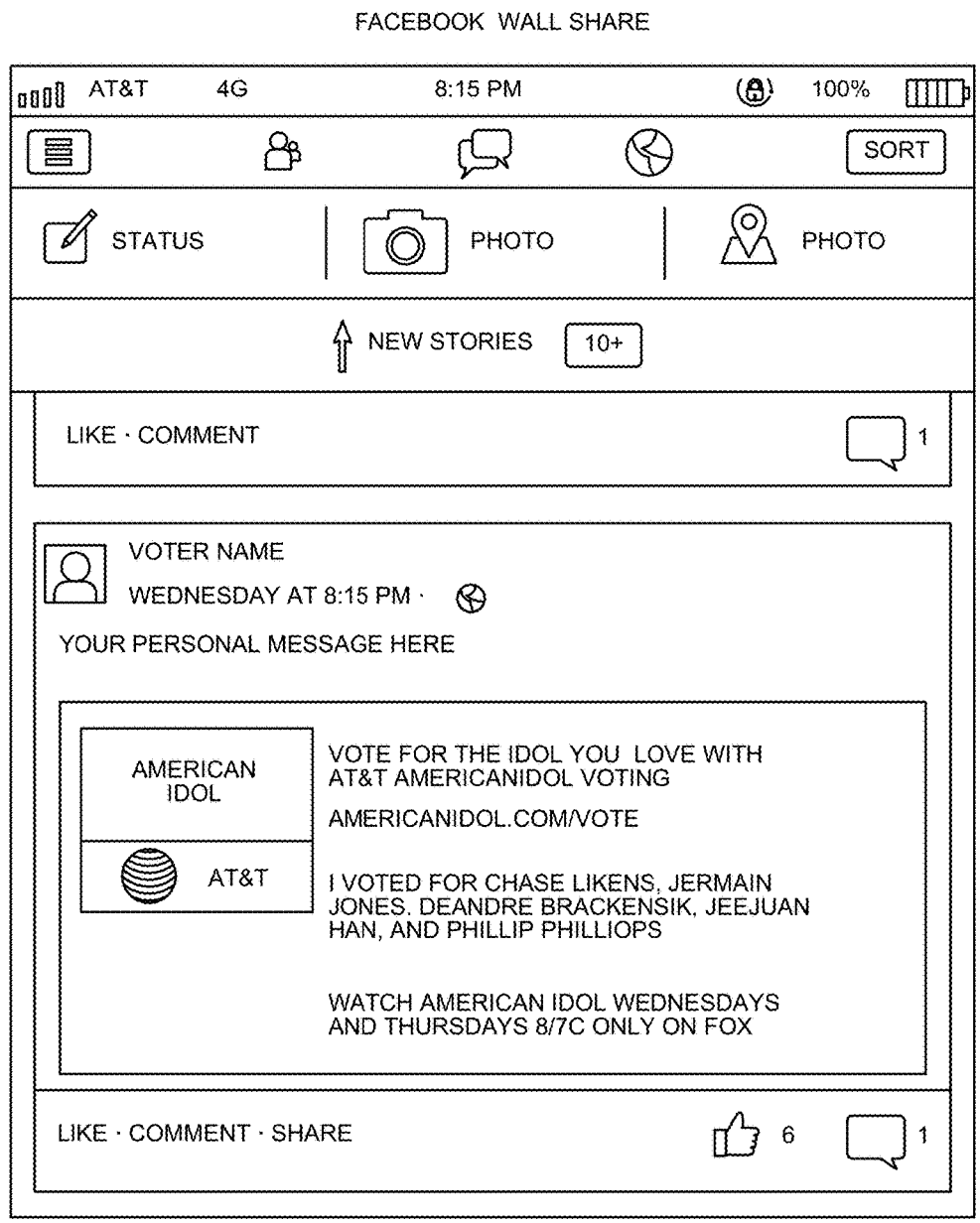
Figure 32M:
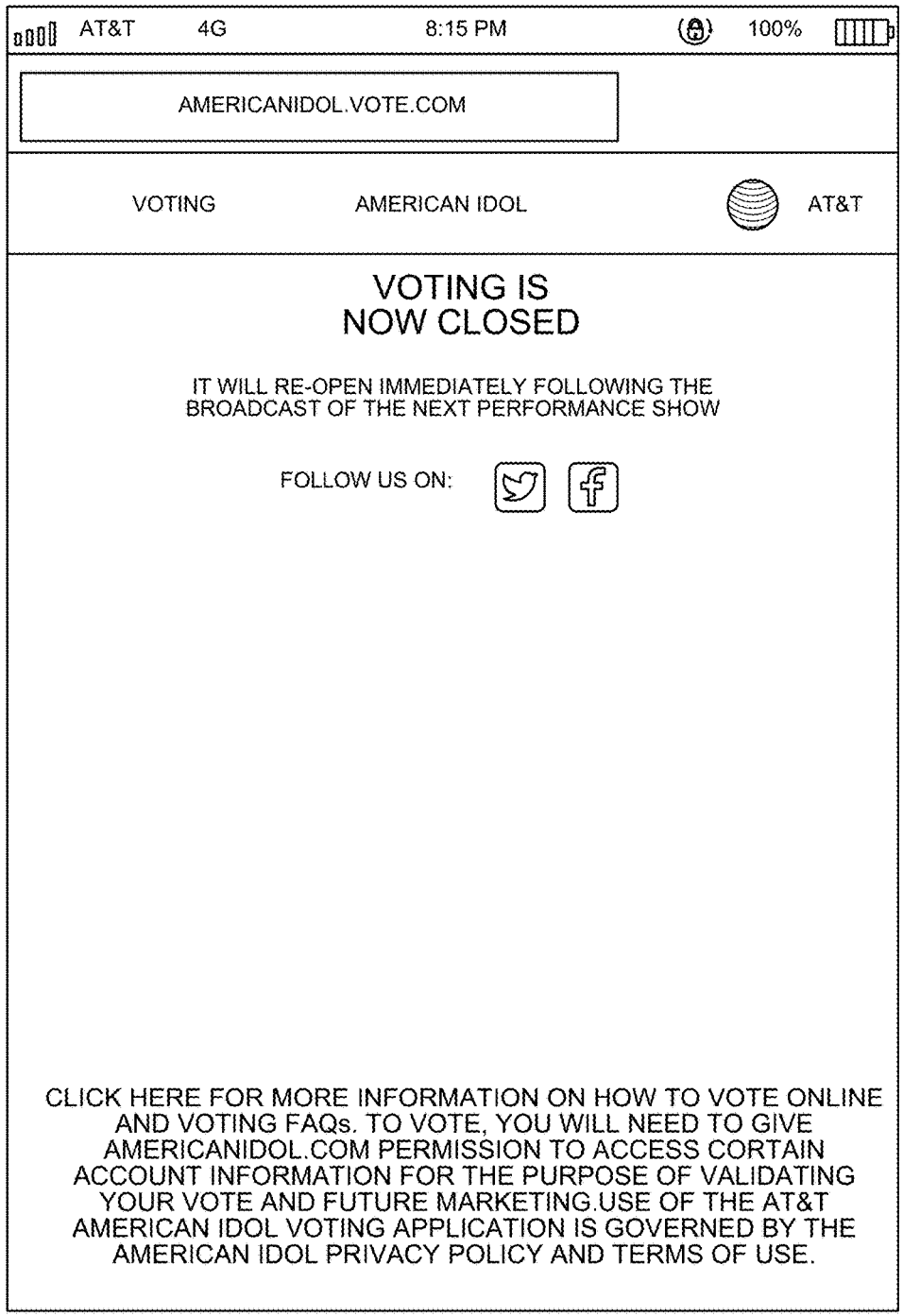
Figure 32N:
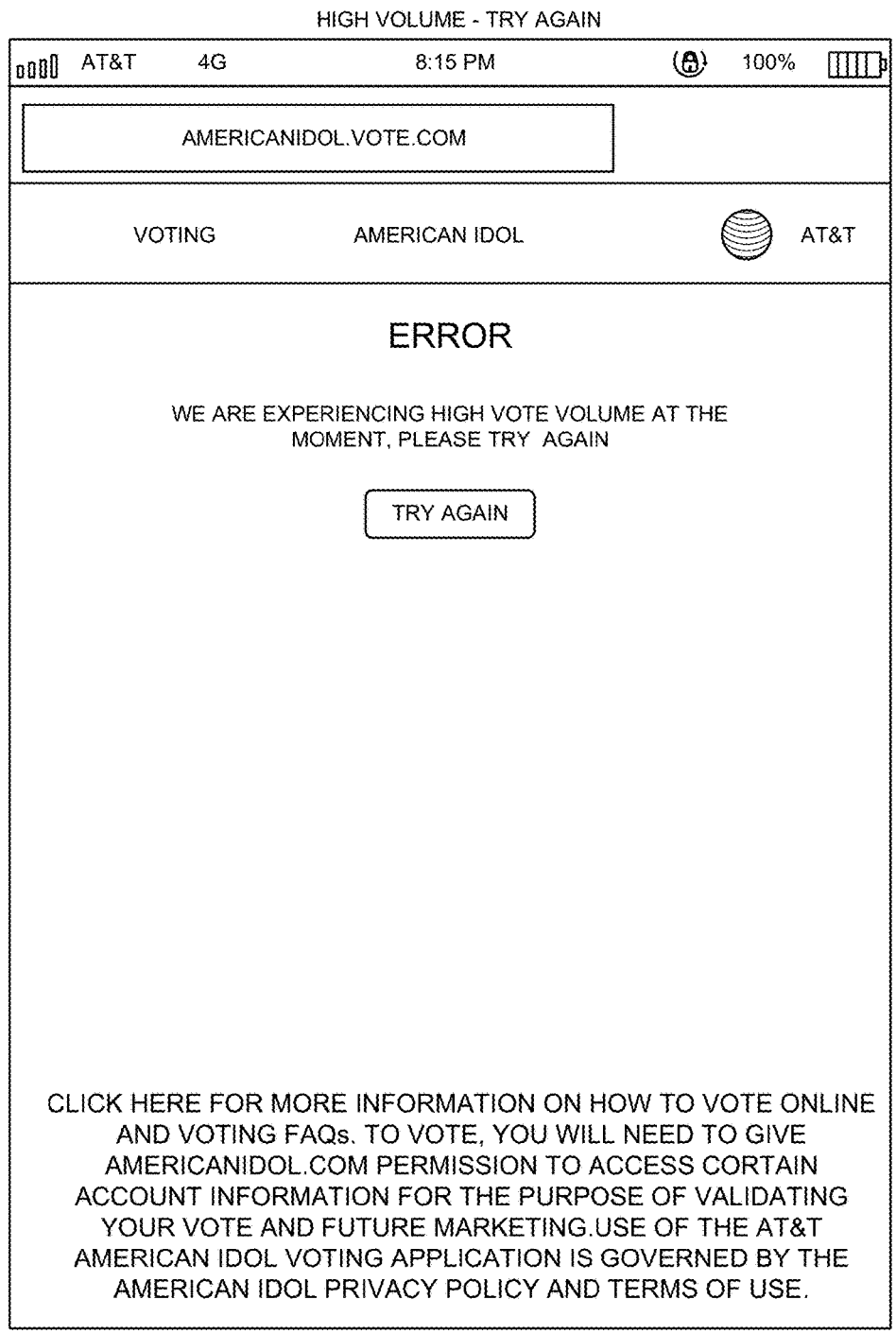
Figure 32O:
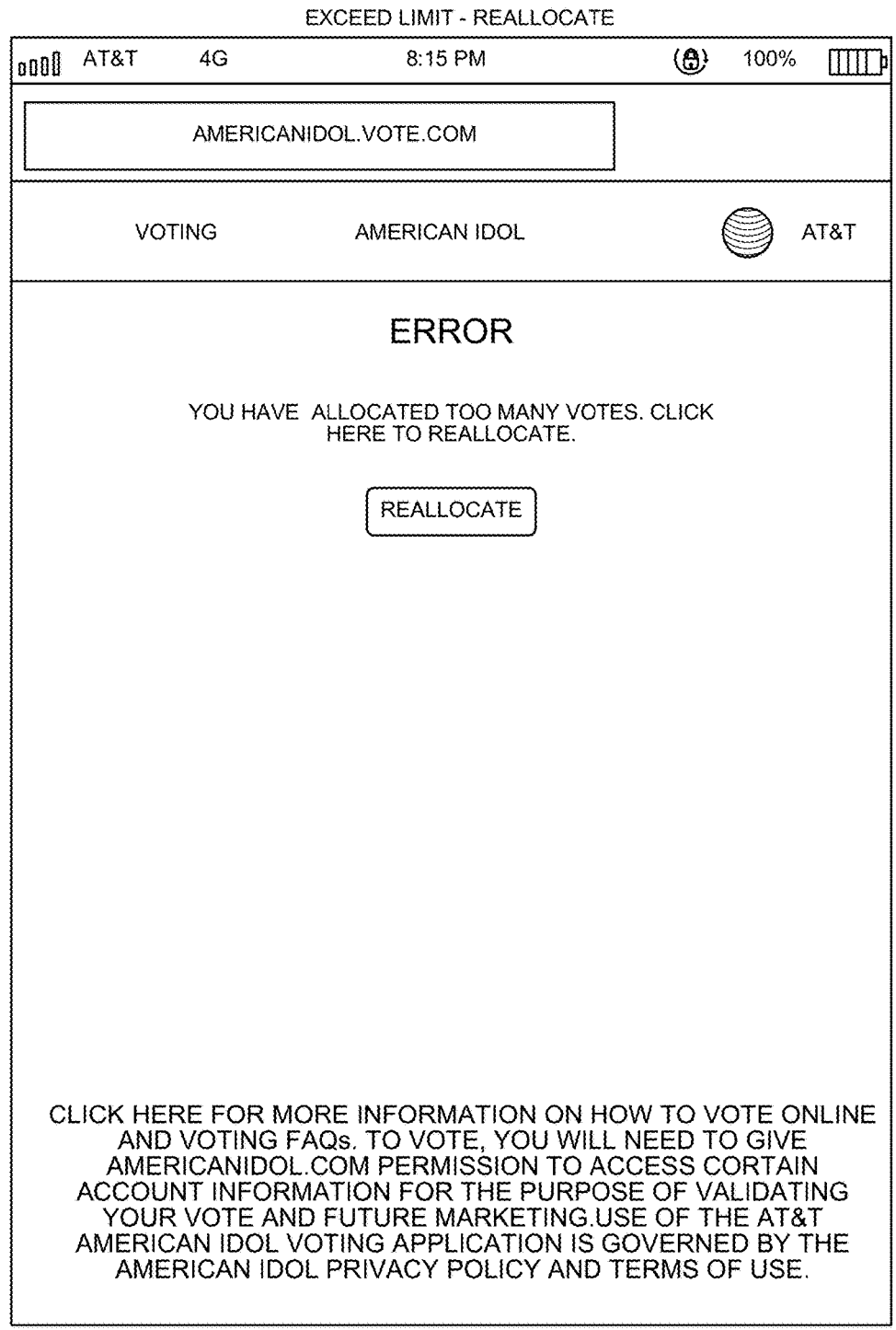
Figure 32P:
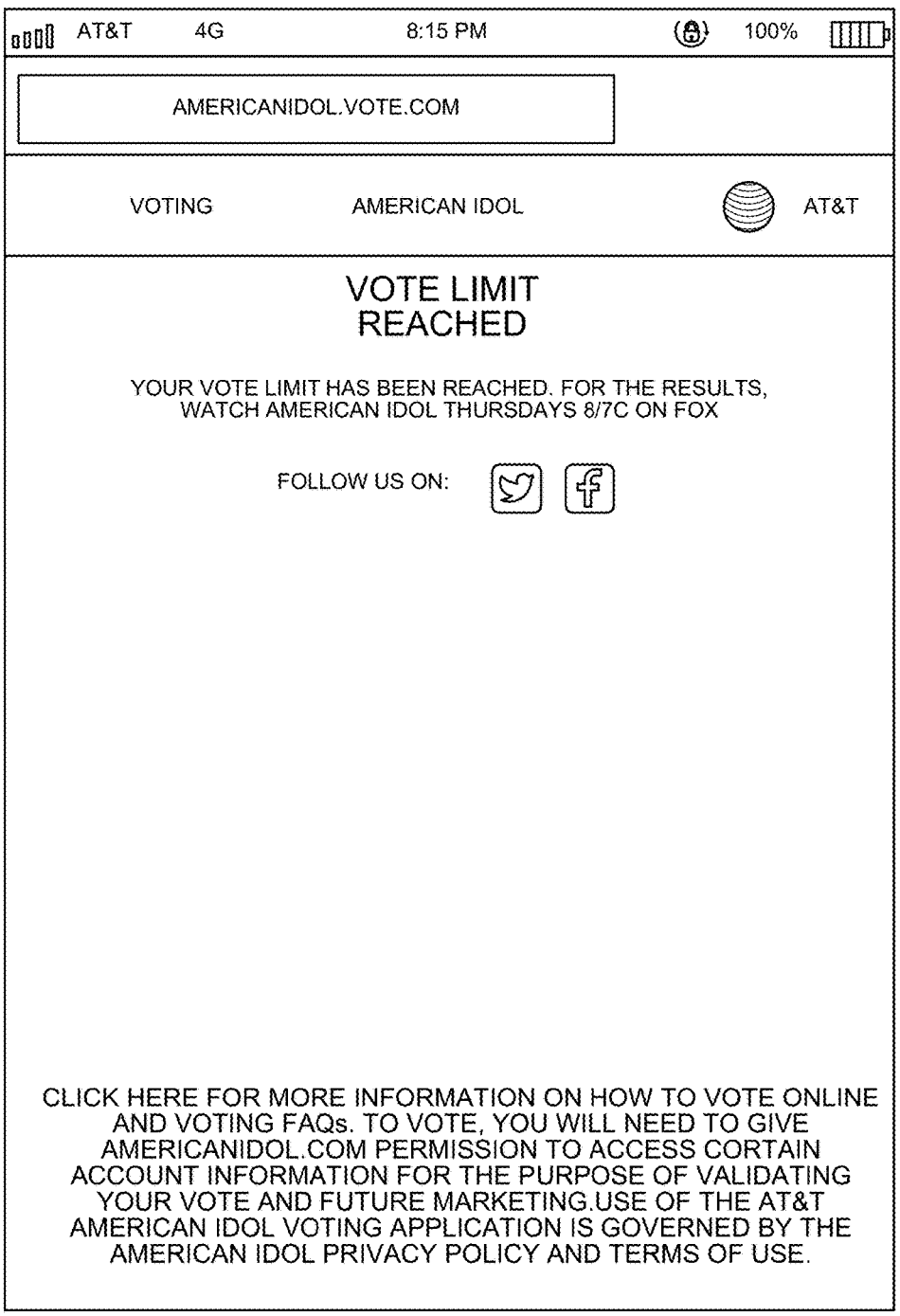

FIGS. 32A-32P are diagrams illustrating exemplary user states for the voting paradigms illustrated in FIGS. 2B and 2C.

FIG. 32A illustrates a user interface shown during a pre-login state where the voting process has begun, but the user 112 has not yet logged in.

FIGS. 32B-32I illustrate a user interface shown showing user states applicable during the periods described above. FIG. 32A depicts a pre-login state in which the voting process has opened, but the user has not logged in. FIGS. 32B-32D illustrate the user interface presented in a first user state during which users may allocate, review, and reallocate votes to candidates. As described in FIGS. 2A-2E, this state is valid during different times, depending on the voting paradigm, and in some cases, the time zone of the user device and the status of the broadcast/rebroadcast.

FIGS. 32E-32G illustrate the user interface presented in a second user state wherein allocated votes may be committed. As described in FIGS. 2A-2E, this state is valid during different times, depending on the voting paradigm, and in some cases, the time zone of the user device and the status of the broadcast/rebroadcast. In this state, the voter can log in (if not logged in) enter the first state to allocate (if not allocated) or reallocate votes to each of the candidates and enter commands to initiate commitment of the votes. FIG. 32E illustrates the user being prompted to enter a CAPTCHA code.

FIG. 32F illustrates a user interface when the user 112 enters the wrong CAPTCHA code, and FIG. 32G illustrates an exemplary user interface provided when the user enters the correct CAPTCHA code and the votes are committed.

FIGS. 32H and 32I illustrate a user interface presented in a third user state, in which the user is thanked for voting and may receive further messages, or keep voting. The user receives a message confirming that the votes were cast, indicating how many votes remain to be allocated or committed (and providing a control to permit further voting) and provided the option of sharing their voting on a social network.

FIG. 32J-32K is a diagram illustrating an embodiment wherein the voting application 114 is a social networking application, and the user has logged in to the social networking application as described in FIG. 32A, for example, by selecting the "Log in with FACEBOOK" control. FIG. 32J illustrates a user interface informing the user that the social networking application is contacting the social network, and FIG. 32K presents a user interface provided to the user 112 to assure that the user authorizes installation of the social networking voting application on the user device 104. The interface illustrates selectable social networking options (e.g. who can see data input by the user 112). To accept the application, store it on the user device 104 and execute the application, the user 112 selects a suitable control in this interface. The user 112 may then begin allocating votes or committing votes as permitted using the interface presented in FIGS. 32B-32D.

FIG. 32L illustrates the result on a social network of a fourth user state in which the user has elected to share some or all of their results on the social network. The user 112 can add comments if desired.

FIG. 32M illustrate a user interface presented in a fifth user state, in which the voting window is closed until the next date that another episode of the show with a new voting session is broadcast.

FIGS. 33N-32P are a diagram illustrating and user error state which is presented under high volume conditions, conditions that violate the voting rules, for example, wherein the user has attempted to submit greater than the maximum available number of votes, or when the user's vote limit has been reached The foregoing user interface examples depict voting allocation paradigms wherein the user 112 is permitted to allocate and commit N1 votes for one or more of a plurality of candidates. For example, the user may have fifty votes that they can allocate as they choose among the candidates, even allocating all fifty votes to one candidate and none to the other candidates.

If the user 112 were permitted to commit votes at any time from the beginning of the broadcast in the first (e.g. EST) time zone, contestants performing later in the broadcast may be unduly disadvantaged, as many users 112 may have allocated and committed votes before even viewing their performance. To ameliorate this problem, the timing paradigms described in FIGS. 2A and 2B forbid the committal of votes in all time zones until the broadcast has been aired for an amount of time in each of the time zones. The timing paradigm illustrated in FIG. 2C prevents this problem in the first time zone, but does not prevent the problem in others. This paradigm may be acceptable in any case because most votes are received when the broadcast is live, as the broadcast in the first time zone typically is. However, the timing paradigm illustrated in FIG. 2D offers no such protections, as votes may be allocated and committed before viewers have seen all of the candidates perform. Nonetheless, this problem can be ameliorated by use of a different vote allocation paradigm.

In this paradigm, each user has N1 votes to allocate among each of the candidates, but the number of votes that can be allocated to each candidate is limited to M. For example, the user may have fifty votes to allocate, but is only able to allocate a maximum of 10 votes for any one participant. This paradigm ameliorates the foregoing issues because the user 112 is less able to overcommit their votes too early in the broadcast of the program in their time zone. This voting allocation paradigm is particularly useful for the timing paradigm illustrated in FIGS. 2D and 2E, but may be used with the others as well.

Hardware Environment

Figure 33:
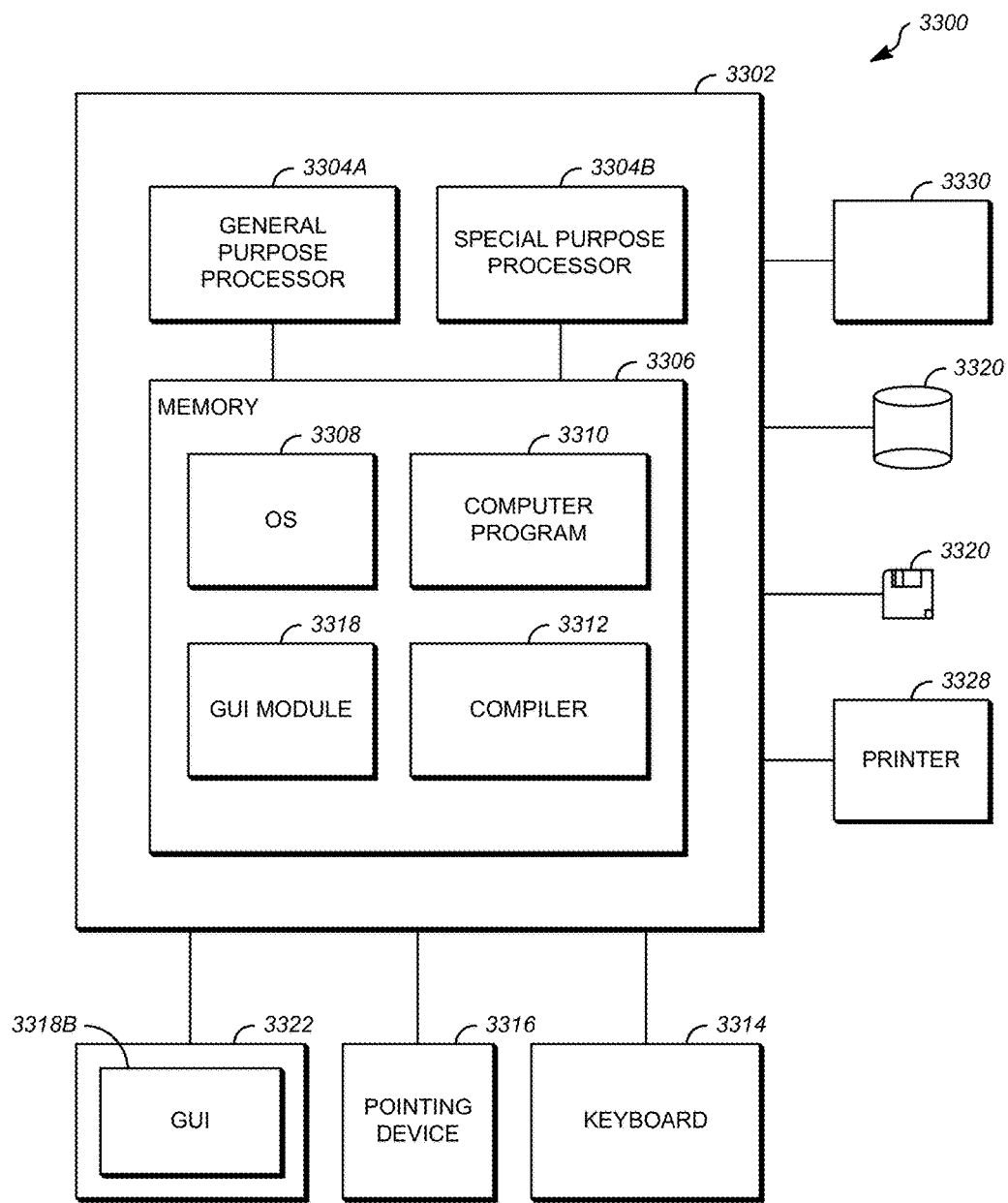
FIG. 33 is a diagram illustrating an exemplary computer system that could be used to implement elements of the present invention.

FIG. 33 is a diagram illustrating an exemplary computer system 100 that could be used to implement elements of the present invention. The computer 3302 comprises a general purpose hardware processor 3304A and/or a special purpose hardware processor 3304B (hereinafter alternatively collectively referred to as processor 3304) and a memory 3306, such as random access memory (RAM). The computer 3302 may be coupled to other devices, including input/output (I/O) devices such as a keyboard 3314, a mouse device 3316 and a printer 3328.

In one embodiment, the computer 3302 operates by the general purpose processor 3304A performing instructions defined by the computer program 3310 under control of an operating system 3308. The computer program 3310 and/or the operating system 3308 may be stored in the memory 3306 and may interface with the user and/or other devices to accept input and commands and, based on such input and commands and the instructions defined by the computer program 3310 and operating system 3308 to provide output and results.

Output/results may be presented on the display 3322 or provided to another device for presentation or further processing or action. In one embodiment, the display 3322 comprises a liquid crystal display (LCD) having a plurality of separately addressable pixels formed by liquid crystals. Each pixel of the display 3322 changes to an opaque or translucent state to form a part of the image on the display in response to the data or information generated by the processor 3304 from the application of the instructions of the computer program 3310 and/or operating system 3308 to the input and commands. Other display 3322 types also include picture elements that change state in order to create the image presented on the display 3322. The image may be provided through a graphical user interface (GUI) module 3318A. Although the GUI module 3318A is depicted as a separate module, the instructions performing the GUI functions can be resident or distributed in the operating system 3308, the computer program 3310, or implemented with special purpose memory and processors.

Some or all of the operations performed by the computer 3302 according to the computer program 3310 instructions may be implemented in a special purpose processor 3304B. In this embodiment, some or all of the computer program 3310 instructions may be implemented via firmware instructions stored in a read only memory (ROM), a programmable read only memory (PROM) or flash memory within the special purpose processor 3304B or in memory 3306. The special purpose processor 3304B may also be hardwired through circuit design to perform some or all of the operations to implement the present invention. Further, the special purpose processor 3304B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 3302 may also implement a compiler 3312 which allows an application program 3310 written in a programming language such as COBOL, C++, FORTRAN, or other language to be translated into processor 3304 readable code. After completion, the application or computer program 3310 accesses and manipulates data accepted from I/O devices and stored in the memory 3306 of the computer 3302 using the relationships and logic that was generated using the compiler 3312.

The computer 3302 also optionally comprises an external communication device such as a modem, satellite link, Ethernet card, or other device for accepting input from and providing output to other computers.

In one embodiment, instructions implementing the operating system 3308, the computer program 3310, and/or the compiler 3312 are tangibly embodied in a computer-readable medium, e.g., data storage device 3320, which could include one or more fixed or removable data storage devices, such as a zip drive, floppy disc drive 3324, hard drive, CD-ROM drive, tape drive, or a flash drive. Further, the operating system 3308 and the computer program 3310 are comprised of computer program instructions which, when accessed, read and executed by the computer 3302, causes the computer 3302 to perform the steps necessary to implement and/or use the present invention or to load the program of instructions into a memory, thus creating a special purpose data structure causing the computer to operate as a specially programmed computer executing the method steps described herein. Computer program 3310 and/or operating instructions may also be tangibly embodied in memory 3306 and/or data communications devices 3330, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 3302.

Although the term "computer" is referred to herein, it is understood that the computer may include servers or portable devices such as cellphones, portable MP3 players, video game consoles, notebook computers, tablet computers, pocket computers, or any other device with suitable processing, communication, and input/output capability.

What is claimed is:

1. A method of voting for one or more of a plurality of choices depicted in a broadcast of a program in a plurality of time zones comprising a temporally first time zone and a temporally last time zone, comprising:
   determining if an allocation of at least a portion of N1 votes among one or more candidates is received from a first user via a first device during a first period;
   accepting and storing the allocation of votes, only if the allocation is received during the first period;
   receiving a user command committing the stored allocation of the N1 votes among the plurality of candidates;
   determining if the command is received during a second period; and
   committing the stored first user allocation of N1 votes among the one or more candidates only if the command is received during the second period.

2. The method of claim 1, wherein:
   the method further comprises determining a time zone of the first device from a geolocation of the first device;
   the first period is during or after the broadcast of the program in the determined time zone until at least completion of the broadcast of the program in the temporally last of the plurality of time zones; and
   the second period is from a time interval before the end of the broadcast in the determined time zone and until at least completion of the broadcast of the program in the temporally last of the plurality of time zones.

3. The method of claim 2, wherein the end of the first period extends a period beyond the completion of the broadcast of the program in the temporally last of the plurality of time zones.

4. The method of claim 1, further comprising:
   generating a tabulation of the stored allocation of votes from the first user and a plurality of allocations of stored votes, each associated with another one of the plurality of users; and
   providing a visible indicia of the tabulation in the broadcast of the media program substantially in real time.

5. The method of claim 2, further comprising:
   receiving an updated allocation of votes at a second time; and
   if the updated allocation is received during the first period, updating the stored allocation of votes, otherwise rejecting the updated allocation of votes.

6. The method of claim 5, further comprising:
   generating a tabulation of the updated stored allocation of votes from the first user and a plurality of updated stored allocations of votes, each associated another one of the plurality of other users; and
   providing a visible indicia of the tabulation in the broadcast of the media program substantially in real time.

7. The method of claim 5, wherein the updated allocation of votes is received via a second device.

8. The method of claim 1, wherein:
   the method further comprises determining if the N1 votes among the one or more candidates exceeds a maximum of M votes per candidate;

the first user allocation of votes are accepted and stored only if the N1 votes among the one or more candidates a does not exceed a maximum of M votes per candidate;

the first period is during or after the broadcast of the program in any of the plurality of time zones until at least the completion of the broadcast of the program in the temporally last of the plurality of time zones; and the second period is from a time interval before the end of the broadcast in the first of the plurality of time zones until at least the completion of the broadcast of the program in the temporally last of the plurality of time zones.

9. The method of claim 8, further comprising
generating a tabulation of the stored allocation of votes from the first user and a plurality of allocations of stored votes, each associated with another one of the plurality of users; and providing a visible indicia of the tabulation in the broadcast of the media program substantially in real time.

10. The method of claim 8, wherein:
after committing the stored first user allocation of N1 votes among the one or more candidates:
  receiving a further allocation of at least a portion of the uncommitted N1 votes among the one or more candidates at a second time;
  determining if the further allocation of at least a portion of the uncommitted N1 votes is received during the first period;
  accepting and storing the further allocation of N1 votes among the one or more candidates; and
  receiving a further command committing the stored further first user allocation of N1 votes among the one or more candidates.

11. The method of claim 1, further comprising enabling the transmission of the received allocation only during a voting period.

12. The method of claim 11, wherein the enabling the transmission of the received allocation only during a voting period comprises transmitting data permitting entry of the allocation of votes only during the voting period.

13. The method of claim 11, wherein accepting and storing the allocation of votes only if the allocation is received during the first period comprises rejecting the allocation if the allocation is received other than during the first period.

14. The method of claim 1, wherein:
the method further comprises determining a time zone of the first device from a geolocation of the first device;
the first period is during or after the broadcast of the program in the determined time zone until completion of the broadcast of the program in the determined time zone; and
the second period is from a time interval before the end of the broadcast in the determined time zone and until completion of the broadcast of the program in the determined time zone.

15. The method of claim 14, further comprising:
receiving an updated allocation of votes at a second time; and
if the updated allocation is received during the first period, updating the stored allocation of votes, otherwise rejecting the updated allocation of votes.

16. The method of claim 15, wherein:
after committing the stored first user allocation of N1 votes among the one or more candidates:
  receiving a further allocation of at least a portion of the uncommitted N1 votes among the one or more candidates at a second time;
  determining if the further allocation of at least a portion of the uncommitted N1 votes is received during the first period;
  accepting and storing the further allocation of N1 votes among the one or more candidates; and
  receiving a further command committing the stored further first user allocation of N1 votes among the one or more candidates.

17. The method of claim 1, wherein:
the first period is during or after the broadcast of the program in the first time zone until at least the completion of the broadcast of the program in the temporally last of the plurality of time zones; and
the second period is from a time interval before the end of the broadcast in the first of the plurality of time zones until at least the completion of the program in the temporally last of the plurality of time zones.

18. The method of claim 17, further comprising:
receiving an updated allocation of votes at a second time; and
if the updated allocation is received during the first period, updating the stored allocation of votes, otherwise rejecting the updated allocation of votes.

19. The method of claim 18, wherein the updated allocation of votes is received via a second device.

20. The method of claim 18, wherein:
after committing the stored first user allocation of N1 votes among the one or more candidates:
  receiving a further allocation of at least a portion of the uncommitted N1 votes among the one or more candidates at a second time;
  determining if the further allocation of at least a portion of the uncommitted N1 votes is received during the first period;
  accepting and storing the further allocation of N1 votes among the one or more candidates; and
  receiving a further command committing the stored further first user allocation of N1 votes among the one or more candidates.

21. The method of claim 1, wherein the second period follows the first period and the second period and first period do not overlap.

22. An apparatus for voting for one or more of a plurality of choices depicted in a broadcast of a program in a plurality of time zones comprising a temporally first time zone and a temporally last time zone, comprising:
a memory;
a processor communicatively coupled to the memory storing instructions comprising instructions for:
  determining if an allocation of at least a portion of N1 votes among one or more candidates is received from a first user via a first device during a first period;
  accepting and storing the allocation of votes, only if the allocation is received during the first period;
  receiving a user command committing the stored allocation of the N1 votes among the plurality of candidates;
  determining if the command is received during a second period; and
  committing the stored first user allocation of N1 votes among the one or more candidates only if the command is received during the second period.

23. The apparatus of claim 22, wherein:
the instructions further comprise instructions for determining a time zone of the first device from a geolocation of the first device;
the first period is during or after the broadcast of the program in the determined time zone until at least completion of the broadcast of the program in the temporally last of the plurality of time zones; and
the second period is from a time interval before the end of the broadcast in the determined time zone and until at least completion of the broadcast of the program in the temporally last of the plurality of time zones.

24. The apparatus of claim 23, wherein the end of the first period extends a period beyond the completion of the broadcast of the program in the temporally last of the plurality of time zones.

25. The apparatus of claim 22, wherein the instructions further comprise instructions for:
generating a tabulation of the stored allocation of votes from the first user and a plurality of allocations of stored votes, each associated with another one of the plurality of users; and
providing a visible indicia of the tabulation in the broadcast of the media program substantially in real time.

26. The apparatus of claim 23, wherein the instructions further comprise instructions for:
receiving an updated allocation of votes at a second time; and
updating the stored allocation of votes, otherwise rejecting the updated allocation of votes if the updated allocation is received during the first period, updating the stored allocation of votes.

27. The apparatus of claim 26, wherein the instructions further comprise instructions for:
generating a tabulation of the updated stored allocation of votes from the first user and a plurality of updated stored allocations of votes, each associated another one of the plurality of other users; and
providing a visible indicia of the tabulation in the broadcast of the media program substantially in real time.

28. The apparatus of claim 26, wherein the updated allocation of votes is received via a second device.

29. The apparatus of claim 22, wherein:
the instructions further comprise instructions for determining if the N1 votes among the one or more candidates exceeds a maximum of M votes per candidate;
the first user allocation of votes are accepted and stored only if the N1 votes among the one or more candidates a does not exceed a maximum of M votes per candidate;
the first period is during or after the broadcast of the program in any of the plurality of time zones until at least the completion of the broadcast of the program in the temporally last of the plurality of time zones; and
the second period is from a time interval before the end of the broadcast in the first of the plurality of time zones until at least the completion of the broadcast of the program in the temporally last of the plurality of time zones.

30. The apparatus of claim 29, wherein the instructions further comprise instructions for:
generating a tabulation of the stored allocation of votes from the first user and a plurality of allocations of stored votes, each associated with another one of the plurality of users; and
providing a visible indicia of the tabulation in the broadcast of the media program substantially in real time.

31. The apparatus of claim 29, wherein the instructions further comprise instructions for, performing, after committing the stored first user allocation of N1 votes among the one or more candidates:
receiving a further allocation of at least a portion of the uncommitted N1 votes among the one or more candidates at a second time;
determining if the further allocation of at least a portion of the uncommitted N1 votes is received during the first period;
accepting and storing the further allocation of N1 votes among the one or more candidates; and
receiving a further command committing the stored further first user allocation of N1 votes among the one or more candidates.

32. The apparatus of claim 22, wherein the instructions further comprise instructions for enabling the transmission of the received allocation only during a voting period.

33. The apparatus of claim 32, wherein the instructions for enabling the transmission of the received allocation only during a voting period comprises instructions for transmitting data permitting entry of the allocation of votes only during the voting period.

34. The apparatus of claim 22, wherein the instructions for accepting and storing the allocation of votes only if the allocation is received during the first period comprises instructions for rejecting the allocation if the allocation is received other than during the first period.

35. The apparatus of claim 22, wherein:
the instructions further comprise instructions for determining a time zone of the first device from a geolocation of the first device;
the first period is during or after the broadcast of the program in the determined time zone until completion of the broadcast of the program in the determined time zone; and
the second period is from a time interval before the end of the broadcast in the determined time zone and until completion of the broadcast of the program in the determined time zone.

36. The apparatus of claim 35, wherein the instructions further comprise instructions for:
receiving an updated allocation of votes at a second time; and
updating the stored allocation of votes, otherwise rejecting the updated allocation of votes if the updated allocation is received during the first period.

37. The apparatus of claim 36, wherein the instructions further comprise instructions for, after committing the stored first user allocation of N1 votes among the one or more candidates:
receiving a further allocation of at least a portion of the uncommitted N1 votes among the one or more candidates at a second time;
determining if the further allocation of at least a portion of the uncommitted N1 votes is received during the first period;
accepting and storing the further allocation of N1 votes among the one or more candidates; and
receiving a further command committing the stored further first user allocation of N1 votes among the one or more candidates.

38. The apparatus of claim 22, wherein:
the first period is during or after the broadcast of the program in the first time zone until at least the completion of the broadcast of the program in the temporally last of the plurality of time zones; and the second period is from a time interval before the end of the broadcast in the first of the plurality of time zones until at least the completion of the program in the temporally last of the plurality of time zones.

39. The apparatus of claim 38, wherein the instructions further comprise instructions for:
receiving an updated allocation of votes at a second time; and
updating the stored allocation of votes, otherwise rejecting the updated allocation of votes if the updated allocation is received during the first period.

40. The apparatus of claim 39, wherein the updated allocation of votes is received via a second device.

41. The apparatus of claim 39, wherein the instructions further comprise instructions for, after committing the stored first user allocation of N1 votes among the one or more candidates:
receiving a further allocation of at least a portion of the uncommitted N1 votes among the one or more candidates at a second time;
determining if the further allocation of at least a portion of the uncommitted N1 votes is received during the first period;
accepting and storing the further allocation of N1 votes among the one or more candidates; and
receiving a further command committing the stored further first user allocation of N1 votes among the one or more candidates.

* * * * *